United States Patent
Yabu

(10) Patent No.: US 10,200,765 B2
(45) Date of Patent: Feb. 5, 2019

(54) CONTENT IDENTIFICATION APPARATUS AND CONTENT IDENTIFICATION METHOD

(71) Applicant: Panasonic Intellectual Property Management Co., Ltd., Osaka (JP)

(72) Inventor: Hiroshi Yabu, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 20 days.

(21) Appl. No.: 15/302,460

(22) PCT Filed: Aug. 19, 2015

(86) PCT No.: PCT/JP2015/004112
§ 371 (c)(1),
(2) Date: Oct. 6, 2016

(87) PCT Pub. No.: WO2016/027457
PCT Pub. Date: Feb. 25, 2016

(65) Prior Publication Data
US 2017/0026718 A1  Jan. 26, 2017

(30) Foreign Application Priority Data
Aug. 21, 2014 (JP) .................... 2014-168709

(51) Int. Cl.
G06K 9/00 (2006.01)
G06F 17/30 (2006.01)
(Continued)

(52) U.S. Cl.
CPC ..... H04N 21/8352 (2013.01); G06K 9/00744 (2013.01); G06K 9/00758 (2013.01);
(Continued)

(58) Field of Classification Search
None
See application file for complete search history.

(56) References Cited

U.S. PATENT DOCUMENTS 7,712,123 B2  5/2010  Miyaoku et al.
8,199,221 B2  6/2012  Yoshizumi
(Continued)

FOREIGN PATENT DOCUMENTS

EP  1286541 A1  2/2003
EP  1 954 041 A1  8/2008
(Continued)

OTHER PUBLICATIONS

Non-Final Office Action issued in U.S. Appl. No. 14/787,721, dated Jun. 7, 2017.
(Continued)

Primary Examiner — James R Marandi
(74) Attorney, Agent, or Firm — McDermott Will & Emery LLP

(57) ABSTRACT

A recognition data creation device includes: a fingerprint creator; a sorter; and a collator. The fingerprint creator creates fingerprints for each of a plurality of acquired video content candidates. The sorter sorts the video content candidates by using attached information included in recognition data input from an outside. The collator collates the fingerprints of the video content candidates which are sorted by the sorter with fingerprints included in the recognition data, and specifies video content which corresponds to the fingerprints included in the recognition data from among the video content candidates.

9 Claims, 29 Drawing Sheets

(51) Int. Cl.
*H04N 21/8352* (2011.01)
*H04N 21/8358* (2011.01)

(52) U.S. Cl.
CPC ..... *H04N 21/8358* (2013.01); *G06F 17/3079* (2013.01); *G06F 17/30743* (2013.01); *G06F 17/30784* (2013.01)

(56) References Cited

U.S. PATENT DOCUMENTS

| | | | |
|---|---|---|---|
| 8,254,720 | B2 | 8/2012 | Matsuzaki |
| 8,421,921 | B1 | 4/2013 | Woodall |
| 8,582,952 | B2 | 11/2013 | Circlaeys et al. |
| 9,148,610 | B2 | 9/2015 | Yabu |
| 9,456,237 | B2 | 9/2016 | Oztaskent et al. |
| 9,626,798 | B2 | 4/2017 | Zavesky |
| 2002/0001453 | A1 | 1/2002 | Mizumura et al. |
| 2002/0097339 | A1 | 7/2002 | Kwon |
| 2002/0126990 | A1 | 9/2002 | Rasmussen et al. |
| 2002/0143902 | A1 | 10/2002 | Chung et al. |
| 2003/0051252 | A1 | 3/2003 | Miyaoku et al. |
| 2003/0084462 | A1 | 5/2003 | Kubota et al. |
| 2003/0149983 | A1 | 8/2003 | Markel |
| 2004/0165865 | A1 | 8/2004 | Seo et al. |
| 2005/0071425 | A1 | 3/2005 | Chung et al. |
| 2005/0172312 | A1 | 8/2005 | Lienhart et al. |
| 2006/0187358 | A1 | 8/2006 | Lienhart et al. |
| 2006/0200842 | A1 | 9/2006 | Chapman et al. |
| 2007/0157242 | A1 | 7/2007 | Cordray et al. |
| 2007/0233285 | A1 | 10/2007 | Yamamoto |
| 2007/0261079 | A1 | 11/2007 | Pack et al. |
| 2008/0310731 | A1 | 12/2008 | Stojancic et al. |
| 2009/0006375 | A1 | 1/2009 | Lax et al. |
| 2009/0034937 | A1 | 2/2009 | Kusunoki et al. |
| 2009/0177758 | A1 | 7/2009 | Banger et al. |
| 2009/0244372 | A1 | 10/2009 | Petronelli et al. |
| 2009/0279738 | A1 | 11/2009 | Sasaki |
| 2010/0067873 | A1 | 3/2010 | Sasaki et al. |
| 2010/0259684 | A1 | 10/2010 | Kambe |
| 2010/0318515 | A1 | 12/2010 | Ramanathan et al. |
| 2011/0078202 | A1 | 3/2011 | Kamibeppu |
| 2011/0129017 | A1 | 6/2011 | Oami et al. |
| 2011/0135283 | A1 | 6/2011 | Poniatowki et al. |
| 2011/0137976 | A1 | 6/2011 | Poniatowski et al. |
| 2011/0181693 | A1 | 7/2011 | Lee et al. |
| 2011/0243474 | A1 | 10/2011 | Ito |
| 2011/0246202 | A1 | 10/2011 | McMillan et al. |
| 2011/0247042 | A1* | 10/2011 | Mallinson ......... G06F 17/30026 725/86 |
| 2012/0020568 | A1 | 1/2012 | Kogane |
| 2012/0075421 | A1 | 3/2012 | Tsukagoshi |
| 2012/0092248 | A1 | 4/2012 | Prabhala |
| 2012/0128241 | A1 | 5/2012 | Jung |
| 2012/0320091 | A1 | 12/2012 | Rajaraman et al. |
| 2012/0321125 | A1 | 12/2012 | Choi et al. |
| 2013/0042289 | A1 | 2/2013 | Park |
| 2013/0047178 | A1 | 2/2013 | Moon et al. |
| 2013/0054645 | A1 | 2/2013 | Bhagavathy et al. |
| 2013/0094590 | A1 | 4/2013 | Laksono et al. |
| 2013/0106999 | A1 | 5/2013 | Newton et al. |
| 2013/0111514 | A1 | 5/2013 | Slavin et al. |
| 2013/0129219 | A1 | 5/2013 | Takenouchi et al. |
| 2013/0145395 | A1 | 6/2013 | Jeong et al. |
| 2013/0167189 | A1 | 6/2013 | Lucas |
| 2013/0198773 | A1 | 8/2013 | Jentz et al. |
| 2013/0202150 | A1 | 8/2013 | Sinha et al. |
| 2013/0205321 | A1 | 8/2013 | Sinha et al. |
| 2013/0230292 | A1 | 9/2013 | Pierce et al. |
| 2013/0246457 | A1 | 9/2013 | Stojancic et al. |
| 2013/0247117 | A1 | 9/2013 | Yamada et al. |
| 2013/0254802 | A1 | 9/2013 | Lax et al. |
| 2013/0308818 | A1 | 11/2013 | MacIntosh et al. |
| 2014/0007155 | A1 | 1/2014 | Vemparala et al. |
| 2014/0082655 | A1 | 3/2014 | Moon et al. |
| 2014/0123204 | A1 | 5/2014 | Moon et al. |
| 2014/0229485 | A1 | 8/2014 | Icho et al. |
| 2014/0230002 | A1 | 8/2014 | Kitazato |
| 2015/0020094 | A1 | 1/2015 | Moon et al. |
| 2015/0026718 | A1 | 1/2015 | Seyller |
| 2015/0193451 | A1 | 7/2015 | Rowe |

FOREIGN PATENT DOCUMENTS

| | | | |
|---|---|---|---|
| EP | 2 244 208 A2 * | 10/2010 | ............... G06K 9/00 |
| EP | 2337345 A1 | 6/2011 | |
| EP | 2760200 A1 | 7/2014 | |
| EP | 2763427 A1 | 8/2014 | |
| JP | H04-245552 A | 9/1992 | |
| JP | H09-185720 A | 7/1997 | |
| JP | H10-126721 A | 5/1998 | |
| JP | H10-214258 A | 8/1998 | |
| JP | 2000-287189 A | 10/2000 | |
| JP | 2000-293626 A | 10/2000 | |
| JP | 2002-175311 A | 6/2002 | |
| JP | 2002-209204 A | 7/2002 | |
| JP | 2002-232372 A | 8/2002 | |
| JP | 2002-334010 A | 11/2002 | |
| JP | 2004-007323 A | 1/2004 | |
| JP | 2004-104368 A | 4/2004 | |
| JP | 2004-303259 A | 10/2004 | |
| JP | 2004-341940 | 12/2004 | |
| JP | 2005-167452 A | 6/2005 | |
| JP | 2005-167894 A | 6/2005 | |
| JP | 2005-347806 A | 12/2005 | |
| JP | 2006-030244 A | 2/2006 | |
| JP | 2006-303936 A | 11/2006 | |
| JP | 2007-049515 A | 2/2007 | |
| JP | 2007-134948 A | 5/2007 | |
| JP | 2008-040622 A | 2/2008 | |
| JP | 2008-042259 A | 2/2008 | |
| JP | 2008-116792 A | 5/2008 | |
| JP | 2008-176396 A | 7/2008 | |
| JP | 2008-187324 A | 8/2008 | |
| JP | 2009-088777 A | 4/2009 | |
| JP | 2010-164901 A | 7/2010 | |
| JP | 2010-271987 A | 12/2010 | |
| JP | 2011-034323 A | 2/2011 | |
| JP | 2011-059504 | 3/2011 | |
| JP | 2011-234343 A | 11/2011 | |
| JP | 2012-055013 A | 3/2012 | |
| JP | 2012-231383 A | 11/2012 | |
| JP | 2013-038773 A | 2/2013 | |
| JP | 2013-070268 A | 4/2013 | |
| JP | 2013-125191 A | 6/2013 | |
| JP | 2013-164753 A | 8/2013 | |
| WO | 2004/080073 A2 | 9/2004 | |
| WO | 2007/039994 A1 | 4/2007 | |
| WO | 2009/011030 A1 | 1/2009 | |
| WO | 2010/022000 A2 | 2/2010 | |
| WO | 2013/042531 A1 | 3/2013 | |
| WO | 2013/047948 A1 | 4/2013 | |
| WO | 2013/103273 A1 | 7/2013 | |
| WO | 2013/119082 A1 | 8/2013 | |
| WO | 2014/006903 | 1/2014 | |

OTHER PUBLICATIONS

Notice of Allowance issued in U.S. Appl. No. 14/787,759, dated May 9, 2017.
Final Office Action issued in U.S. Appl. No. 14/888,444, dated May 15, 2017.
Non-Final Office Action issued in U.S. Appl. No. 14/888,445, dated Jun. 9, 2017.
Notice of Allowance issued in U.S. Appl. No. 14/888,447, dated Jul. 3, 2017.
Non-Final Office Action issued in U.S. Appl. No. 14/888,449, dated Jul. 5, 2017.
The Extended European Search Report dated May 29, 2017 for the related European Patent Application No. 15832982.1.
The Extended European Search Report dated May 11, 2017 for the related European Patent Application No. 15822221.6.
International Search Report of PCT application No. PCT/JP2015/004112 dated Oct. 27, 2015.

(56) References Cited

OTHER PUBLICATIONS

Notice of Allowance issued in U.S. Appl. No. 14/888,444, dated Oct. 2, 2017.
Non-Final Office Action issued U.S. Appl. No. 14/890,121, dated Sep. 6, 2017.
Non-Final Office Action issued in U.S. Appl. No. 14/787,721, dated Aug. 4, 2016.
Final Office Action issued in U.S. Appl. No. 14/787,721, dated Dec. 2, 2016.
Non-Final Office Action issued in U.S. Appl. No. 14/787,759, dated Dec. 29, 2016.
Non-Final Office Action issued in U.S. Appl. No. 14/888,444, dated Oct. 6, 2016.
Non-Final Office Action issued in U.S. Appl. No. 14/888,447, dated Sep. 6, 2016.
Final Office Action issued in U.S. Appl. No. 14/888,447, dated Jan. 10, 2017.
Non-Final Office Action issued in U.S. Appl. No. 14/888,449, dated Nov. 21, 2016.
Non-Final Office Action issued in U.S. Appl. No. 14/888,445, dated Aug. 12, 2016.
Non-Final Office Action issued in U.S. Appl. No. 14/890,121, dated Sep. 14, 2016.
The Extended European Search Report dated Jul. 5, 2016 for the related European Patent Application No. 14829140.4.
The Extended European Search Report dated Jun. 14, 2016 for the related European Patent Application No. 14832570.7 (with English translation).
The Extended Search Report dated Jul. 8, 2016 for the related Europena Patent Application No. 14838764.0.
The Extended European Search Report dated Jul. 19, 2016, for the related European Patent Application No. 14838765.7.
International Search Report of PCT application No. PCT/JP2014/003526 dated Oct. 7, 2014 (with English translation).
International Search Report of PCT application No. PCT/JP2014/003546 dated Oct. 7, 2014 (with English translation).
International Search Report issued in International Patent Application No. PCT/JP2014/003548, dated Oct. 7, 2014 (with English translation).
International Search Report of International Patent Application No. PCT/JP2014/003761, dated Oct. 21, 2014 (with English translation).
International Search Report of International Patent Application No. PCT/JP2014/003762, dated Oct. 21, 2014 (with English translation).
International Search Report of International Patent Application No. PCT/JP2014/003547, dated Oct. 7, 2014 (with English translation).
International Search Report of International Patent Application No. PCT/JP2014/003760, dated Oct. 7, 2014 (with English translation).
International Search Report of International Patent Application No. PCT/JP2015/003527, dated Aug. 11, 2015 (with English translation).
International Search Report of International Patent Application No. PCT/JP2015/004187, dated Oct. 20, 2015 (with English translation).
Gonzales R et al: "Digital Image Processing, Matching by correlation", Dec. 31, 2002 (Dec. 31, 2002), Digital Image Processing, Prentice-Hall Upper Saddle River, New Jersey, pp. 701-704, XP002657364.
Template matching, Wikipedia, Mar. 11, 2013 (Mar. 11, 2013), XP002759268, Retrieved from the Internet: URL:https://en.wikipedia.org/w/index.php?title=Template_matching&oldid=543510371 [retrieved on-Jun. 28, 2016].
Non-Final Office Action issued in related U.S. Appl. No. 13/958,863, dated Aug. 14, 2014.
Final Office Action issued in related U.S. Appl. No. 13/958,863, dated Jan. 23, 2015.
Final Office Action issued in U.S. Appl. No. 14/888,449, dated Mar. 6, 2017.
Final Office Action issued in U.S. Appl. No. 14/888,445, dated Jan. 30, 2017.
Final Office Action issued in U.S. Appl. No. 14/890,121, dated Mar. 13, 2017.
The Extended European Search Report dated Feb. 28, 2017 for the related European Patent Application No. 14841401.4.
The Extended European Search Report dated Mar. 3, 2017 for the related European Patent Application No. 14841377.6.
Final Office Action issued in U.S. Appl. No. 14/890,121, dated Jan. 24, 2018.
Non-Final Office Action issued in U.S. Appl. No. 15/301,444, dated Jan. 26, 2018.
Notice of Allowance issued in U.S. Appl. No. 14/888,449, dated Nov. 24, 2017.
Notice of Allowance issued in U.S. Appl. No. 14/888,445, dated Nov. 20, 2017.
Notice of Allowance issued in U.S. Appl. No. 14/787,721, dated Dec. 18, 2017.

\* cited by examiner

FIG. 25

| 103 | 100 | 93 | 98 | 101 |
|---|---|---|---|---|
| 0 | 0 | 0 | 128 | 165 |
| 0 | 0 | 0 | 0 | 0 |
| 0 | 0 | 183 | 0 | 0 |
| 193 | 198 | 201 | 195 | 199 |

Static fingerprint included in filtered recognition data: C00X

| 103 | 100 | 93 | 98 | 101 |
|---|---|---|---|---|
| 129 | 135 | 0 | 128 | 0 |
| 0 | 0 | 0 | 0 | 0 |
| 0 | 0 | 0 | 0 | 0 |
| 193 | 198 | 201 | 195 | 199 |

Static fingerprint included in recognition data received from reception device: C002

Ratio of similar static region: 11/25 → similarity degree: 44%

FIG. 26

Dynamic fingerprint included in filtered recognition data: D00X

| 0 | 0 | 0 | -32 | -92 |
|---|---|---|-----|-----|
| 0 | 0 | 0 | -52 | -32 |
| 0 | 0 | 0 | 0 | 3 |
| 0 | 0 | 0 | 0 | 35 |
| 25 | -23 | 0 | 0 | 0 |

Dynamic fingerprint included in recognition data received from reception device: D003

| 0 | 0 | 0 | -88 | -127 |
|---|---|---|-----|------|
| 24 | 0 | 0 | -65 | -94 |
| 20 | 0 | 0 | 0 | -94 |
| 0 | 0 | 0 | -24 | -41 |
| 0 | -23 | 0 | 0 | -32 |

Ratio of similar dynamic region: 5/25 → similarity degree: 20%

FIG. 27

| | Recognition conditions |
|---|---|
| (a) | Similarity is established in at least one of static fingerprints and dynamic fingerprints |
| (b) | Similarity is established in at least two of static fingerprints and dynamic fingerprints |
| (c) | Similarity is established in at least one of static fingerprints, and similarity is established in at least one of dynamic fingerprints |
| (d) | Similarity is established continuously twice in static fingerprints or dynamic fingerprints |
| (e) | Similarity is established continuously three times in static fingerprints or dynamic fingerprints |

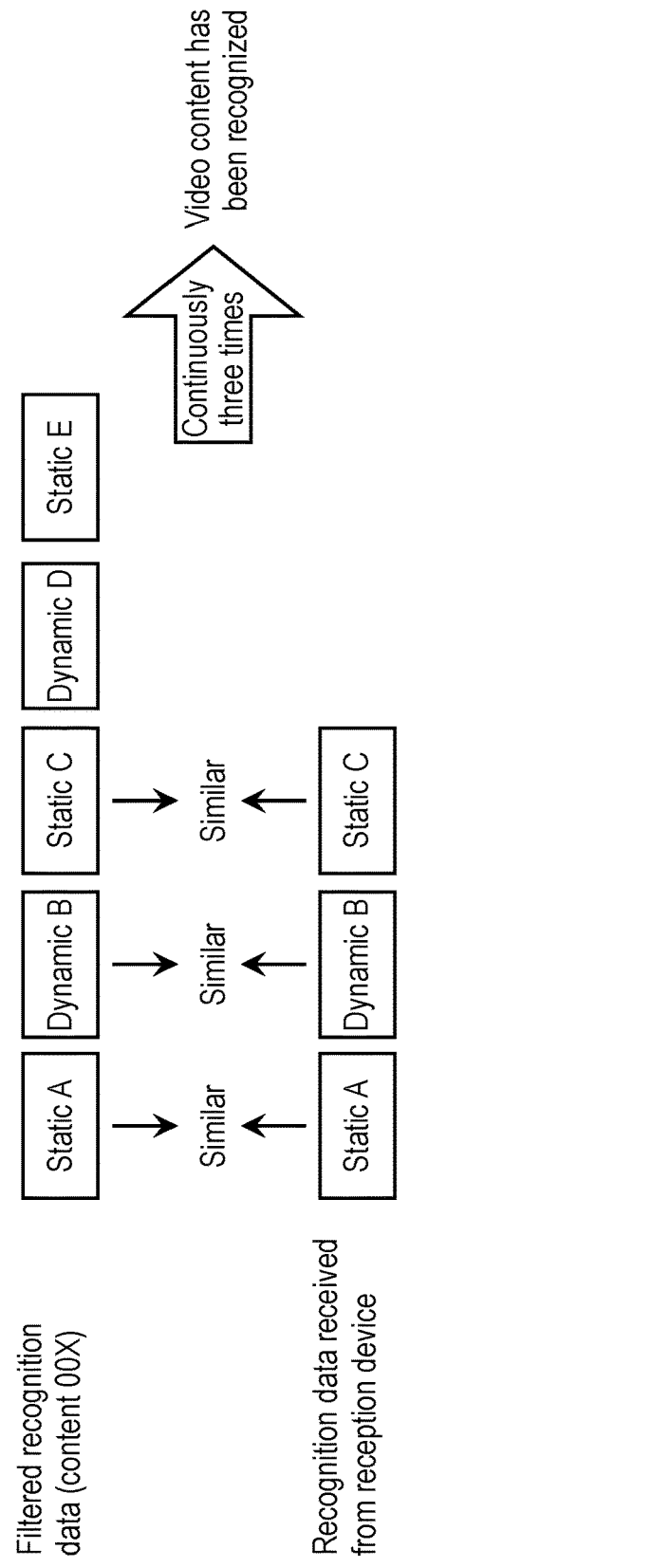

CONTENT IDENTIFICATION APPARATUS AND CONTENT IDENTIFICATION METHOD

CROSS-REFERENCE TO RELATED APPLICATIONS

This application is a U.S. national stage application of the PCT International Application No. PCT/JP2015/004112 filed on Aug. 19, 2015, which claims the benefit of foreign priority of Japanese patent application No. 2014-168709 filed on Aug. 21, 2014, the contents all of which are incorporated herein by reference.

TECHNICAL FIELD

The present disclosure relates to a content recognition device and a content recognition method, which recognize video content.

BACKGROUND ART

A communication service using a technology for recognizing content through a cloud is proposed. If this technology is used, then a television reception device (hereinafter, abbreviated as a "television") can be realized, which recognizes a video input thereto, acquires additional information related to this video via a communication network, and displays the acquired additional information on a display screen together with video content. A technology for recognizing the input video is called "ACR (Automatic Content Recognition)".

For the ACR, a fingerprint technology is sometimes used. Patent Literature 1 and Patent Literature 2 disclose the fingerprint technology. In this technology, an outline of a face or the like, which is reflected on an image frame in the video, is sensed, a fingerprint is created based on the sensed outline, and the created fingerprint is collated with data accumulated in a database.

CITATION LIST

Patent Literature

PTL 1: U.S. Patent Publication No. 2010/0318515
PTL 2: U.S. Patent Publication No. 2008/0310731

SUMMARY

The present disclosure provides a content recognition device and a content recognition method, which can reduce processing required for the recognition of the video content while increasing recognition accuracy for the video content.

The content recognition device in the present disclosure includes: a fingerprint creator; a sorter; and a collator. The fingerprint creator creates fingerprints for each of a plurality of acquired video content candidates. The sorter sorts the video content candidates by using attached information included in recognition data input from an outside. The collator collates the fingerprints of the video content candidates which are sorted by the sorter with fingerprints included in the recognition data, and specifies video content which corresponds to the fingerprints included in the recognition data from among the video content candidates.

The content recognition device in the present disclosure can reduce the processing required for the recognition of the video content while increasing recognition accuracy of the video content.

BRIEF DESCRIPTION OF DRAWINGS

FIG. 25 is a view schematically showing an example of processing for collating the static fingerprint in the first exemplary embodiment.

FIG. 26 is a view schematically showing an example of processing for collating the dynamic fingerprint in the first exemplary embodiment.

FIG. 27 is a view showing an example of recognition conditions for video content in the first exemplary embodiment.

FIG. 28 is a view schematically showing an example of processing for collating the video content in the first exemplary embodiment.

DESCRIPTION OF EMBODIMENTS

Figure 1:
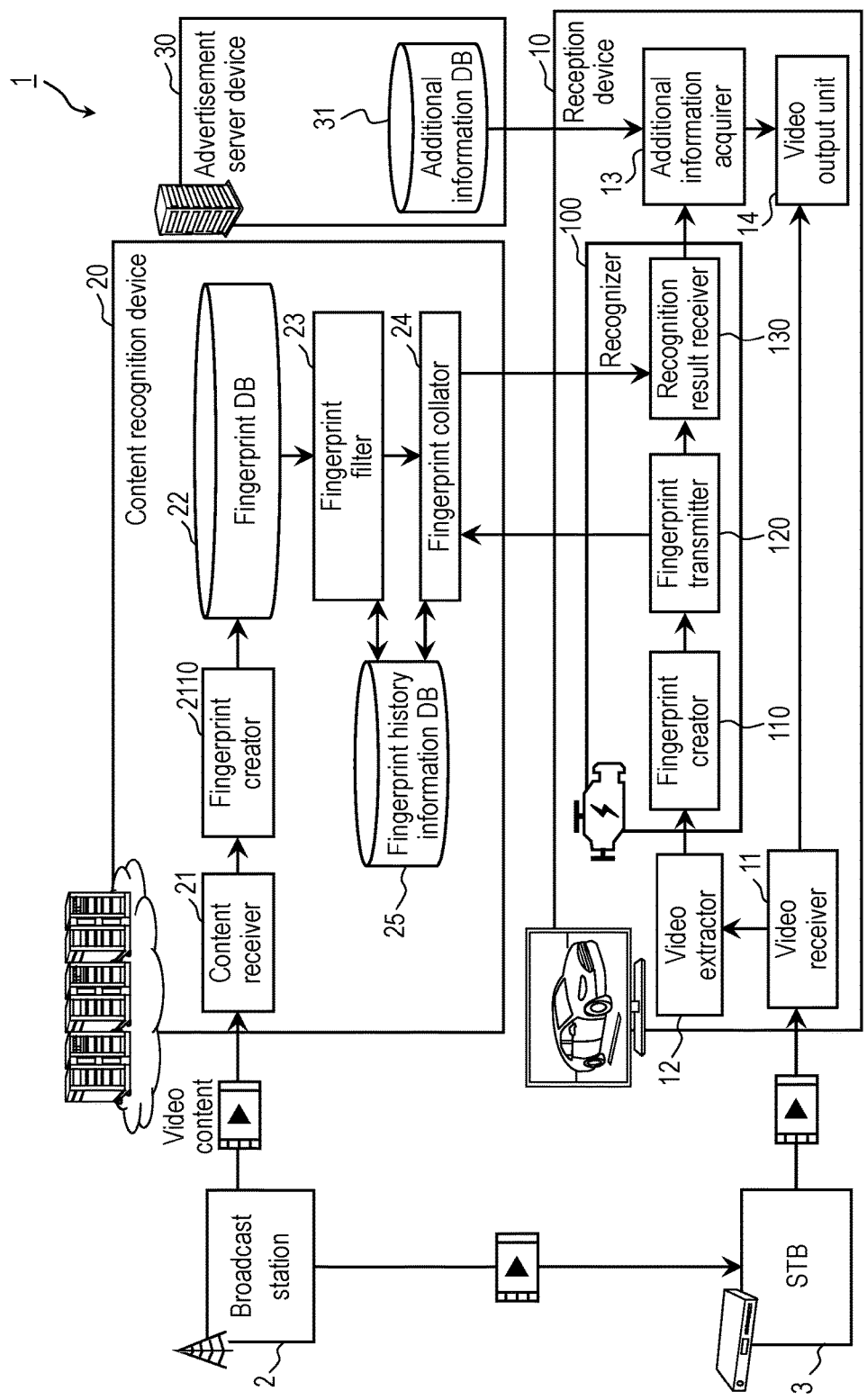
FIG. 1 is a block diagram showing a configuration example of a content recognition system in a first exemplary embodiment.

A description is made below in detail of exemplary embodiments while referring to the drawings as appropriate. However, a description more in detail than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

Moreover, the respective drawings are schematic views, and are not illustrated necessarily exactly. Furthermore, in the respective drawings, the same reference numerals are assigned to the same constituent elements.

First Exemplary Embodiment

[1-1. Content Recognition System]

First, a description is made of a content recognition system in this exemplary embodiment with reference to FIG. 1.

FIG. 1 is a block diagram showing a configuration example of content recognition system 1 in a first exemplary embodiment.

As shown in FIG. 1, content recognition system 1 includes: broadcast station 2; STB (Set Top Box) 3; reception device 10; content recognition device 20; and advertisement server device 30.

Broadcast station 2 is a transmission device configured to convert video content into a video signal to broadcast the video content as a television broadcast signal (hereinafter, also simply referred to as a "broadcast signal"). For example, the video content is broadcast content broadcasted by a wireless or wired broadcast or communication, and includes: program content such as a television program or the like; and advertisement video content (hereinafter, referred to as "advertisement content") such as a commercial message (CM) or the like. The program content and the advertisement content are switched from each other with the elapse of time.

Broadcast station 2 transmits the video content to STB 3 and content recognition device 20. For example, broadcast station 2 transmits the video content to STB 3 by the broadcast, and transmits the video content to content recognition device 20 by the communication.

STB 3 is a tuner/decoder configured to receive the broadcast signal, which is broadcasted from broadcast station 2, and to output the video signal or the like, which is based on the received broadcast signal. STB 3 receives a broadcast channel, which is selected based on an instruction from a user, from the broadcast signal broadcasted from broadcast station 2. Then, STB 3 decodes video content of the received broadcast channel, and outputs the decoded video content to reception device 10 via a communication path. Note that, for example, the communication path is HDMI (registered trademark) (High-Definition Multimedia Interface) or the like.

For example, reception device 10 is a video reception device such as a television set or the like. Reception device 10 is connected to content recognition device 20 and advertisement server device 30 via communication network 105. Reception device 10 extracts a plurality of image frames from a frame sequence of the received video content, and creates recognition data based on the extracted image frames. Reception device 10 transmits the created recognition data to content recognition device 20, and receives a recognition result of the video content from content recognition device 20. Reception device 10 acquires additional information from advertisement server device 30 based on the recognition result of the video content, and displays the acquired additional information on a display screen together with the video content in substantially real time.

Note that, for example, the recognition data is data representing the video content, and is data for use in the recognition (for example, ACR) of the video content. Specifically, the recognition data includes a fingerprint (hash value) created based on a change of the image between the image frames.

Moreover, the image frames are pictures which compose the video content. Each of the image frames includes a frame in the progressive system, a field in the interlace system, and the like.

For example, content recognition device 20 is a server device. Content recognition device 20 creates respective pieces of recognition data from a plurality of pieces of video content input thereto, collates recognition data sorted from among these pieces of the recognition data with the recognition data sent from reception device 10, and thereby executes the recognition processing for the video content. Hereinafter, the recognition processing for the video content is also referred to as "image recognition processing" or "image recognition". In a case of succeeding in such a collation as described above, content recognition device 20 selects, as a result of the image recognition, one piece of video content from among the plurality of pieces of video content. That is to say, each of the plurality of pieces of video content is a candidate for the video content, which is possibly selected as the video content corresponding to the recognition data sent from reception device 10. Hence, hereinafter, the video content received by content recognition device 20 is also referred to as a "video content candidate". Content recognition device 20 is an example of an image recognition device, and is a device configured to perform the recognition (for example, ACR) of the video content.

For example, content recognition device 20 receives a plurality of on-air video content candidates from a plurality of broadcast stations 2, and performs creation of the recognition data. Then, content recognition device 20 receives the recognition data transmitted from reception device 10, and performs recognition (image recognition processing) of the video content in substantially real time by using the received recognition data and the recognition data of the video content candidates.

For example, advertisement server device 30 is a server device that distributes additional information related to the recognition result of the video content provided by content recognition device 20. For example, advertisement server device 30 is an advertisement distribution server that holds and distributes advertisements of a variety of commercial goods.

Note that, in this exemplary embodiment, content recognition device 20 and advertisement server device 30 are server devices independent of each other; however, content recognition device 20 and advertisement server device 30 may be included in one Web server.

A description is made below of respective configurations of reception device 10, content recognition device 20 and advertisement server device 30.

[1-1-1. Reception Device]

Figure 2:
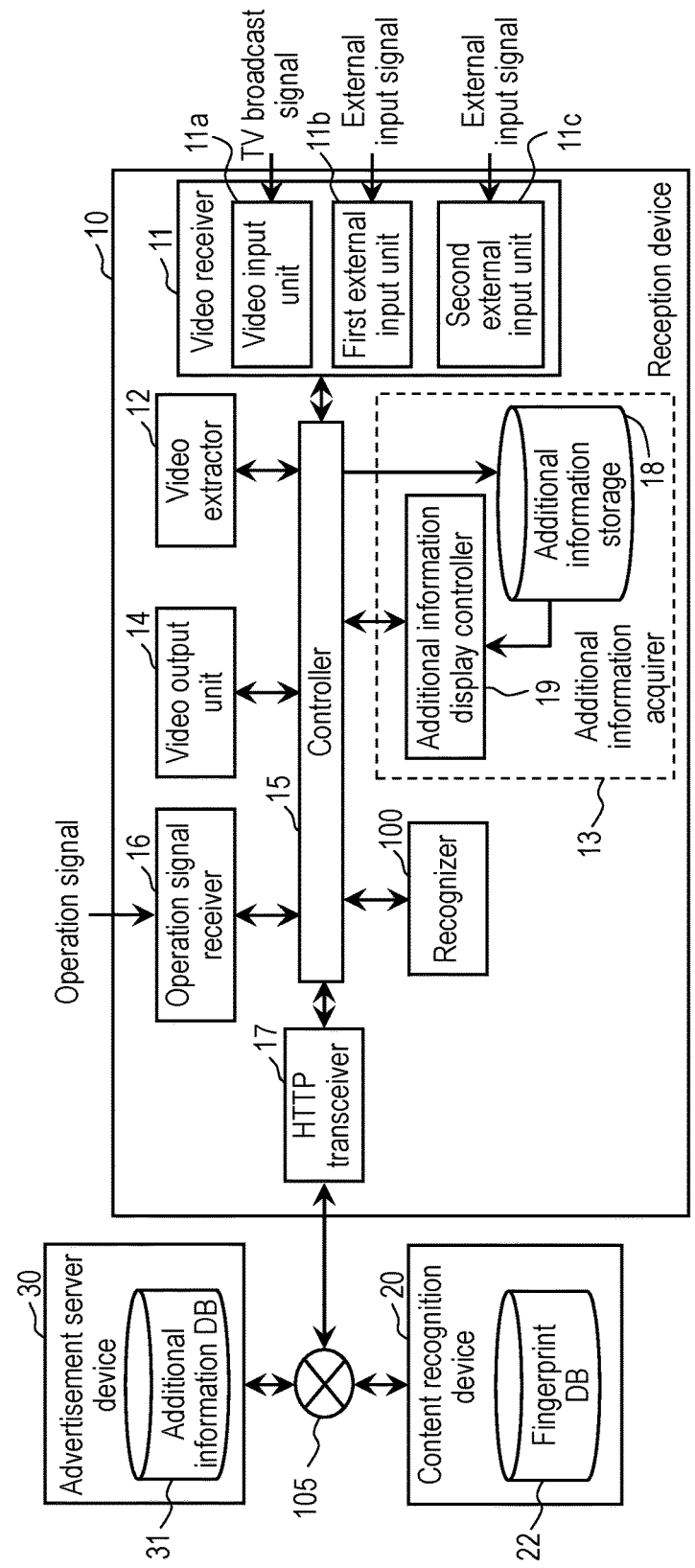
FIG. 2 is a block diagram showing a configuration example of a reception device in the first exemplary embodiment.

First, a description is made of reception device 10 in this exemplary embodiment with reference to FIG. 1 and FIG. 2.

FIG. 2 is a block diagram showing a configuration example of reception device 10 in the first exemplary embodiment. Note that FIG. 2 shows a main hardware configuration of reception device 10.

As shown in FIG. 1, reception device 10 includes: video receiver 11; video extractor 12; additional information acquirer 13; video output unit 14; and recognizer 100. More specifically, as shown in FIG. 2, reception device 10 further includes: controller 15; operation signal receiver 16; and HTTP (Hyper Text Transfer Protocol) transceiver 17. Moreover, as shown in FIG. 2, additional information acquirer 13 includes: additional information storage 18; and additional information display controller 19.

Controller 15 is a processor configured to control the respective constituent elements provided in reception device 10. Controller 15 includes a nonvolatile memory, a CPU (Central Processing Unit), and a volatile memory. For example, the nonvolatile memory is a ROM (Read Only Memory) or the like, and stores a program (application program or the like). The CPU is configured to execute the program. For example, the volatile memory is a RAM (Random Access Memory) or the like, and is used as a temporal working area when the CPU operates.

Operation signal receiver 16 is a circuit configured to receive an operation signal output from an operator (not shown). The operation signal is a signal output from the operator (for example, a remote controller) in such a manner that the user operates the operator in order to operate reception device 10. Note that, in a case where the operator is a remote controller having a gyro sensor, operation signal receiver 16 may be configured to receive information regarding a physical motion of the remote controller itself, which is output from the remote controller (that is, the information is a signal indicating a motion of the remote controller when the user performs shaking, tilting, direction change and so on for the remote controller).

The HTTP transceiver 17 is an interface configured to communicate with content recognition device 20 and advertisement server device 30 via communication network 105. For example, HTTP transceiver 17 is a communication adapter for a wired LAN (Local Area Network), which adapts to the standard of IEEE 802.3.

For example, HTTP transceiver 17 transmits the recognition data to content recognition device 20 via communication network 105. Moreover, HTTP transceiver 17 receives the recognition result of the video content, which is transmitted from content recognition device 20, via communication network 105.

Furthermore, for example, HTTP transceiver 17 acquires the additional information, which is transmitted from advertisement server device 30 via communication network 105. The acquired additional information is stored in additional information storage 18 via controller 15.

Video receiver 11 has a reception circuit and a decoder (either of which is not shown), the reception circuit being configured to receive the video content. For example, video receiver 11 performs the selection of the received broadcast channel, the selection of the signal, which is input from the outside, and the like based on the operation signal received in operation signal receiver 16.

As shown in FIG. 2, video receiver 11 includes: video input unit 11a; first external input unit 11b; and second external input unit 11c.

Video input unit 11a is a circuit configured to receive the video signal transmitted from the outside, such as a broadcast signal (described as a "TV broadcast signal" in FIG. 2) or the like, which is received, for example, in an antenna (not shown).

First external input unit 11b and second external input unit 11c are interfaces configured to receive the video signals (described as "external input signals" in FIG. 2), which are transmitted from external instruments such as STB 3, a video signal recording/playback device (not shown), and the like. For example, first external input unit 11b is an HDMI (registered trademark) terminal, and is connected to STB 3 by a cable conforming to the HDMI (registered trademark).

Video extractor 12 extracts the plurality of image frames at a predetermined frame rate from the frame sequence that composes the video content received by video receiver 11. For example, in a case where the frame rate of the video content is 60 fps (Frames Per Second), video extractor 12 extracts the plurality of image frames at such a frame rate as 30 fps, 20 fps and 15 fps. Note that, if recognizer 100 at a subsequent stage has a processing capability sufficient for processing a video at 60 fps, then video extractor 12 may extract all of the image frames which compose the frame sequence of the video content.

Additional information acquirer 13 operates as a circuit and a communication interface, which acquire information. Additional information acquirer 13 acquires the additional information from advertisement server device 30 based on the recognition result of the video content, which is acquired by recognizer 100.

Video output unit 14 is a display control circuit configured to output the video content, which is received by video receiver 11, to the display screen. For example, the display screen is a display such as a liquid crystal display device, an organic EL (Electro Luminescence), and the like.

Additional information storage 18 is a storage device configured to store the additional information. For example, additional information storage 18 is a nonvolatile storage element such as a flash memory or the like. For example, additional information storage 18 may hold program meta information such as an EPG (Electronic Program Guide) or the like in addition to the additional information acquired from advertisement server device 30.

Additional information display controller 19 is configured to superimpose the additional information, which is acquired from advertisement server device 30, onto the video content (for example, program content) received in video receiver 11. For example, additional information display controller 19 creates a superimposed image by superimposing the additional information onto each image frame included in the program content, and outputs the created superimposed image to video output unit 14. Video output unit 14 outputs the superimposed image to the display screen, whereby the program content onto which the additional information is superimposed is displayed on the display screen.

Recognizer 100 is a processor configured to create the recognition data. Recognizer 100 transmits the created recognition data to content recognition device 20, and receives the recognition result from content recognition device 20.

As shown in FIG. 1, recognizer 100 includes: fingerprint creator 110; fingerprint transmitter 120; and recognition result receiver 130.

Fingerprint creator 110 is an example of a recognition data creation circuit. Fingerprint creator 110 creates the recognition data by using the plurality of image frames extracted by video extractor 12. Specifically, fingerprint creator 110 creates the fingerprint for each of inter-frame points based on a change of the image in each of the inter-frame points. For example, every time of acquiring the image frame extracted by video extractor 12, fingerprint creator 110 calculates a variation of this image frame from an image frame acquired immediately before, and creates the fingerprint based on the calculated variation. The created fingerprint is output to fingerprint transmitter 120.

Note that detailed operations of fingerprint creator 110 and specific examples of the created fingerprints will be described later.

Fingerprint transmitter 120 transmits the recognition data, which is created by fingerprint creator 110, to content recognition device 20. Specifically, fingerprint transmitter 120 transmits the recognition data to content recognition device 20 via HTTP transceiver 17 and communication network 105, which are shown in FIG. 2.

Figure 3:
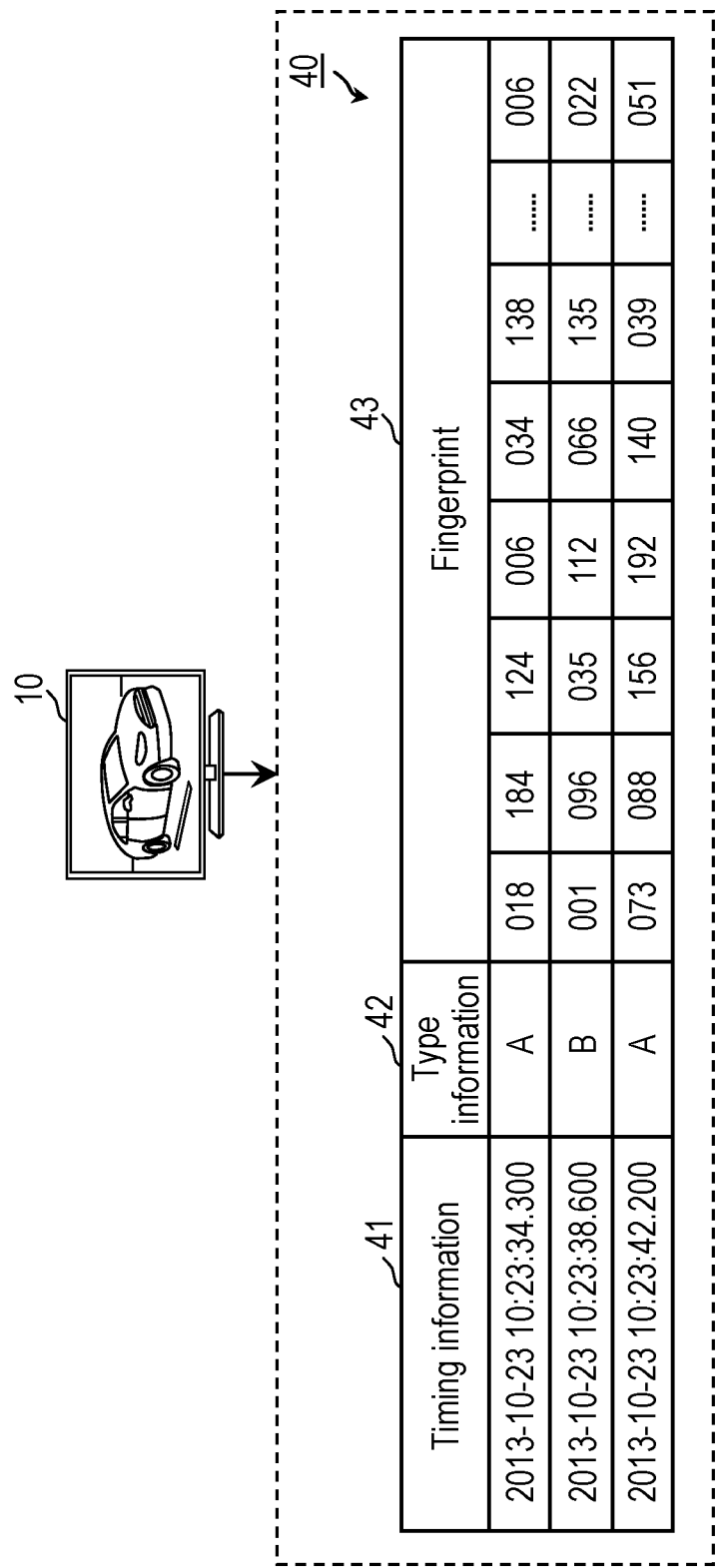
FIG. 3 is a view schematically showing an example of recognition data transmitted by the reception device in the first exemplary embodiment.

FIG. 3 is a view schematically showing an example of recognition data 40 transmitted by reception device 10 in the first exemplary embodiment.

As shown in FIG. 3, recognition data 40 includes: a plurality of fingerprints 43; and timing information 41 and type information 42, which are associated with respective fingerprints 43.

Timing information 41 is information indicating a time when fingerprint 43 is created. Type information 42 is information indicating the type of fingerprint 43. As type information 42, there are two types, which are: information indicating a static fingerprint (hereinafter, also referred to as an "A type") in which the change of the image at the inter-frame point is relatively small; and information indicating a dynamic fingerprint (hereinafter, also referred to as a "B type") in which the change of the image at the inter-frame point is relatively large.

Fingerprint 43 is information (for example, a hash value) created based on the change of the image at each of the inter-frame points between the plurality of image frames included in the frame sequence that composes the video content. As shown in FIG. 3, fingerprints 43 include a plurality of feature quantities such as "018", "184", and so on. Details of fingerprints 43 will be described later.

Fingerprint transmitter 120 transmits recognition data 40 to content recognition device 20. At this time, every time when recognition data 40 is created by fingerprint creator 110, fingerprint transmitter 120 sequentially transmits recognition data 40 thus created.

Moreover, reception device 10 transmits attached information to content recognition device 20. The attached information will be described later. Reception device 10 may transmit the attached information while including the attached information in recognition data 40, or may transmit the attached information independently of recognition data 40. Alternatively, there may be both of attached information transmitted while being included in recognition data 40 and attached information transmitted independently of recognition data 40.

Recognition result receiver 130 receives the recognition result of the video content from content recognition device 20. Specifically, recognition result receiver 130 receives the recognition data from content recognition device 20 via communication network 105 and HTTP transceiver 17, which are shown in FIG. 2.

The recognition result of the video content includes information for specifying the video content. For example, this information is information indicating the broadcast station that broadcasts the video content, information indicating a name of the video content, or the like. Recognition result receiver 130 outputs the recognition result of the video content to additional information acquirer 13.

[1-1-2. Content Recognition Device]

Next, a description is made of content recognition device 20 in this exemplary embodiment with reference to FIG. 1.

As shown in FIG. 1, content recognition device 20 includes: content receiver 21; fingerprint database (hereinafter, referred to as a "fingerprint DB") 22; fingerprint filter 23; fingerprint collator 24; fingerprint history information DB 25; and fingerprint creator 2110. Note that, in content recognition device 20 of FIG. 2, only fingerprint DB 22 is shown, and other blocks are omitted.

Content receiver 21 includes a reception circuit and a decoder, and is configured to receive the video content transmitted from broadcast station 2. In a case where there is a plurality of broadcast stations 2, content receiver 21 receives all the pieces of video content which are individually created and transmitted by the plurality of broadcast stations 2. As mentioned above, the pieces of video content thus received are the video content candidates. Content receiver 21 outputs the received video content candidates to fingerprint creator 2110.

Fingerprint creator 2110 creates recognition data 50 for each of the video content candidates. Specifically, based on a change of such an image-inter-frame point of the frame sequence that composes the received video content candidates, fingerprint creator 2110 creates fingerprint 53 for each image-inter-frame point. Hence, fingerprint creator 2110 creates such fingerprints 53 at a frame rate of the received video content candidates. For example, if the frame rate of the video content candidates is 60 fps, then fingerprint creator 2110 creates 60 fingerprints 53 per one second.

Note that, for example, fingerprint creator 2110 provided in content recognition device 20 may be configured and operate in substantially the same way as fingerprint creator 110 provided in recognizer 100 of reception device 10. Details of fingerprint creator 2110 will be described later with reference to FIG. 7.

Fingerprint DB 22 is a database that stores recognition data 50 of the plurality of video content candidates. In fingerprint DB 22, for example, there are stored identification information (for example, content IDs (IDentifiers)) for identifying the plurality of pieces of video content from each other and recognition data 50 while being associated with each other. Every time when new video content is received in content receiver 21, content recognition device 20 creates new fingerprints 53 in fingerprint creator 2110, and updates fingerprint DB 22.

Fingerprint DB 22 is stored in a storage device (for example, an HDD (Hard Disk Drive) or the like) provided in content recognition device 20. Note that fingerprint DB 22 may be stored in a storage device placed at the outside of content recognition device 20.

Here, recognition data 50 stored in fingerprint DB 22 is described with reference to FIG. 4.

Figure 4:
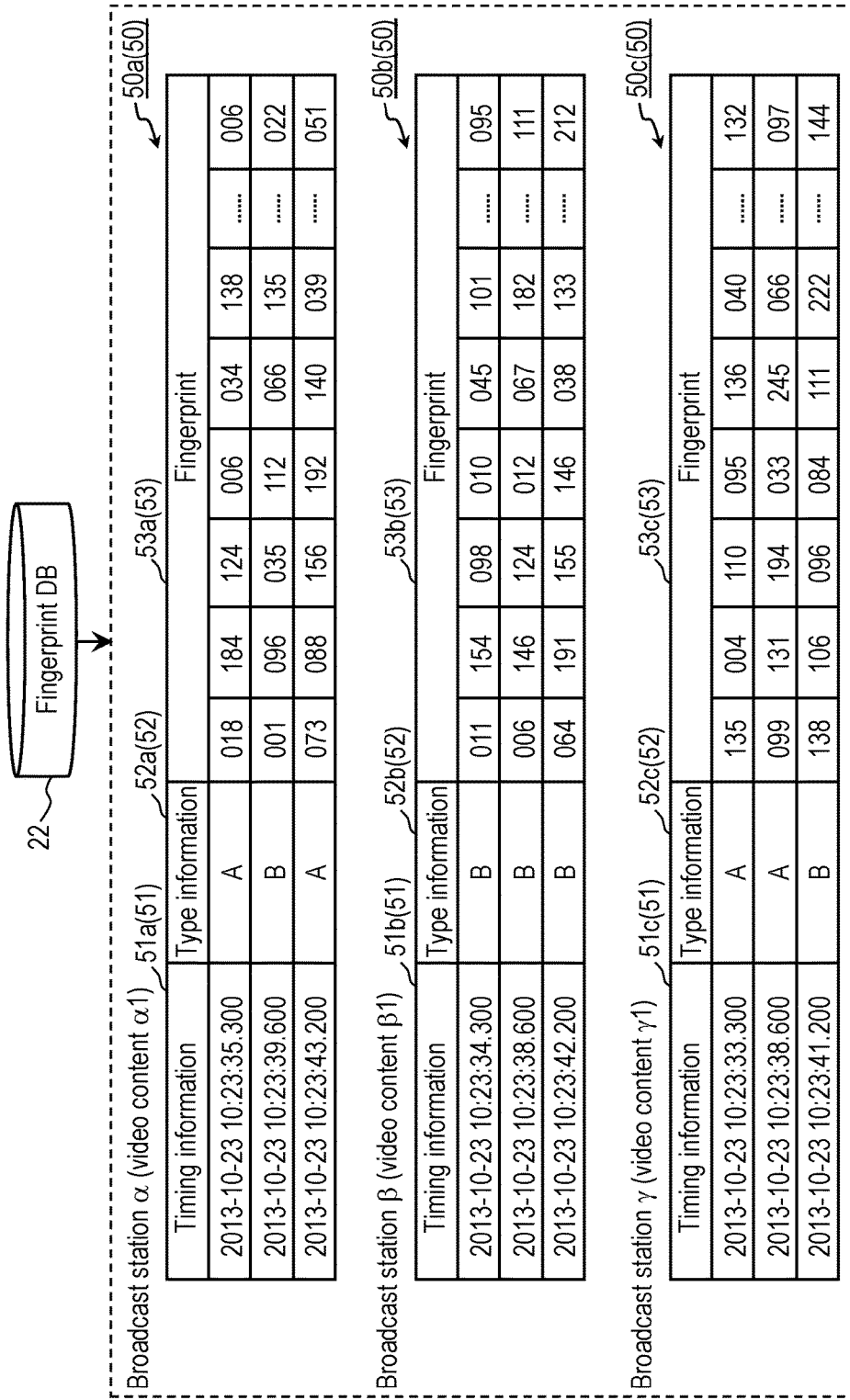
FIG. 4 is a view schematically showing an example of recognition data stored in a fingerprint database in the first exemplary embodiment.

FIG. 4 is a view schematically showing an example of recognition data 50 stored in fingerprint DB 22 in the first exemplary embodiment.

In an example shown in FIG. 4, recognition data 50a, recognition data 50b and recognition data 50c are stored as recognition data 50 in fingerprint DB 22. Recognition data 50a, recognition data 50b and recognition data 50c are examples of recognition data 50. In the example shown in FIG. 4, recognition data 50a is recognition data 50 corresponding to video content α1, recognition data 50b is recognition data 50 corresponding to video content β1, and recognition data 50c is recognition data 50 corresponding to video content γ1. Note that video content α1, video content β1 and video content γ1 are video content candidates broadcasted at substantially the same time from broadcast station α, broadcast station β and broadcast station γ, respectively.

As shown in FIG. 4, recognition data 50a includes a plurality of fingerprints 53a, recognition data 50b includes a plurality of fingerprints 53b, and recognition data 50c includes a plurality of fingerprints 53c. Fingerprints 53a, fingerprints 53b and fingerprints 53c are examples of fingerprint 53. Timing information 51a and type information 52a are associated with fingerprints 53a, timing information 51b and type information 52b are associated with fingerprints 53b, and timing information 51c and type information 52c are associated with fingerprints 53c. Timing information 51a, timing information 51b and timing information 51c are examples of timing information 51, and type information 52a, type information 52b and type information 52c are examples of type information 52. Note that timing information 51 is data similar to timing information 41 shown in FIG. 3 (that is, information indicating the time when fingerprint 53 is created), type information 52 is data similar to type information 42 shown in FIG. 3 (that is, information indicating the type of fingerprint 53), and fingerprint 53 is data similar to fingerprint 43 shown in FIG. 3.

Fingerprint filter 23 of content recognition device 20 is an example of a sorter, and performs sorting (hereinafter, referred to as "filtering") for the video content candidates by using the attached information included in recognition data 40 input from the outside. Specifically, by using the attached information regarding the video content candidate received from broadcast station 2 and the attached information acquired from reception device 10, fingerprint filter 23 filters and narrows recognition data 50 read out from fingerprint DB 22 in order to use recognition data 50 for the collation in the image recognition processing (that is, in order to set recognition data 50 as a collation target). As described above, fingerprint filter 23 sorts the video content candidates, which are set as the collation target of the image recognition processing, by this filtering processing.

The attached information includes type information 42, 52.

By using type information 42, 52, fingerprint filter 23 performs property filtering and property sequence filtering. Details of the property filtering and the property sequence filtering will be described later with reference to FIG. 20 to FIG. 23.

The attached information may include information (hereinafter, referred to as "geographic information") indicating a position of broadcast station 2 that transmits the video content received in reception device 10, or geographic information indicating a position of reception device 10. For example, the geographic information may be information indicating a region specified based on an IP (Internet Protocol) address of reception device 10.

In a case where the attached information includes the geographic information, fingerprint filter 23 performs region filtering processing by using the geographic information. The region filtering processing is processing for excluding, from a collation target of the image recognition processing, a video content candidate broadcasted from broadcast station 2 from which program watching cannot be made in the region indicated by the geographic information.

Moreover, the attached information may include information (hereinafter, referred to as "user information) regarding the user associated with reception device 10. For example, the user information includes information indicating a hobby, taste, age, gender, job or the like of the user. The user information may include information indicating a history of pieces of video content which the user receives in reception device 10.

In a case where the attached information includes the user information, fingerprint filter 23 performs profile filtering processing by using the user information. The profile filtering processing is processing for excluding, from the collation target of the image recognition processing, a video content candidate which does not match the feature, taste and the like of the user which are indicated by the user information.

Note that, in a case where the profile filtering processing is performed in fingerprint filter 23, it is desirable that information indicating a feature of the video content (hereinafter, referred to as "content information") be stored in fingerprint DB 22 in association with fingerprint 53. For example, the content information includes information indicating a feature of a user expected to watch the video content. The content information may include a category of the video content, an age bracket and gender of the user expected to watch the video content, and the like.

Fingerprint collator 24 of content recognition device 20 is an example of a collator. Fingerprint collator 24 collates fingerprint 53, which is included in recognition data 50 sorted by fingerprint filter 23, with fingerprint 43 included in recognition data 40 transmitted from reception device 10 to content recognition device 20, and specifies video content, which corresponds to fingerprint 43 included in recognition data 40, from among the plurality of video content candidates. As described above, to specify the video content based on fingerprint 43 is "recognition of the video content".

Fingerprint collator 24 collates each of the feature quantities of fingerprints 43, which are transmitted from reception device 10 and received in content recognition device 20, with all of feature quantities of fingerprints 53 included in recognition data 50 that is sorted in fingerprint filter 23 and is read out from fingerprint DB 22. In such a way, fingerprint collator 24 recognizes the video content corresponding to recognition data 40 transmitted from reception device 10 to content recognition device 20.

In the example shown in FIG. 3 and FIG. 4, fingerprint collator 24 collates fingerprint 43 with fingerprints 53a, 53b and 53c. Both of fingerprint 43 and fingerprint 53a include a plurality of feature quantities such as "018", "184", and so on, which are common to each other. Hence, as a result of image recognition, fingerprint collator 24 sends, as a response, information indicating video content α1, which corresponds to fingerprint 53a, to reception device 10.

Detailed operations of fingerprint collator 24 will be described later with reference to FIG. 24 to FIG. 28.

Fingerprint history information DB 25 is a database in which pieces of recognition data 40 received from reception device 10 by content recognition device 20 are held on a time-series basis (for example, in order of the reception). Fingerprint history information DB 25 is stored in a storage device (not shown) such as a memory provided in content recognition device 20. When content recognition device 20 receives recognition data 40 from reception device 10, fingerprint history information DB 25 is updated by being added with recognition data 40.

Note that, in order of the reception, fingerprint history information DB 25 may hold recognition data 40 received in a predetermined period by content recognition device 20. For example, the predetermined period may be a period from when content recognition device 20 receives recognition data 40 from reception device 10 until when the image recognition processing that is based on recognition data 40 is ended.

Note that, in a case of being incapable of specifying the video content corresponding to recognition data 40 transmitted from reception device 10 as a result of the image recognition processing, content recognition device 20 may transmit information, which indicates that the image recognition cannot be successfully performed, to reception device 10, or does not have to transmit anything.

Note that content recognition device 20 includes a communicator (not shown), and communicates with reception device 10 via the communicator and communication network 105. For example, content recognition device 20 receives recognition data 40, which is transmitted from reception device 10, via the communicator, and transmits a result of the image recognition, which is based on received recognition data 40, to reception device 10 via the communicator.

[1-1-3. Advertisement Server Device]

Next, a description is made of advertisement server device 30.

Advertisement server device 30 is a Web server configured to distribute the additional information regarding the video content transmitted from broadcast station 2. As shown in FIG. 1, advertisement server device 30 includes additional information DB 31.

Additional information DB 31 is a database in which the information representing the video content and the additional information are associated with each other for each piece of the video content. In additional information DB 31, for example, the content IDs and the additional information are associated with each other.

Additional information DB 31 is stored in a storage device (for example, HDD and the like) provided in advertisement server device 30. Note that additional information DB 31 may be stored in a storage device placed at the outside of advertisement server device 30.

For example, the additional information is information indicating an attribute of an object (for example, commercial goods as an advertisement target, and the like), which is displayed in the video content. For example, the additional information is information regarding the commercial goods, such as specifications of the commercial goods, a dealer (for example, address, URL (Uniform Resource Locator), telephone number and the like of the dealer), manufacturer, method of use, effect and the like.

[1-2. Fingerprint Creator]

Next, a description is made of fingerprint creator 110 in this exemplary embodiment.

Fingerprint creator 110 is configured to create the fingerprint based on at least one of a static region and a dynamic region in the frame sequence that composes the video content. For example, fingerprint creator 110 can be realized by an integrated circuit and the like.

First, the static region and the dynamic region will be described below with reference to FIG. 5 and FIG. 6.

Video extractor 12 of FIG. 2 is configured to extract the plurality of image frames at the predetermined frame rate from the frame sequence that composes the video content. This frame rate is set based on the processing capability and the like of recognizer 100. In this exemplary embodiment, a description is made of an operation example where the frame rate of the video content broadcasted from broadcast station 2 is 60 fps, and video extractor 12 extracts the image frames at three frame rates which are 30 fps, 20 fps and 15 fps. Note that video extractor 12 does not extract the image frames at a plurality of the frame rates. FIG. 5 and FIG. 6 merely show operation examples at different frame rates for use in extraction. In the example shown in FIG. 5 and FIG. 6, video extractor 12 extracts the image frames at any frame rate of 30 fps, 20 fps and 15 fps.

[1-2-1. Static Region]

The static region refers to a region in which the variation in the image between two image frames is smaller than a predetermined threshold (hereinafter, referred to as a "first threshold"). For example, the static region is a background in an image, a region occupied by a subject with a small motion and a small change, or the like. The static region is decided by calculating the variation in the image between the image frames.

Figure 5:
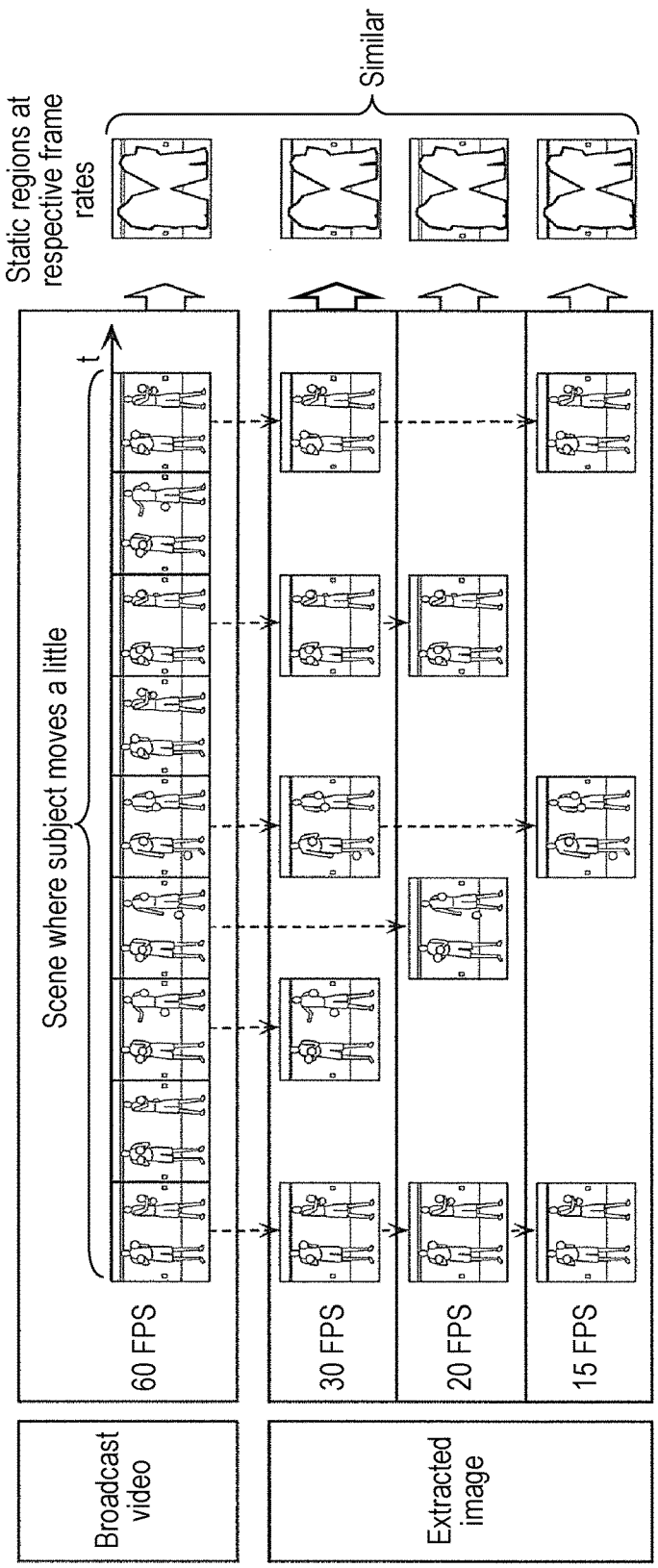
FIG. 5 is a view schematically showing an example of relationships between image frames and static regions at respective frame rates, which are extracted in a video extractor in the first exemplary embodiment.

FIG. 5 is a view schematically showing an example of relationships between the image frames and the static regions at the respective frame rates, which are extracted in video extractor 12 in the first exemplary embodiment.

In video content of a broadcast video, which is shown as an example in FIG. 5, the same scene, which has a video with no large change, is composed of 9 frames. In the video, two subjects move; however, the background does not move.

As shown in FIG. 5, no matter which frame rate of 30 fps, 20 fps and 15 fps video extractor 12 may extract the image frames at, such static regions decided at the respective frame rates are similar to one another, and are similar to the static region decided in the broadcasted video content at 60 fps.

From this, it is understood that, no matter which of 30 fps, 20 fps and 15 fps the frame rate in extracting the image frames may be, it is possible to recognize the video content by collating the static region, which is decided in the image frames extracted in video extractor 12, with the static region, which is decided in the broadcasted video content. The static region is a region occupied by the background, the subject with small motion and change, and the like in the image frames, and is a region highly likely to be present in the image frames during a predetermined period (for example, a few seconds). Hence, highly accurate recognition is possible with use of the static region.

Content recognition device 20 receives the video content broadcasted from broadcast station 2, creates a static fingerprint based on the static region in the video content, and stores the created static fingerprint in fingerprint DB 22. Hence, at a time of receiving the static fingerprint, which is created based on the video content under reception in reception device 10, from reception device 10, content recognition device 20 can recognize the video content under reception in reception device 10.

[1-2-2. Dynamic Region]

The dynamic region refers to a region in which the variation in the image between two image frames is larger than a predetermined threshold (hereinafter, referred to as a "second threshold"). For example, the dynamic region is a region in which there occurs a large change of the image at a time when the scene is switched, or the like.

Figure 6:
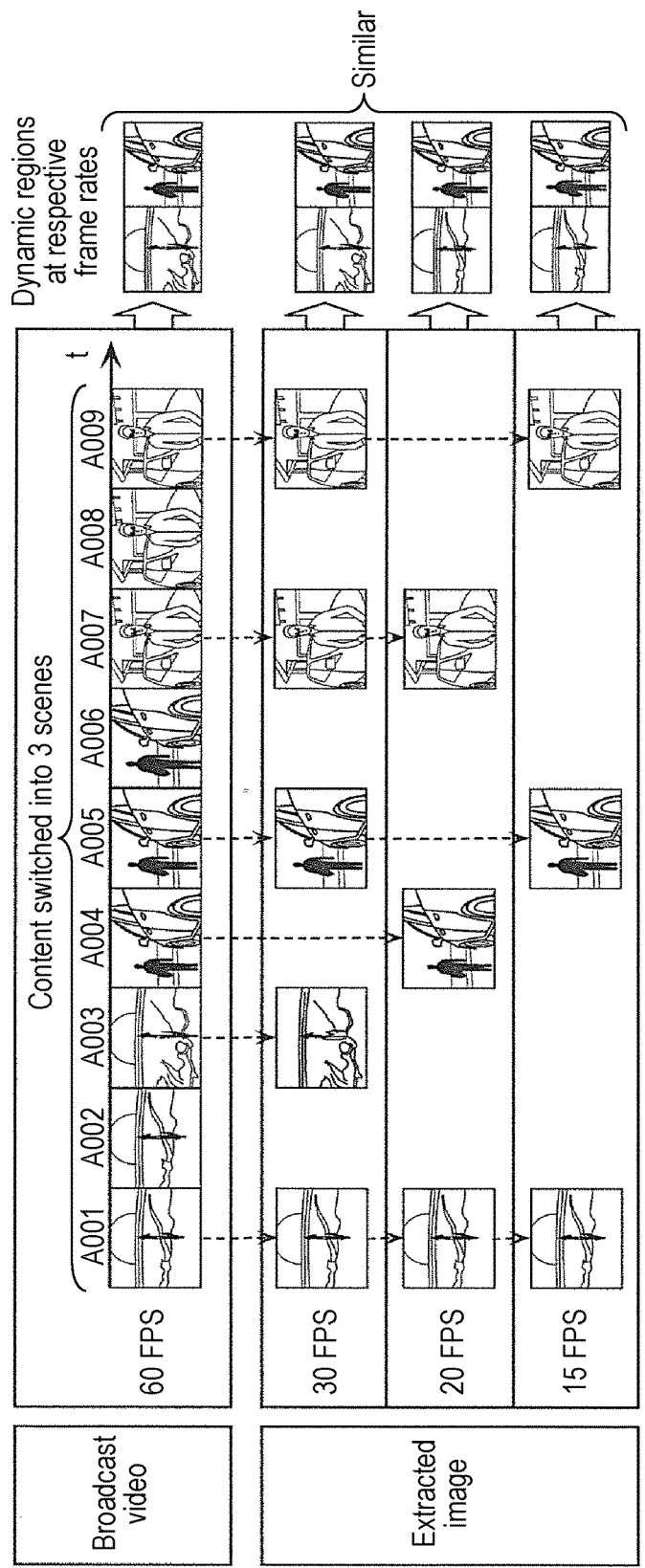
FIG. 6 is a view schematically showing an example of relationships between image frames and dynamic regions at respective frame rates, which are extracted in the video extractor in the first exemplary embodiment.

FIG. 6 is a view schematically showing an example of relationships between the image frames and the dynamic regions at the respective frame rates, which are extracted in video extractor 12 in the first exemplary embodiment.

Video content shown as an example in FIG. 6 includes scene switching. The video content shown in FIG. 6 includes 3 scenes, namely first to third scenes switched with the elapse of time. The first scene includes image frames A001 to A003, the second scene includes image frames A004 to A006, and the third scene includes image frames A007 to A009.

The dynamic region is decided by calculating the variation in the image between the image frames.

In the example shown in FIG. 6, no matter which of 30 fps, 20 fps and 15 fps the frame rate may be, the respective image frames of the 3 scenes are included in the plurality of image frames extracted in video extractor 12. Therefore, when the variation in the image is calculated between two image frames temporally adjacent to each other, a large variation is calculated between the image frames before and after the scene switching. Note that FIG. 6 shows, as an example, the dynamic regions at the scene switching from the first scene to the second scene.

For example, at 30 fps in FIG. 6, the switching between the first scene and the second scene is made between image frame A003 and image frame A005. Hence, at 30 fps in FIG. 6, the dynamic region occurs between image frame A003 and image frame A005. Similarly, at 20 fps in FIG. 6, the dynamic region occurs between image frame A001 and image frame A004, and at 15 fps in FIG. 6, the dynamic region occurs between image frame A001 and image frame A005.

Meanwhile, in the broadcasted video content at 60 fps, the switching between the first scene and the second scene is made between image frame A003 and image frame A004. Hence, in the broadcasted video content, the dynamic region occurs between image frame A003 and image frame A004.

That is to say, the dynamic region in the broadcasted video content at 60 fps is similar to the respective dynamic regions at 30 fps, 20 fps and 15 fps, which are extracted by video extractor 12, as shown in FIG. 6.

As described above, no matter which frame rate of 30 fps, 20 fps and 15 fps video extractor 12 may extract the image frames at, such dynamic regions decided at the respective frame rates are similar to one another, and are similar to the dynamic region decided in the broadcasted video content at 60 fps.

From this, it is understood that, no matter which of 30 fps, 20 fps and 15 fps the frame rate in extracting the image frames may be, it is possible to recognize the video content by collating the dynamic region, which is decided based on the image frames extracted in video extractor 12, with the dynamic region, which is decided in the broadcasted video content. The dynamic region is a region where such a large change of the image occurs by the scene switching and the like, and is a region where a characteristic change of the image occurs. Hence, highly accurate recognition is possible with use of the dynamic region. Moreover, since the recognition is performed based on the characteristic change of the image, the number of frames necessary for the recognition can be reduced in comparison with a conventional case, and a speed of the processing concerned with the recognition can be increased.

Content recognition device 20 receives the video content broadcasted from broadcast station 2, creates a dynamic fingerprint based on the dynamic region in the video content, and stores the created dynamic fingerprint in fingerprint DB 22. Hence, at a time of receiving the dynamic fingerprint, which is created based on the video content under reception in reception device 10, from reception device 10, content recognition device 20 can recognize the video content under reception in reception device 10.

[1-2-3. Configuration]

Figure 7:
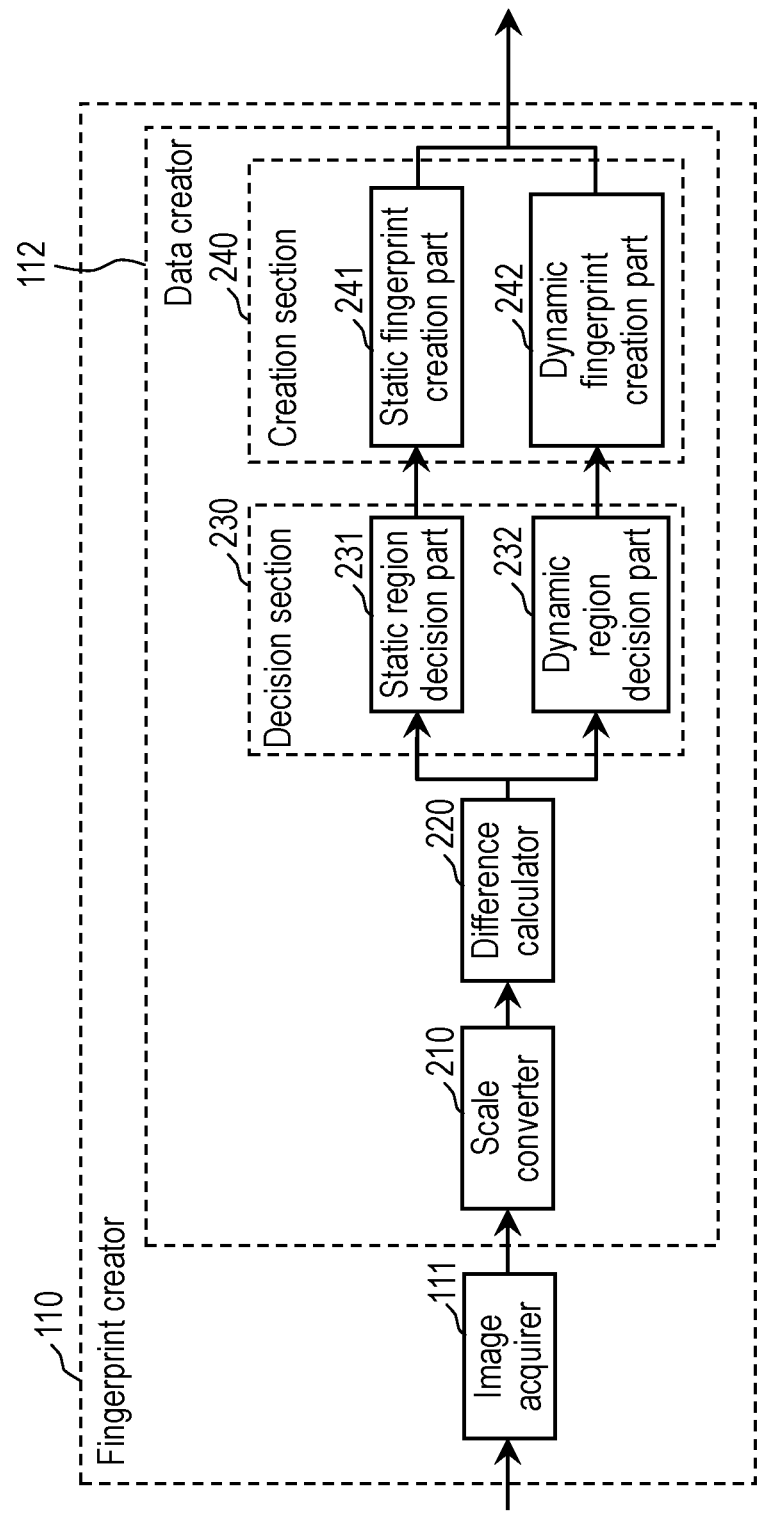
FIG. 7 is a block diagram showing a configuration example of a fingerprint creator in the first exemplary embodiment.

Next, a description is made of fingerprint creator 110 in this exemplary embodiment with reference to FIG. 7.

FIG. 7 is a block diagram showing a configuration example of fingerprint creator 110 in the first exemplary embodiment.

Note that fingerprint creator 2110 provided in content recognition device 20 is configured/operates in substantially the same way as fingerprint creator 110 provided in reception device 10, and accordingly, a duplicate description is omitted.

As shown in FIG. 7, fingerprint creator 110 includes: image acquirer 111; and data creator 112.

Image acquirer 111 acquires the plurality of image frames extracted by video extractor 12.

Data creator 112 creates the fingerprints as the recognition data based on such inter-frame changes of the images between the plurality of image frames acquired by image acquirer 111.

The fingerprints include two types, which are the static fingerprint and the dynamic fingerprint. The static fingerprint is a fingerprint created based on a region (hereinafter, referred to as a "static region") where an inter-frame image variation is smaller than a preset threshold (hereinafter, referred to as a "first threshold"). The dynamic fingerprint is a fingerprint created based on a region (hereinafter, referred to as a "dynamic region") where the inter-frame image variation is larger than a preset threshold (hereinafter, referred to as a "second threshold").

The recognition data includes at least one of the static fingerprint and the dynamic fingerprint. Note that, depending on values of the first threshold and the second threshold, neither the static fingerprint nor the dynamic fingerprint is sometimes created. In this case, the recognition data includes neither the static fingerprint nor the dynamic fingerprint.

As shown in FIG. 7, data creator 112 includes: scale converter 210; difference calculator 220; decision section 230; and creation section 240.

Scale converter 210 executes scale conversion individually for the plurality of image frames acquired by image acquirer 111. Specifically, scale converter 210 executes gray scale conversion and down scale conversion for the respective image frames.

The gray scale conversion refers to conversion of a color image into a gray scale image. Scale converter 210 converts color information of each pixel of the image frame into a brightness value, and thereby converts the color image into the gray scale image. The present disclosure does not limit a method of this conversion. For example, scale converter 210 may extract one element of R, G and B from each pixel, and may convert the extracted element into a brightness value of the corresponding pixel. Note that the brightness value is a numeric value indicating the brightness of the pixel, and is an example of a pixel value. Alternatively, scale converter 210 may calculate the brightness value by using an NTSC-system weighted average method, an arithmetical average method, and the like.

The down scale conversion refers to conversion of the number of pixels which compose one image frame from an original number of pixels into a smaller number of pixels. Scale converter 210 executes the down scale conversion, and converts the image of the image frame into the image composed of a smaller number of pixels. The present disclosure does not limit a method of this conversion. For example, scale converter 210 may divide each image into a plurality of blocks, each of which includes a plurality of pixels, may calculate one numeric value for each of the blocks, and may thereby perform the down scale conversion. At this time, for each of the blocks, scale converter 210 may calculate an average value, intermediate value or the like of the brightness value, and may define the calculated value as a numeric value representing the brightness of the block.

Note that, in this exemplary embodiment, it is defined that scale converter 210 performs both of the gray scale conversion and the down scale conversion; however, the present disclosure is never limited to this configuration. Scale converter 210 may perform only either one or neither of the conversions. That is to say, data creator 112 does not have to include scale converter 210.

Difference calculator 220 creates an image-changed frame from each of the plurality of image frames acquired by image acquirer 111. The image-changed frame is created by calculating a difference of the brightness value between two image frames temporally adjacent to each other (for example, two temporally continuous image frames). Hence, the image-changed frame indicates a variation (hereinafter, referred to as a "brightness-changed value") of the brightness value between the two temporally continuous image frames. Note that the brightness-changed value is an example of a pixel-changed value, and is a value indicating the variation of the brightness value as an example of the pixel value. Difference calculator 220 creates the image-changed frame by using the image frames subjected to the gray scale conversion and the down scale conversion by scale converter 210.

Decision section 230 includes: static region decision part 231; and dynamic region decision part 232.

Decision section 230 compares an absolute value of each brightness-changed value of such image-changed frames, which are created in difference calculator 220, with the first threshold and the second threshold. Then, there is decided at least one of the static region in which the absolute value of the brightness-changed value is smaller than the first threshold and the dynamic region in which the absolute value of the brightness-changed value is larger than the second threshold. Specifically, decision section 230 individually calculates such absolute values of the respective brightness-changed values of the image-changed frames, and individually executes a determination as to whether or not the absolute values are smaller than the first threshold and a determination as to whether or not the absolute values are larger than the second threshold, and thereby decides the static region and the dynamic region.

Note that the calculation of the absolute values of the brightness-changed values may be performed in difference calculator 220.

The first threshold and the second threshold are set at predetermined numeric values, and are decided based on a range which the brightness-changed values can take. For example, the first threshold and the second threshold are determined within a range of 0% to 20% of a maximum value of the absolute values of the brightness-changed values. As a specific example, in a case where the maximum value of the absolute values of the brightness-changed values is 255, then the first threshold is "1", and the second threshold is "20". Note that these numeric values are merely an example. It is desirable that the respective thresholds be set as appropriate. The first threshold and the second threshold may be the same numeric value, or may be different numeric values. Moreover, it is desirable that the second threshold is larger than the first threshold; however, the second threshold may be smaller than the first threshold.

Static region decision part 231 provided in decision section 230 compares the respective absolute values of the brightness-changed values of the image-changed frames with the first threshold, and determines whether or not the absolute values are smaller than the first threshold, and thereby decides the static region. For example, in a case where the first threshold is "1", static region decision part 231 defines a region in which the brightness-changed value is "0" as the static region. The region in which the brightness-changed value is "0" is a region in which the brightness value is not substantially changed between two temporally adjacent image frames.

Dynamic region decision part 232 provided in decision section 230 compares the respective absolute values of the brightness-changed values of the image-changed frames with the second threshold, and determines whether or not the absolute values are larger than the second threshold, and thereby decides the dynamic region. For example, in a case where the second threshold is "20", dynamic region decision part 232 defines a region in which the absolute value of the brightness-changed value is "21" or more as the dynamic region. The region in which the absolute value of the brightness-changed value is "21" or more is a region in which the brightness value is changed by 21 or more between two temporally adjacent image frames.

Note that, for the determination, static region decision part 231 and dynamic region decision part 232 use the absolute values of the brightness-changed values of the image-changed frames, which are based on the image frames subjected to the gray scale conversion and the down scale conversion in scale converter 210.

Creation section 240 includes: static fingerprint creation part 241; and dynamic fingerprint creation part 242.

Static fingerprint creation part 241 determines whether or not the static region output from static region decision part 231 occupies a predetermined ratio (hereinafter, referred to as a "first ratio") or more in each image-changed frame. Then, in a case where the static region occupies the first ratio or more, static fingerprint creation part 241 creates the static fingerprint as below based on the static region. Otherwise, static fingerprint creation part 241 does not create the static fingerprint. Static fingerprint creation part 241 creates the static fingerprint in a case where the occupied range of the static region in the image-changed frame is large, in other words, in a case where the change of the image is small between two temporally adjacent image frames.

Static fingerprint creation part 241 creates a static frame by filtering, in the static region, one of the two image frames used for creating the image-changed frame. This filtering will be described later. Then, static fingerprint creation part 241 defines the created static frame as the static fingerprint. The static frame is a frame including a brightness value of the static region of one of the two image frames used for creating the image-changed frame, and in which a brightness value of other region than the static region is a fixed value (for example, "0"). Details of the static frame will be described later.

Dynamic fingerprint creation part 242 determines whether or not the dynamic region output from dynamic region decision part 232 occupies a predetermined ratio (hereinafter, referred to as a "second ratio") or more in each image-changed frame. Then, in a case where the dynamic region occupies the second ratio or more, dynamic fingerprint creation part 242 creates the dynamic fingerprint as below based on the dynamic region. Otherwise, dynamic fingerprint creation part 242 does not create the dynamic fingerprint. Dynamic fingerprint creation part 242 creates the dynamic fingerprint in a case where the occupied range of the dynamic region in the image-changed frame is large, in other words, in a case where the change of the image is large between two temporally adjacent image frames.

Dynamic fingerprint creation part 242 creates a dynamic frame by filtering the image-changed frame in the dynamic region. This filtering will be described later. Then, dynamic fingerprint creation part 242 defines the created dynamic frame as the dynamic fingerprint. The dynamic frame is a frame including a brightness value of the dynamic region of the image-changed frame, and in which a brightness value of other region than the dynamic region is a fixed value (for example, "0"). Details of the dynamic frame will be described later.

Note that predetermined numeric values are set for the first ratio and the second ratio. For example, the first ratio and the second ratio are determined within a range of 20% to 40%. As a specific example, the first ratio and the second ratio are individually 30%. Note that these numeric values are merely an example. It is desirable that the first ratio and the second ratio be set as appropriate. The first ratio and the second ratio may be the same numeric value, or may be different numeric values.

By the configuration described above, fingerprint creator 110 creates either one of the static fingerprint and the dynamic fingerprint for each of the image frames. Otherwise, fingerprint creator 110 does not create either of these. That is to say, in a case of acquiring N pieces of the image frames from the video content, fingerprint creator 110 creates fingerprints including at most N−1 pieces of the fingerprints as a sum of the static fingerprints and the dynamic fingerprints.

Note that it is highly likely that the respective static fingerprints created in the same continuous scene will be similar to one another. Hence, in a case where the plurality of continuous image frames reflects the same scene, static fingerprint creation part 241 may select and output one static fingerprint from the plurality of static fingerprints created from the same scene.

In the conventional technology, processing with a relatively heavy load, such as outline sensing, is required for the collation of the image frames. However, in this exemplary embodiment, the fingerprint is created based on the change of the image between the image frames. The detection of the change of the image between the image frames is executable by processing with a relatively light load, such as calculation of the difference, or the like. That is to say, fingerprint creator 110 in this exemplary embodiment can create the fingerprint by the processing with a relatively light load. These things are also applied to fingerprint creator 2110.

[1-3. Operation]

Next, a description is made of content recognition system 1 in this exemplary embodiment with reference to FIG. 8 to FIG. 28.

[1-3-1. Overall Operation]

Figure 8:
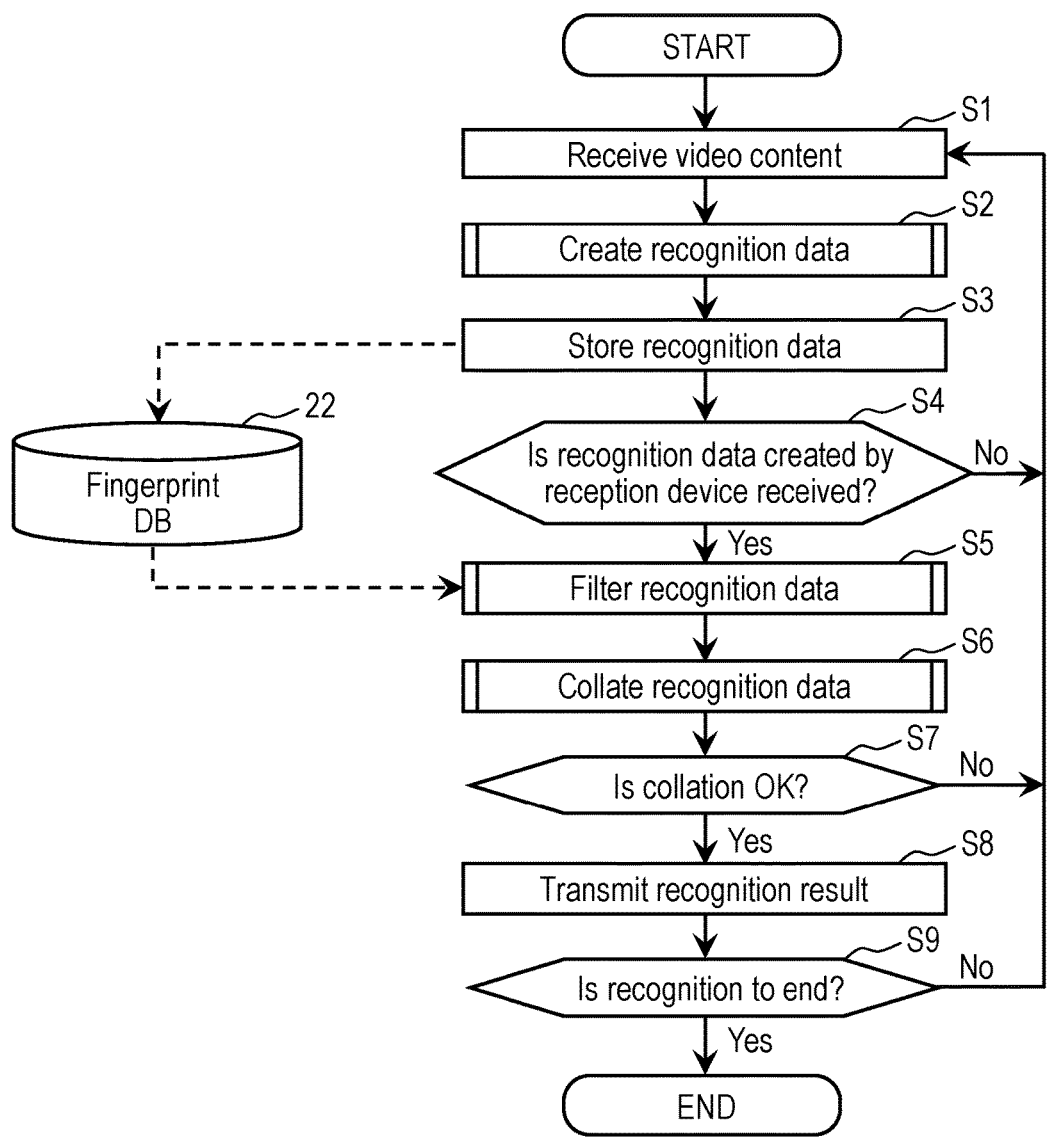
FIG. 8 is a flowchart showing an operation example of a content recognition device provided in the content recognition system in the first exemplary embodiment.

First, a description is made of an overall operation of content recognition system 1 in this exemplary embodiment with reference to FIG. 8.

FIG. 8 is a flowchart showing an operation example of content recognition device 20 provided in content recognition system 1 in the first exemplary embodiment.

First, content receiver 21 receives the video content from broadcast station 2 (Step S1).

Content receiver 21 receives the plurality of pieces of video content under broadcast from the plurality of broadcast stations 2 before reception device 10 receives these pieces of video content. Content receiver 21 may receive in advance the pieces of video content before being broadcasted. As mentioned above, content receiver 21 receives the plurality of respective pieces of video content as the video content candidates.

Next, fingerprint creator 2110 creates the recognition data (Step S2).

Specifically, fingerprint creator 2110 creates the fingerprints corresponding to the plurality of respective video content candidates received by content receiver 21. Details of the creation of the fingerprints will be described later with reference to FIG. 9.

Next, fingerprint creator 2110 stores the recognition data, which is created in Step S2, in fingerprint DB 22 (Step S3).

Specifically, as shown as an example in FIG. 4, fingerprint creator 2110 associates fingerprints 53, which are created in Step S2, with timing information 51 and type information 52, and stores those associated data as recognition data 50 in fingerprint DB 22. At this time, for example, fingerprint creator 2110 may store fingerprints 53 for each of broadcast stations 2. Moreover, fingerprint creator 2110 may store the content information, which is used for the profile filtering, in association with fingerprints 53.

Content recognition device 20 determines whether or not recognition data 40 is received from reception device 10 (Step S4).

In a case where content recognition device 20 determines that recognition data 40 is not received from reception device 10 (No in Step S4), content recognition device 20 returns to Step S1, and executes the processing on and after Step S1. Content recognition device 20 repeats the processing of Step S1 to Step S3 until receiving recognition data 40 from reception device 10.

In a case where content recognition device 20 determines that recognition data 40 is received from reception device 10 (Yes in Step S4), fingerprint filter 23 performs the filtering for recognition data 50 stored in fingerprint DB 22 (Step S5). Details of the filtering will be described later with reference to FIG. 19.

Next, fingerprint collator 24 collates recognition data 40, which is received from reception device 10 in Step S4, with recognition data 50, which is filtered in Step S5 (Step S6). Details of the collation will be described later with reference to FIG. 24.

Fingerprint collator 24 determines whether or not such collation in Step S6 is accomplished (Step S7).

In a case where fingerprint collator 24 cannot accomplish the collation in Step S6 (No in Step S7), content recognition device 20 returns to Step S1, and executes the processing on and after Step S1.

In a case where fingerprint collator 24 has been accomplished the collation in Step S6 (Yes in Step S7), content recognition device 20 transmits a result of the collation in Step S6 (that is, a result of the image recognition) to reception device 10 (Step S8).

Reception device 10 receives the result of the image recognition from content recognition device 20, and can thereby execute processing such as the superimposed display of the additional information based on the received result, or the like.

After Step S8, content recognition device 20 determines whether or not to end the recognition processing for the video content (Step S9). The present disclosure does not limit the determination method in Step S9. For example, content recognition device 20 may be set so as to make the determination of Yes in Step S9 when recognition data 40 is not transmitted from reception device 10 during a predetermined period. Alternatively, content recognition device 20 may be set so as to make the determination of Yes in Step S9 at a time of receiving information, which indicates the end of the processing, from reception device 10.

When new recognition data 40 is transmitted from reception device 10 to content recognition device 20, content recognition device 20 does not end the recognition processing for the video content (No in Step S9), returns to Step S1, and repeats the series of processing on and after Step S1. In a case of ending the recognition processing for the video content (Yes in Step S9), content recognition device 20 ends the processing regarding the image recognition.

[1-3-2. Creation of Recognition Data]

Next, details of the processing (processing in Step S2 of FIG. 8) when the recognition data is created in this exemplary embodiment are described with reference to FIG. 9 to FIG. 18.

First, an overview of the processing at a time of creating the recognition data is described with reference to FIG. 9.

Figure 9:
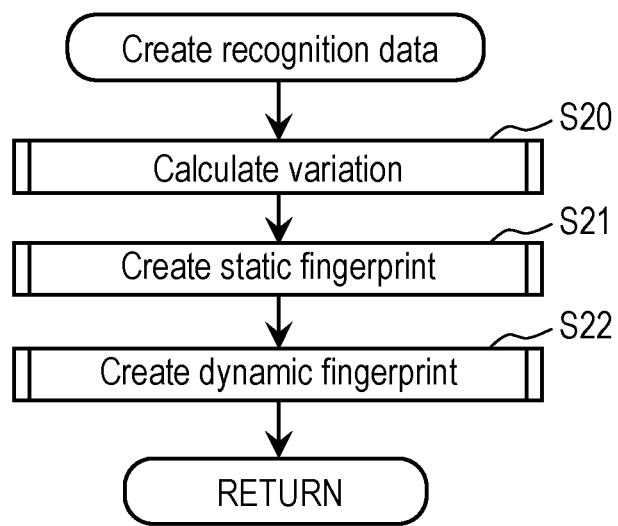
FIG. 9 is a flowchart showing an example of processing at a time of creating the recognition data in the first exemplary embodiment.

FIG. 9 is a flowchart showing an example of the processing at the time of creating the recognition data in the first exemplary embodiment. The flowchart of FIG. 9 shows an overview of the processing executed in Step S2 of FIG. 8.

First, with regard to the respective image frames of the plurality of video content candidates received by content receiver 21 in Step S1, fingerprint creator 2110 calculates the variations in the image between the image frames (Step S20). Details of such a calculation of the variations in the image will be described later with reference to FIG. 11 to FIG. 13.

Note that fingerprint creator 110 provided in reception device 10 calculates the variations in the image between the image frames from the plurality of image frames extracted in video extractor 12 (Step S20). Fingerprint creator 110 differs from fingerprint creator 2110 in this point. However, except for this point, fingerprint creator 110 and fingerprint creator 2110 perform substantially the same operation.

Next, fingerprint creator 2110 creates the static fingerprints (Step S21).

Fingerprint creator 2110 decides the static region based on the image-changed frame, and creates the static fingerprint based on the decided static region. Details of the creation of the static fingerprints will be described later with reference to FIG. 14 and FIG. 15.

Next, fingerprint creator 2110 creates the dynamic fingerprints (Step S22).

Fingerprint creator 2110 decides the dynamic region based on the image-changed frame, and creates the dynamic fingerprints based on the decided dynamic region. Details of the creation of the dynamic fingerprints will be described later with reference to FIG. 16 to FIG. 18.

Note that either of the processing for creating the static fingerprints in Step S21 and the processing for creating the dynamic fingerprints in Step S22 may be executed first, or alternatively, both thereof may be executed simultaneously.

Here, the changes of the image frames in the process of the recognition data creating processing are described with reference to an example in FIG. 10.

Figure 10:
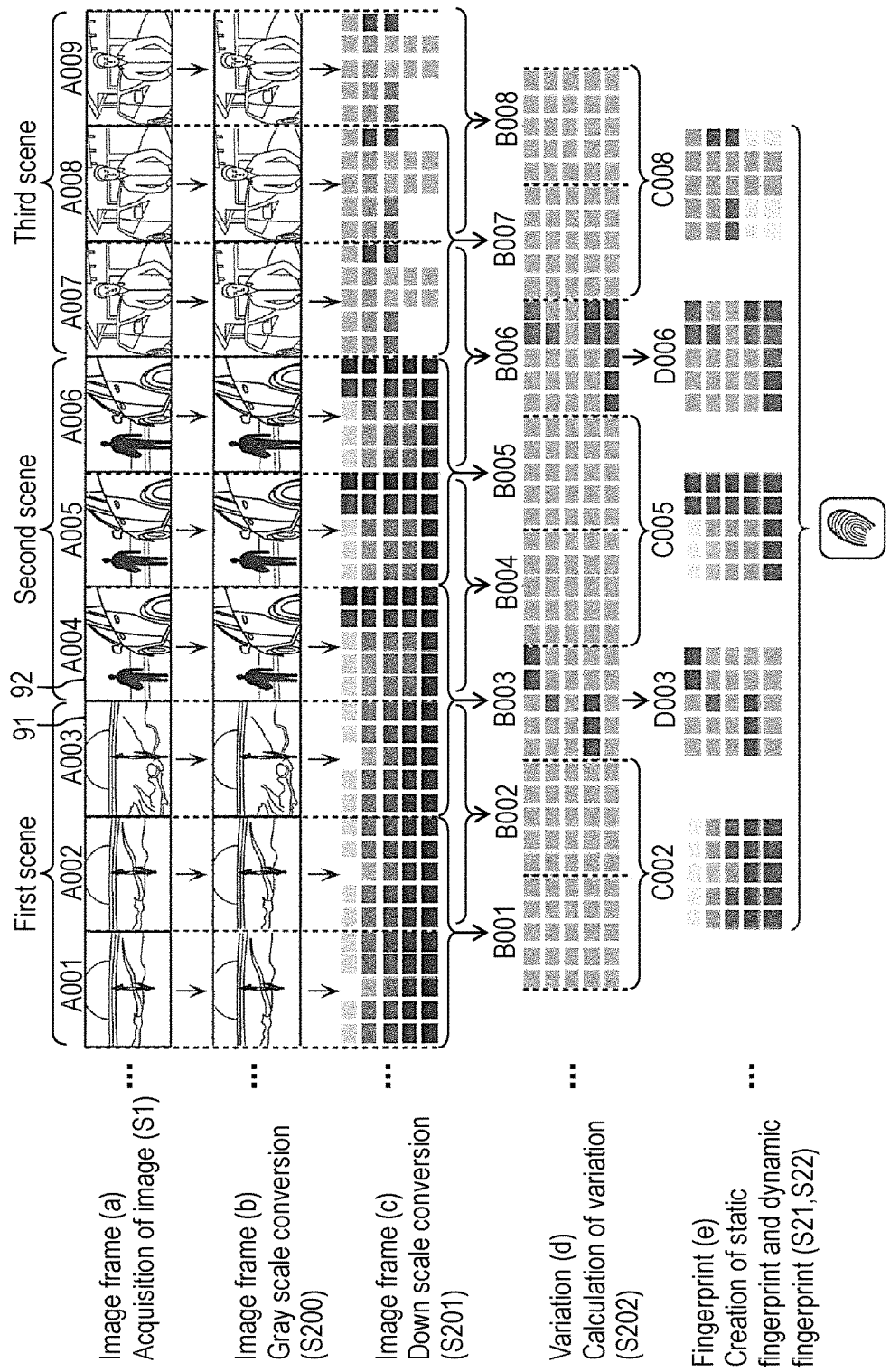
FIG. 10 is a view schematically showing an example of changes of image frames in a process of recognition data creating processing in the first exemplary embodiment.

FIG. 10 is a view schematically showing an example of the changes of the image frames in the process of the recognition data creating processing in the first exemplary embodiment.

Note that FIG. 10 schematically shows: a plurality of image frames (a) included in the video content candidate acquired in Step S1 by content receiver 21; image frames (b) subjected to the gray scale conversion in Step S200 to be described later; image frames (c) subjected to the down scale conversion in Step S201 to be described later; variations (d) calculated in Step S202 to be described later; and fingerprints (e) created in Step S21 and Step S22.

First, the image frames (a) in FIG. 10 show an example when 9 image frames A001 to A009 are acquired from the video content candidate in Step S1 shown in FIG. 8. In the example shown in FIG. 10, each of image frames A001 to A009 is included in any of 3 scenes which are a first scene to a third scene. Image frames A001 to A003 are included in the first scene, image frames A004 to A006 are included in the second scene, and image frames A007 to A009 are included in the third scene. Image frames A001 to A009 are so-called color images, and include color information.

Next, the image frames (b) in FIG. 10 show an example when each of 9 image frames A001 to A009 extracted in Step S1 of FIG. 8 is subjected to the gray scale conversion in Step S200 of FIG. 11 to be described later. In such a way, the color information included in image frames A001 to A009 is converted into the brightness value for each of the pixels.

Next, the image frames (c) in FIG. 10 show an example when each of 9 image frames A001 to A009 subjected to the gray scale conversion in Step S200 of FIG. 11 to be described later is subjected to the down scale conversion in Step S201 of FIG. 11 to be described later. In such a way, the number of pixels which compose the image frames is reduced. Note that the image frames (c) in FIG. 10 show an example when a single image frame is divided into 25 blocks as a product of 5 blocks by 5 blocks. This can be translated that the number of pixels which compose a single image frame is downscaled to 25. A brightness value of each of the blocks shown in the image frames (c) of FIG. 10 is calculated from brightness values of the plurality of pixels which compose each block. The brightness value of each block can be calculated by calculating an average value, intermediate value or the like of the brightness values of the plurality of pixels which compose the block.

Note that, in the image frames (c) of FIG. 10, a gray scale of each block corresponds to a magnitude of the brightness value. As the brightness value is larger, the block is shown to be darker, and as the brightness value is smaller, the block is shown to be lighter.

Next, the variations (d) in FIG. 10 show an example when 8 image-changed frames B001 to B008 are created in Step S202 of FIG. 11, which is to be described later, from 9 image frames A001 to A009 subjected to the down scale conversion in Step S201 of FIG. 11 to be described later. In Step S202, the variation of the brightness value (that is, the brightness-changed value) is calculated between two temporally adjacent image frames, whereby a single image-changed frame is created. In Step S202, for example, image-changed frame B001 is created from image frame A001 and image frame A002, which are subjected to the down scale conversion.

Note that, in the variations (d) of FIG. 10, the gray scale of each block which composes each image-changed frame corresponds to the brightness-changed value of the image-changed frame, that is, to the variation of the brightness value between two image frames subjected to the down scale conversion. As the variation of the brightness value is larger, the block is shown to be darker, and as the variation of the brightness value is smaller, the block is shown to be lighter.

Next, the fingerprints (e) in FIG. 10 show an example when totally 5 static fingerprints and dynamic fingerprints are created from 8 image-changed frames B001 to B008 created in Step S202 of FIG. 11 to be described later.

In the example shown in FIG. 10, both of image-changed frame B001 and image-changed frame B002 are created from image frames A001 to A003 included in the same scene. Therefore, image-changed frame B001 is similar to image-changed frame B002. Hence, in Step S21, one static fingerprint C002 can be created from image-changed frame B001 and image-changed frame B002. The same also applies to image-changed frame B004 and image-changed frame B005, and to image-changed frame B007 and image-changed frame B008.

Meanwhile, in the example shown in FIG. 10, image-changed frame B003 is created from two image frames A003, A004 between which the scene is switched. Hence, in Step S22, one dynamic fingerprint D003 can be created from image-changed frame B003. The same also applies to image-changed frame B006.

In the example shown in FIG. 10, the fingerprints of the video content, which are created from image frames A001 to A009 as described above, include 3 static fingerprints C002, C005, C008, and 2 dynamic fingerprints D003, D006.

As described above, the created fingerprints of the video content include at least two of one or more static fingerprints and one or more dynamic fingerprints. The fingerprints of the video content may be composed of only two or more static fingerprints, may be composed of only two or more dynamic finger prints, or may be composed of one or more static fingerprints and one or more dynamic fingerprints.

Note that, in the fingerprints (e) of FIG. 10, the gray scale of each block which composes the static fingerprint or the dynamic fingerprint corresponds to the magnitude of the brightness value of the block.

[1-3-3. Scale Conversion and Calculation of Variation]

Next, details of the processing when the variation between the image frames is calculated in this exemplary embodiment are described with reference to FIG. 11 to FIG. 13.

Figure 11:
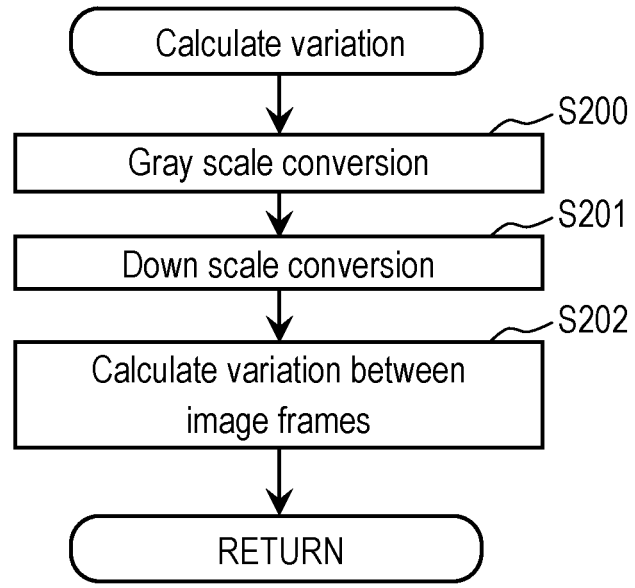
FIG. 11 is a flowchart showing an example of processing for calculating a variation between the image frames in the first exemplary embodiment.

FIG. 11 is a flowchart showing an example of the processing for calculating the variation between the image frames in the first exemplary embodiment. The flowchart of FIG. 11 shows an overview of the processing executed in Step S20 of FIG. 9.

Figure 12:
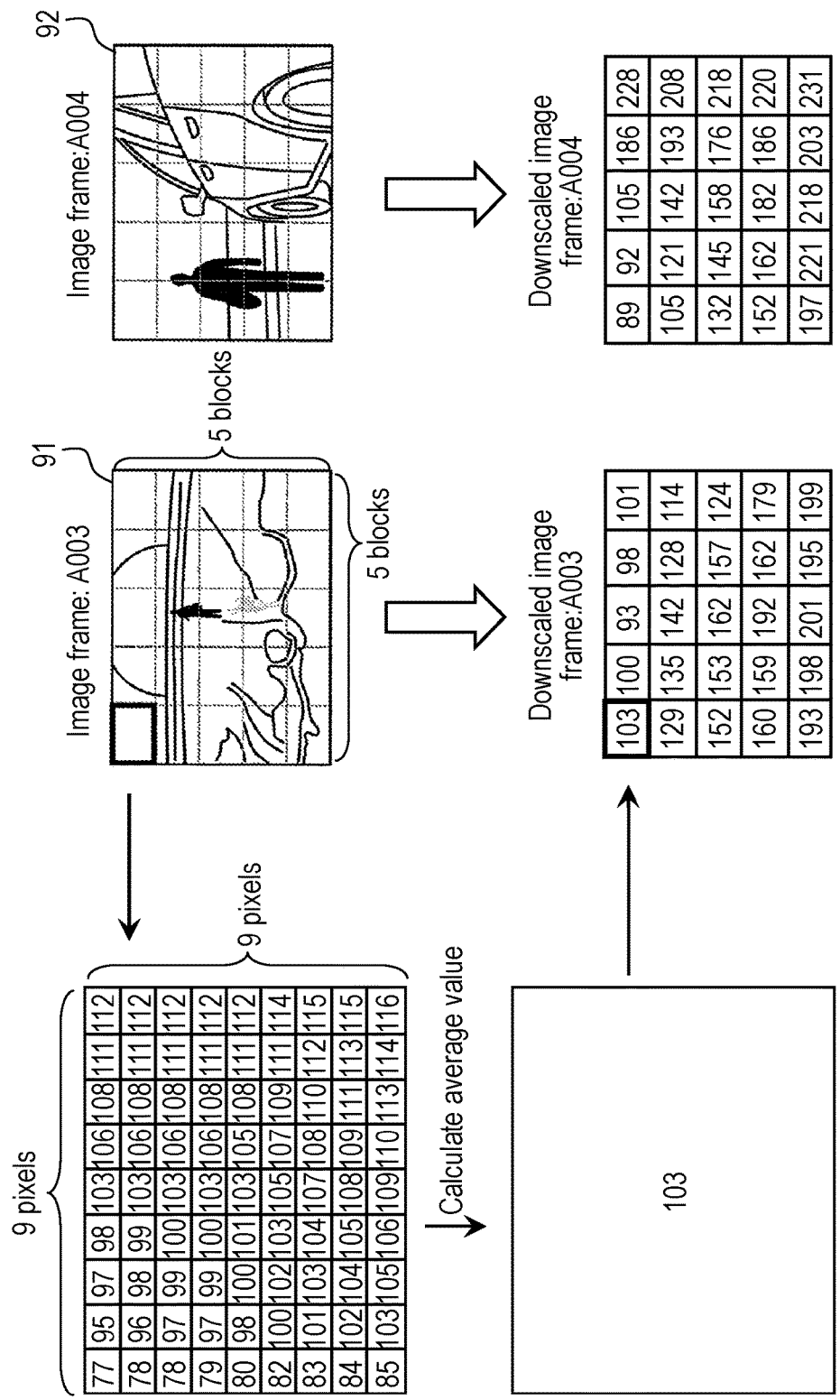
FIG. 12 is a view schematically showing an example of down scale conversion processing for the image frames in the first exemplary embodiment.

FIG. 12 is a view schematically showing an example of down scale conversion processing for the image frames in the first exemplary embodiment.

Figure 13:
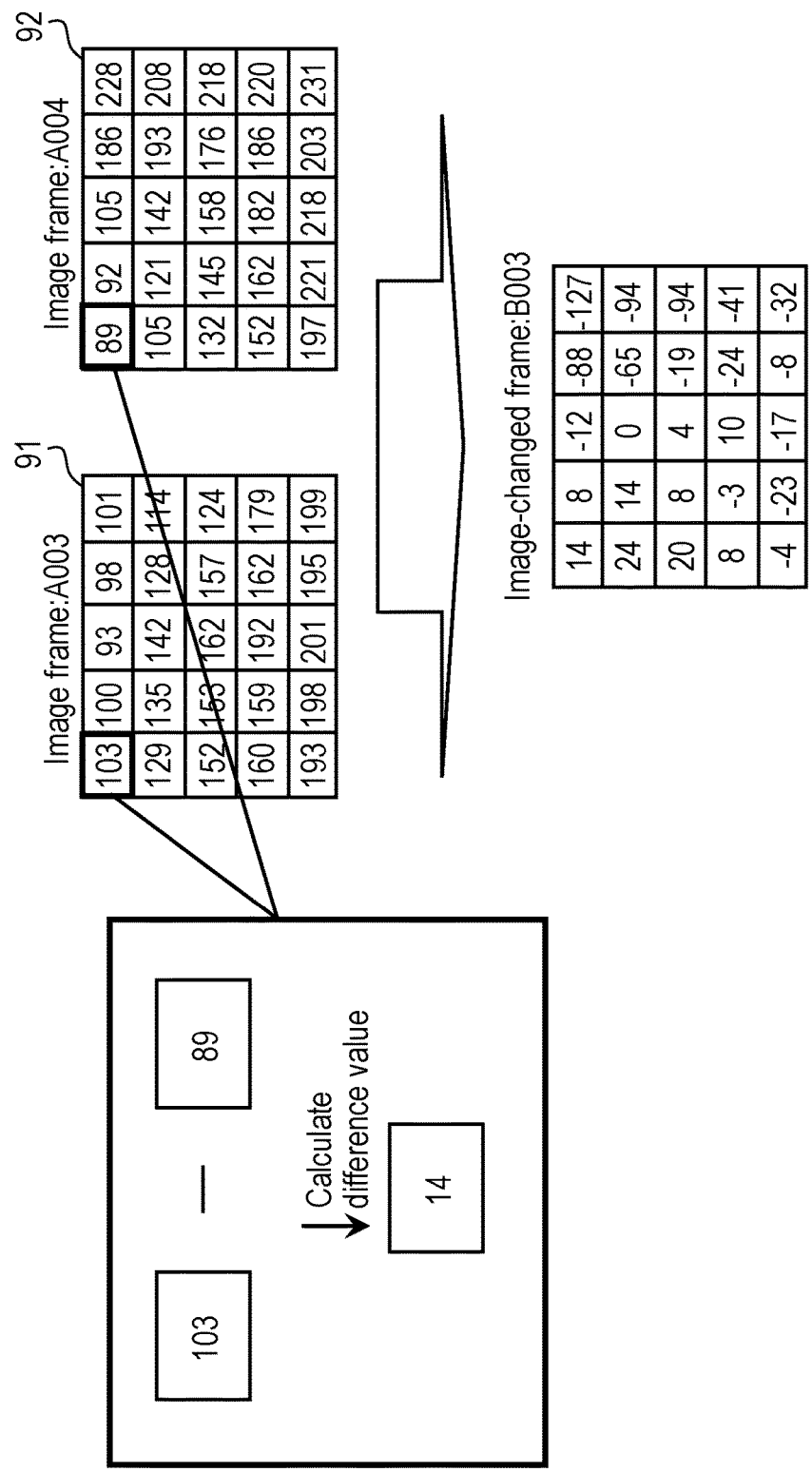
FIG. 13 is a view schematically showing an example of the processing for calculating the variation between the image frames in the first exemplary embodiment.

FIG. 13 is a view schematically showing an example of the processing for calculating the variation between the image frames in the first exemplary embodiment.

The flowchart of FIG. 11 is described. First, scale converter 210 shown in FIG. 7 performs the gray scale conversion for the plurality of extracted image frames (Step S200).

Scale converter 210 individually converts one of the plurality of extracted image frames and an image frame, which is temporally adjacent to the image frame, into gray scales. Note that, in this exemplary embodiment, the extracted one image frame is defined as "frame 91", and the image frame temporally adjacent to frame 91 is defined as "frame 92". Scale converter 210 converts color information of frames 91, 92 into brightness values, for example, based on the NTSC-system weighted average method.

Note that, in this exemplary embodiment, an image frame immediately after frame 91 is defined as frame 92. However, the present disclosure is never limited to this configuration. Frame 92 may be an image frame immediately before frame 91. Alternatively, frame 92 may be an image frame that is a third or more to frame 91, or may be an image frame that is a third or more from frame 91.

Next, scale converter 210 performs the down scale conversion for the two image frames subjected to the gray scale conversion (Step S201).

FIG. 12 shows an example of performing the down scale conversion for image frames A003, A004. In the example shown in FIG. 12, image frame A003 corresponds to frame 91, and image frame A004 corresponds to frame 92.

For example, as shown in FIG. 12, scale converter 210 divides image frame A003 into 25 blocks as a product of 5 blocks by 5 blocks. In the example shown in FIG. 12, it is assumed that each of the blocks includes 81 pixels as a product of 9 pixels by 9 pixels. For example, as shown in FIG. 12, an upper left block of image frame A003 is composed of 81 pixels having brightness values such as "77", "95", and so on. Note that these numeric values are merely an example, and the present disclosure is never limited to these numeric values.

For example, for each of the blocks, scale converter 210 calculates an average value of the brightness values of the plurality of pixels included in each block, and thereby calculates a brightness value representing the block. In the example shown in FIG. 12, an average value of the brightness values of 81 pixels which compose the upper left block of image frame A003 is calculated, whereby a value "103" is calculated. The value (average value) thus calculated is a brightness value representing the upper left block. In such a manner as described above, with regard to each of all the blocks which compose image frame A003, scale converter 210 calculates the brightness value representing each block.

In such a way, the number of pixels which compose the image frame can be converted into the number of blocks (that is, can be downscaled). In the example shown in FIG. 12, an image frame having 45 pixels×45 pixels is subjected to the down scale conversion into an image frame composed of 25 blocks as a product of 5 blocks by 5 blocks. This can be translated that the image frame having 45 pixels×45 pixels is subjected to the down scale conversion into the image frame having 5 pixels×5 pixels.

In the example shown in FIG. 12, image frame A003 already subjected to the down scale conversion is composed of 25 blocks including the average values such as "103", "100", and so on. This may be translated that image frame A003 already subjected to the down scale conversion is composed of 25 pixels having the brightness values such as "103", "100". Image frame A004 is also subjected to the down scale conversion in a similar way. Note that, in this exemplary embodiment, each block that composes the image frame already subjected to the down scale conversion is sometimes expressed as a "pixel", and the average value of the brightness calculated for each of the blocks is sometimes expressed as a "brightness value of the pixel of the image frame already subjected to the down scale conversion".

Next, difference calculator 220 shown in FIG. 7 calculates differences of the brightness values between frame 91 and frame 92, which are already subjected to the down scale conversion, and creates the image-changed frame composed of the differences of the brightness values (that is, brightness-changed values) (Step S202).

For example, in the example shown in FIG. 13, difference calculator 220 individually calculates differences between the brightness values of the respective pixels which compose frame 91 already subjected to the down scale conversion and the brightness values of the respective pixels which compose fame 92 already subjected to the down scale conversion. At this time, difference calculator 220 calculates each difference of the brightness value between pixels located at the same position. For example, difference calculator 220 subtracts the upper left brightness value "89" of image frame A004 from the upper left brightness value "103" of image frame A003, and calculates the upper left brightness-changed value "14" of image-changed frame B003.

In such a manner as described above, difference calculator 220 calculates the differences of the brightness values for all of the pixels (that is, all of the blocks) between the two image frames already subjected to the down scale conversion to create an image-changed frame. In the example shown in FIG. 12, image-changed frame B003 is created from image frames A003, A004 already subjected to the down scale conversion.

[1-3-4. Creation of Static Fingerprint]

Next, details of the processing when the static fingerprint is created in this exemplary embodiment are described with reference to FIG. 14, FIG. 15.

Figure 14:
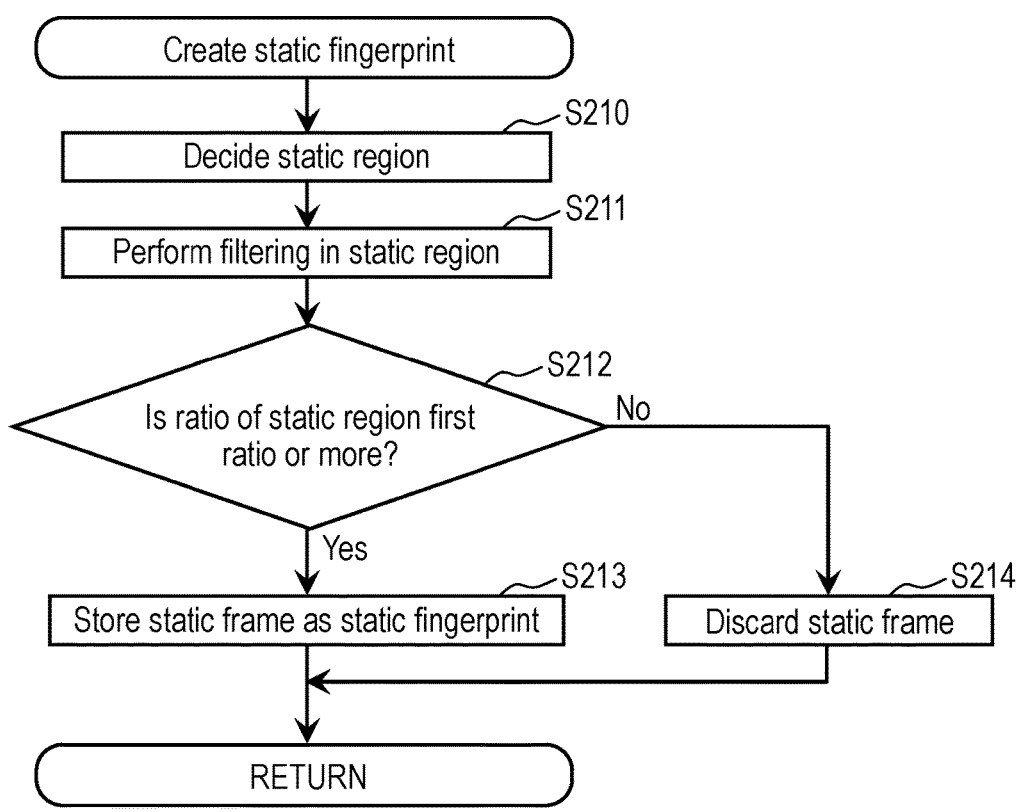
FIG. 14 is a flowchart showing an example of processing for creating a static fingerprint in the first exemplary embodiment.

FIG. 14 is a flowchart showing an example of the processing for creating the static fingerprint in the first exemplary embodiment. The flowchart of FIG. 14 shows an overview of the processing executed in Step S21 of FIG. 9.

Figure 15:
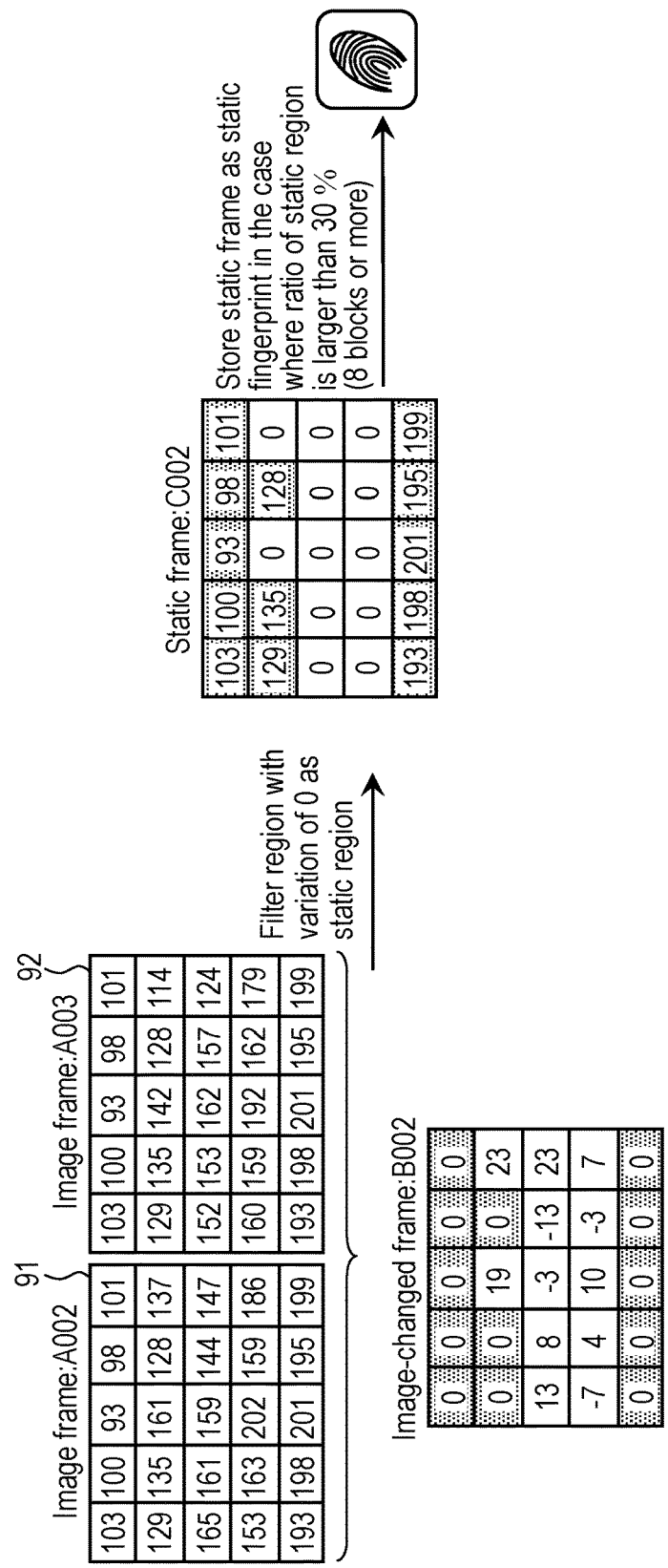
FIG. 15 is a view schematically showing an example of a static fingerprint created based on the variation between the image frames in the first exemplary embodiment.

FIG. 15 is a view schematically showing an example of the static fingerprint created based on the variation between the image frames in the first exemplary embodiment.

First, static region decision part 231 shown in FIG. 7 decides the static region (Step S210).

Static region decision part 231 calculates the absolute values of the brightness-changed values of the image-changed frames, and compares the absolute values with the first threshold. Then, static region decision part 231 determines whether or not the absolute values of the brightness-changed values are smaller than the first threshold, and defines, as the static region, the region in which the absolute value of the brightness-changed value is smaller than the first threshold. In such a way, the static region is decided. Such an absolute value of the brightness-changed value is the variation of the brightness value between two temporally adjacent image frames.

For example, if the first threshold is set at "1", then static region decision part 231 defines, as the static region, the region in which the brightness-changed value of the image-changed frame is "0", that is, the region in which the brightness value is not substantially changed between two temporally adjacent image frames. In a case of this setting, in the example shown in FIG. 15, 13 blocks represented by "0" as the brightness-changed value in image-changed frame B002 serve as the static regions.

Next, static fingerprint creation part 241 shown in FIG. 7 filters frame 91 in the static regions decided in Step S210, and creates the static frame (Step S211).

This filtering refers to that the following processing is implemented for the brightness values of the respective blocks which compose frame 91. With regard to the static regions decided in Step S210, the brightness values of the blocks of frame 91, which correspond to the static regions, are used as they are, and with regard to the blocks other than the static regions, the brightness values thereof are set to a fixed value (for example, "0").

In the example shown in FIG. 15, the static frame created by filtering frame 91 is static frame C002. In static frame C002, with regard to the blocks (static regions) in which the brightness-changed values are "0" in image-changed frame B002, the brightness values of frame 91 are used as they are, and with regard to the blocks other than the static regions, the brightness values thereof are "0".

Next, static fingerprint creation part 241 shown in FIG. 7 calculates a ratio of the static regions decided in Step S210, compares the calculated ratio with the first ratio, and determines whether or not the ratio of the static regions is the first ratio or more (Step S212).

Static fingerprint creation part 241 calculates the ratio of the static regions based on the number of blocks, which are determined to be the static regions in Step S210, with respect to a total number of blocks which compose the image-changed frame. In the example of image-changed frame B002 shown in FIG. 15, the total number of blocks which compose the image-changed frame is 25, and the number of blocks of the static regions is 13, and accordingly, the ratio of the static regions is 52%. Hence, if the first ratio is, for example, 30%, then in the example shown in FIG. 15, a determination of Yes is made in Step S212.

In a case where it is determined in Step S212 that the ratio of the static regions is the first ratio or more (Yes in Step S212), static fingerprint creation part 241 stores the static frame, which is created in Step S211, as a static fingerprint (Step S213).

In the example shown in FIG. 15, in the case where the determination of Yes is made in Step S212, static frame C002 is stored as static fingerprint C002 in fingerprint DB 22 of content recognition device 20. Meanwhile, in reception device 10, the static fingerprint is stored in the storage device (for example, an internal memory and the like of recognizer 100, not shown) of reception device 10.

In a case where it is determined in Step S212 that the ratio of the static regions is less than the first ratio (No in Step S212), static fingerprint creation part 241 does not store but discards the static frame, which is created in Step S211 (Step S214). Hence, in the case where the determination of No is made in Step S212, the static fingerprint is not created.

Note that, as an example is shown in FIG. 4, values (for example, "103", "100" and the like) of the respective blocks of static fingerprint C002 serve as feature quantities of the fingerprint.

As described above, fingerprint creator 2110 creates the static fingerprint based on whether or not the ratio of the static regions is larger than the first ratio in the image frame. That is to say, fingerprint creator 2110 can create the static fingerprint by extracting the background, the region with small motion/change, and the like from the image frame appropriately.

Note that, in the flowchart of FIG. 14, the description is made of the operation example where the determination as to whether or not to store the static frame is made in Step S212 after the static frame is created by performing the filtering in Step S211; however, the present disclosure is never limited to this processing order. For example, the order of the respective pieces of processing may be set so that Step S212 is executed after the static regions are decided in Step S210, that Step S211 is executed to create the static frame when the determination of Yes is made in Step S212, and that the static frame is stored as the static fingerprint in Step S213 that follows.

[1-3-5. Creation of Dynamic Fingerprint]

Next, details of the processing when the dynamic fingerprint is created in this exemplary embodiment are described with reference to FIG. 16 to FIG. 18.

Figure 16:
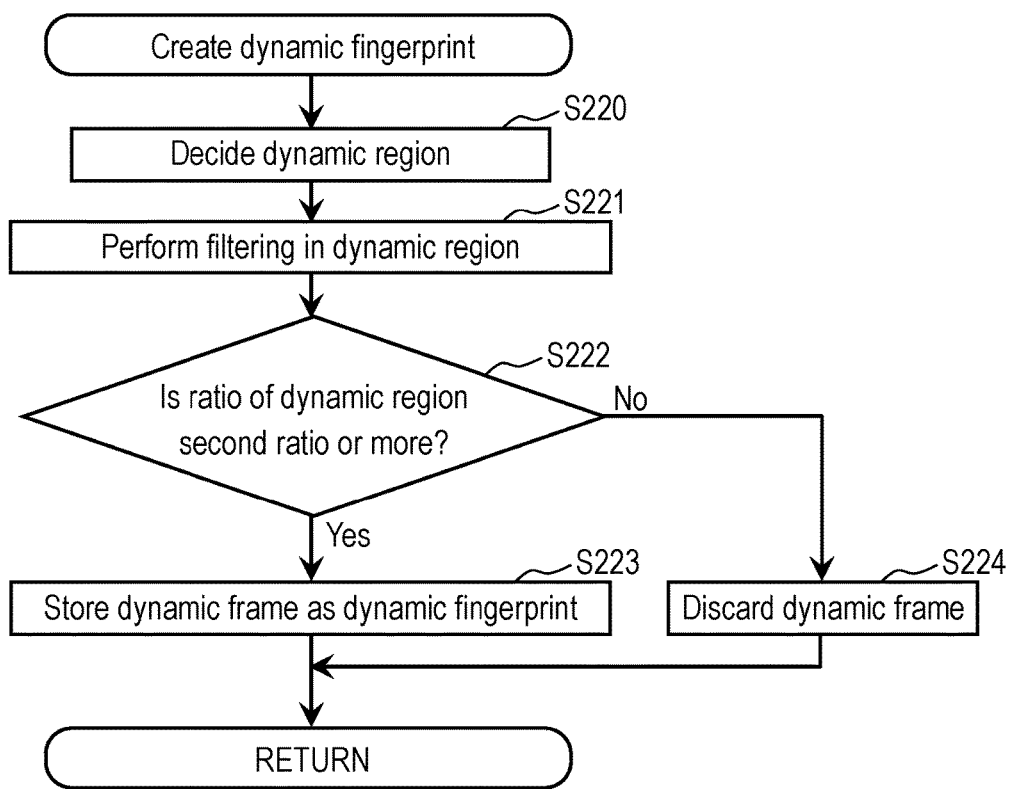
FIG. 16 is a flowchart showing an example of processing for creating a dynamic fingerprint in the first exemplary embodiment.

FIG. 16 is a flowchart showing an example of processing for creating the dynamic fingerprint in the first exemplary embodiment. The flowchart of FIG. 16 shows an overview of the processing executed in Step S22 of FIG. 9.

Figure 17:
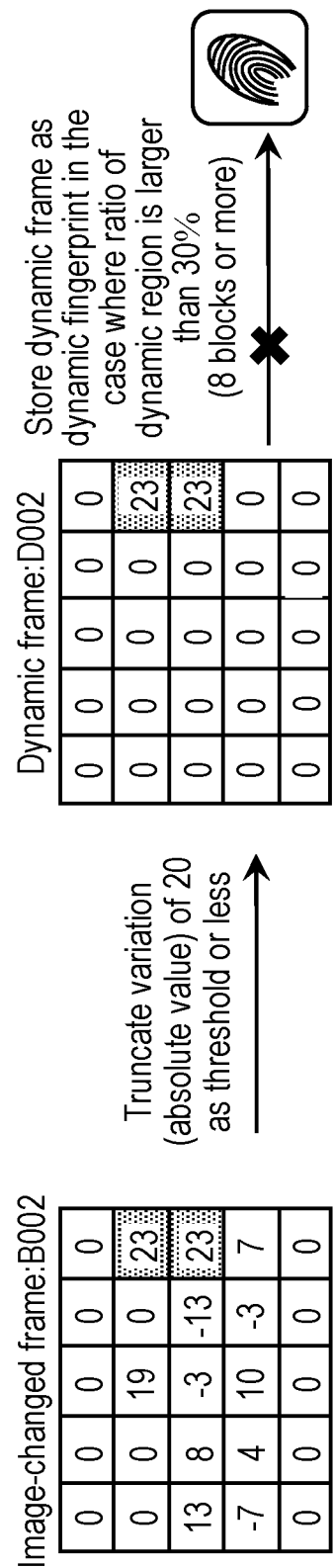
FIG. 17 is a view schematically showing an example of an image frame from which the dynamic fingerprint in the first exemplary embodiment is not created.

FIG. 17 is a view schematically showing an example of an image frame from which the dynamic fingerprint in the first exemplary embodiment is not created.

Figure 18:
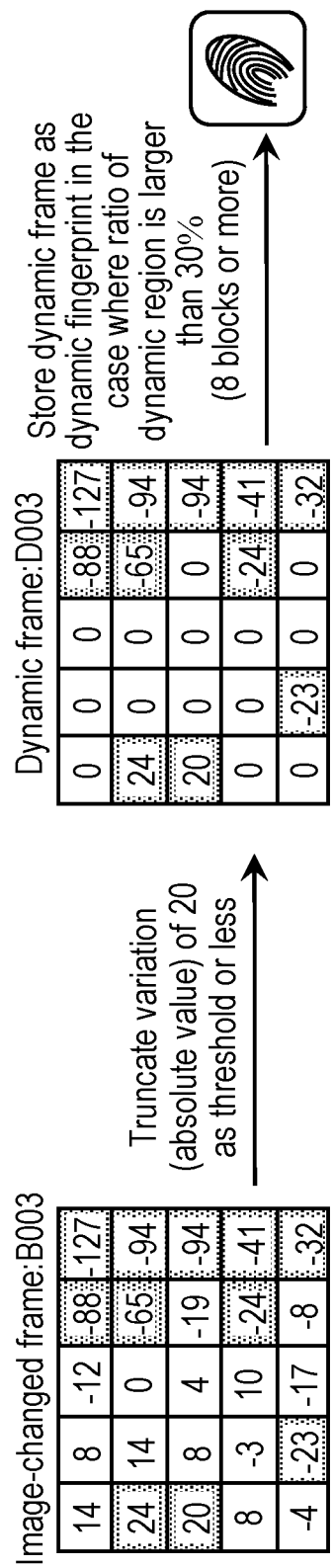
FIG. 18 is a view schematically showing an example of a dynamic fingerprint created based on the variation between the image frames in the first exemplary embodiment.

FIG. 18 is a view schematically showing an example of the dynamic fingerprint created based on the variation between the image frames in the first exemplary embodiment.

First, dynamic region decision part 232 shown in FIG. 7 decides the dynamic region (Step S220).

Dynamic region decision part 232 calculates the absolute values of the brightness-changed values of the image-changed frames, and compares the absolute values with the second threshold. Then, dynamic region decision part 232 determines whether or not the absolute values of the brightness-changed values are larger than the second threshold, and defines, as the dynamic region, the region in which the absolute value of the brightness-changed value is larger than the second threshold. In such a way, the dynamic region is decided.

For example, if the second threshold is set at "20", then a block in which the absolute value of the brightness-changed value is "21" or more in the image-changed frame serves as the dynamic region. In a case of this setting, in an example shown in FIG. 17, two blocks represented by a numeric value of "21" or more or "−21" or less as a brightness-changed value in image-changed frame B002 serve as the dynamic regions, and in an example shown in FIG. 18, 11 blocks represented by the numeric value of "21" or more or "−21" or less as the brightness-changed value in image-changed frame B003 serve as the dynamic regions.

Next, dynamic fingerprint creation part 242 shown in FIG. 7 filters the image-changed frame in the dynamic regions decided in Step S220, and creates the dynamic frame (Step S221).

This filtering refers to that the following processing is implemented for the brightness-changed values of the respective blocks which compose the image-changed frame. With regard to the dynamic regions decided in Step S220, the brightness-changed values of the blocks, which correspond to the dynamic regions, are used as they are, and with regard to the blocks other than the dynamic regions, the brightness-changed values thereof are set to a fixed value (for example, "0").

The dynamic frame created by filtering the image-changed frame is dynamic frame D002 in the example shown in FIG. 17, and is dynamic frame D003 in the example shown in FIG. 18. In dynamic frames D002, D003, with regard to the blocks (dynamic regions), in each of which the brightness-changed value is "21" or more or "−21" or less in image-changed frames B002, B003, the brightness-changed values of image-changed frames B002, B003 are used as they are, and with regard to the blocks other than the dynamic regions, the brightness-changed values thereof are "0".

Note that the processing of Step S220, Step S221 for the image-changed frame can be executed, for example, by batch processing for substituting "0" for the brightness-changed value of the block in which the absolute value of the brightness-changed value is the second threshold or less.

Next, dynamic fingerprint creation part 242 calculates a ratio of the dynamic regions decided in Step S220, compares the calculated ratio with the second ratio, and determines whether or not the ratio of the dynamic regions is the second ratio or more (Step S222).

Dynamic fingerprint creation part 242 calculates the ratio of the dynamic regions based on the number of blocks, which are determined to be the dynamic regions in Step S220, with respect to the total number of blocks which compose the image-changed frame. In the example of image-changed frame B002 shown in FIG. 17, the total number of blocks which compose the image-changed frame is 25, and the number of blocks of the dynamic regions is 2, and accordingly, the ratio of the dynamic regions is 8%. In the example of image-changed frame B003 shown in FIG. 18, the total number of blocks which compose the image-changed frame is 25, and the number of blocks of the dynamic regions is 11, and accordingly, the ratio of the dynamic regions is 44%. Hence, if the second ratio is 30% for example, then the determination of No is made in Step S222 in the example shown in FIG. 17, and the determination of Yes is made in Step S222 in the example shown in FIG. 18.

In a case where it is determined in Step S222 that the ratio of the dynamic regions is the second ratio or more (Yes in Step S222), dynamic fingerprint creation part 242 stores the dynamic frame, which is created in Step S221, as a dynamic fingerprint (Step S223).

Meanwhile, in a case where it is determined that the ratio of the dynamic regions is less than the second ratio (No in Step S222), dynamic fingerprint creation part 242 does not store but discards the dynamic frame, which is created in Step S221 (Step S224). Hence, in the case where the determination of No is made in Step S222, the dynamic fingerprint is not created.

In the example shown in FIG. 18, dynamic frame D003 for which the determination of Yes is made in Step S222 is stored as dynamic fingerprint D003 in fingerprint DB 22 of content recognition device 20. Meanwhile, in reception device 10, the dynamic fingerprint is stored in the storage device (for example, the internal memory and the like of recognizer 100, not shown) of reception device 10.

In the example shown in FIG. 17, dynamic frame D002 for which the determination of No is made in Step S222 is not stored but discarded.

Note that, as an example is shown in FIG. 4, values (for example, "0", "24" and the like) of the respective blocks of dynamic fingerprint D003 serve as the feature quantities of the fingerprint.

As described above, fingerprint creator 2110 creates the dynamic fingerprint based on whether or not the ratio of the dynamic regions is larger than the second ratio in the image frame. That is to say, fingerprint creator 2110 can create the dynamic fingerprint by appropriately extracting, from the image frame, the region where a large change of the image occurs by the scene switching and the like.

Note that, in the flowchart of FIG. 16, the description is made of the operation example where the determination as to whether or not to store the dynamic frame is made in Step S222 after the dynamic frame is created by performing the filtering in Step S221; however, the present disclosure is never limited to this processing order. For example, the order of the respective pieces of processing may be set so that Step S222 can be executed after the dynamic regions are decided in Step S220, that Step S221 can be executed to create the dynamic frame when the determination of Yes is made in Step S222, and that the dynamic frame can be stored as the dynamic fingerprint in Step S223 that follows.

[1-3-6. Filtering]

Next, with reference to FIG. 19 to FIG. 23, a description is made of the filtering processing executed in fingerprint filter 23 of content recognition device 20. First, with reference to FIG. 19, an overview of the filtering processing is described.

Figure 19:
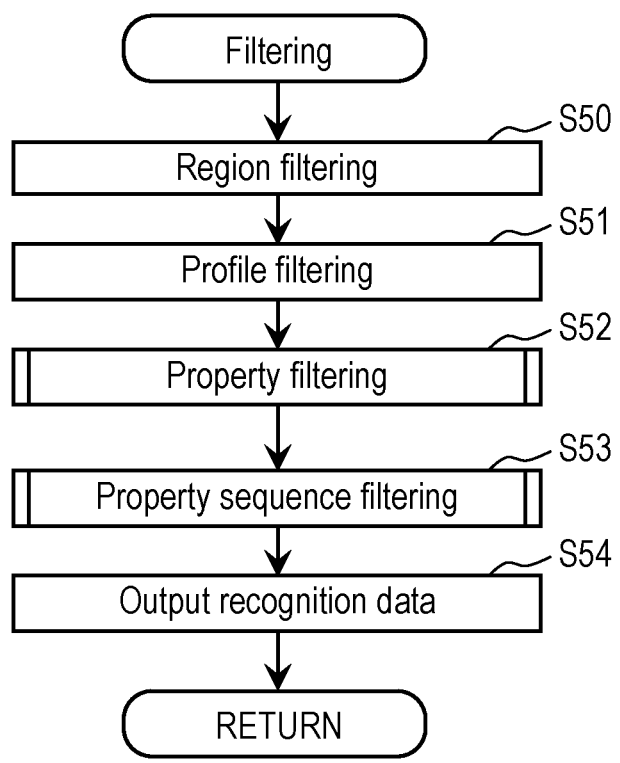
FIG. 19 is a flowchart showing an example of filtering processing executed by a fingerprint filter in the first exemplary embodiment.

FIG. 19 is a flowchart showing an example of the filtering processing executed by fingerprint filter 23 in the first exemplary embodiment. The flowchart of FIG. 19 shows an overview of the processing executed in Step S5 of FIG. 8.

As shown in FIG. 19, fingerprint filter 23 of content recognition device 20 sequentially executes the respective pieces of filtering processing such as the region filtering, the profile filtering, the property filtering and the property sequence filtering, and narrows the collation target of the image recognition processing.

First, by using the geographic information included in the attached information, fingerprint filter 23 executes the region filtering processing for the video content candidates stored in fingerprint DB 22 (Step S50).

The region filtering processing stands for the processing for excluding, from the collation target of the image recognition processing, the video content candidate broadcasted from broadcast station 2 from which the program watching cannot be made in the region indicated by the geographic information.

If the geographic information is included in the attached information transmitted from reception device 10, then fingerprint filter 23 executes the region filtering processing based on the geographic information. In such a way, content recognition device 20 can narrow fingerprints 53 read out as the collation target of the image recognition processing from fingerprint DB 22, and accordingly, can reduce the processing required for the image recognition.

For example, if geographic information indicating "Tokyo" is included in the attached information transmitted from reception device 10, then fingerprint filter 23 narrows fingerprints 53, which are read out as the collation target of the image recognition processing from fingerprint DB 22, to fingerprints 53 of video content candidates transmitted from broadcast station 2 of which program is receivable in Tokyo.

Next, fingerprint filter 23 executes the profile filtering processing by using the user information included in the attached information (Step S51).

The profile filtering processing stands for the processing for excluding, from the collation target of the image recognition processing, the video content candidate, which does not match the feature of the user, which is indicated by the user information.

If the user information is included in the attached information transmitted from reception device 10, then fingerprint filter 23 executes the profile filtering processing based on the user information. In such a way, content recognition device 20 can narrow fingerprints 53 taken as the collation target of the image recognition processing, and accordingly, can reduce the processing required for the image recognition.

For example, if user information indicating an age bracket of 20 years old or more is included in the attached information, then fingerprint filter 23 excludes a video content candidate that is not targeted for the age bracket (for example, an infant program targeted for infants, and the like) from the collation target of the image recognition.

Next, fingerprint filter 23 executes the property filtering processing (Step S52).

The property filtering processing stands for processing for comparing type information 52 of fingerprints 53, which are included in recognition data 50 of the video content candidate, with type information 42, which is included in recognition data 40 transmitted from reception device 10.

Fingerprint filter 23 executes the property filtering processing, thereby excludes recognition data 50, which does not include fingerprint 53 of type information 52 of the same type as type information 42 included in recognition data 40 transmitted from reception device 10, from the collation target of the image recognition processing, and selects recognition data 50, which includes fingerprint 53 of type information 52 of the same type as type information 42, as a candidate for the collation target of the image recognition processing. In such a way, content recognition device 20 can narrow fingerprints 53 taken as the collation target of the image recognition processing, and accordingly, can reduce the processing required for the image recognition.

For example, in the example shown in FIG. 3, FIG. 4, "A type" and "B type" are included in type information 42 of recognition data 40 transmitted from reception device 10. Hence, fingerprint filter 23 excludes recognition data 50b, which has type information 52b of only "A type", from the collation target of the image recognition processing.

Details of the property filtering will be described later with reference to FIG. 20, FIG. 21.

Next, fingerprint filter 23 executes the property sequence filtering processing (Step S53).

The property sequence filtering processing stands for processing for comparing a sequence of type information 52, which is included in recognition data 50 of the video content candidate, with a sequence of type information 42, which is included in recognition data 40 transmitted from reception device 10. Note that the sequences of type information 42, 52 may be set based on pieces of the time indicated by timing information 41, 51. In this case, the sequences are decided based on creation orders of fingerprints 43, 53.

Fingerprint filter 23 executes the property sequence filtering processing, thereby excludes recognition data 50, which does not include type information 52 arrayed in the same order as the sequence of type information 42 included in recognition data 40 transmitted from reception device 10, from the collation target of the image recognition processing, and selects recognition data 50, which includes type information 52 arrayed in the same order as that of type information 42, as the collation target of the image recognition processing. In such a way, content recognition device 20 can narrow fingerprints 53 taken as the collation target of the image recognition processing, and accordingly, can reduce the processing required for the image recognition.

For example, in the example shown in FIG. 3 and FIG. 4, the sequence of type information 42 included in recognition data 40 transmitted from reception device 10 is "A type, B type, A type". Hence, fingerprint filter 23 excludes recognition data 50c, which includes type information 52c arrayed like "A type, A type, B type", from the collation target of the image recognition processing, and takes recognition data 50a, which includes type information 52a arrayed like "A type, B type, A type", as the collation target of the image recognition processing.

Details of the property sequence filtering will be described later with reference to FIG. 22, FIG. 23.

Finally, fingerprint filter 23 outputs recognition data 50 of the video content candidates, which are sorted by the respective pieces of filtering processing of Step S50 to Step S53, to fingerprint collator 24 (Step S54).

Then, fingerprint collator 24 of content recognition device 20 collates recognition data 40, which is transmitted from reception device 10, with recognition data 50, which is sorted by fingerprint filter 23, and executes the image recognition processing. Then, content recognition device 20 transmits a result of the image recognition processing (that is, information indicating the video content candidate including recognition data 50 corresponding to recognition data 40) to reception device 10.

As described above, content recognition device 20 can narrow recognition data 50, which is taken as the collation target in the image recognition processing, by the filtering executed by fingerprint filter 23. In such a way, the processing required for the recognition (image recognition) of the video content can be reduced.

Note that FIG. 19 shows the operation example where fingerprint filter 23 executes the profile filtering processing of Step S51 for recognition data 50 sorted by region filtering processing of Step S50, executes the property filtering processing of Step S52 for recognition data 50 sorted by the processing, and executes the property sequence filtering processing of Step S53 for recognition data 50 sorted by the processing; however, the present disclosure is never limited to this processing order. The respective pieces of filtering processing may be switched in order. Alternatively, the respective pieces of filtering processing may be executed independently of one another.

[1-3-6-1. Property Filtering]

Figure 20:
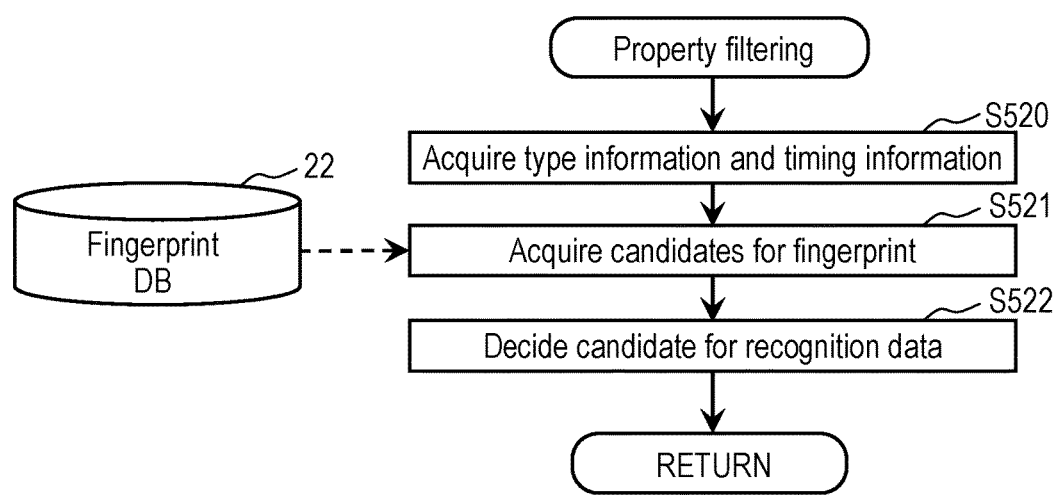
FIG. 20 is a flowchart showing an example of property filtering processing executed in the fingerprint filter in the first exemplary embodiment.
Figure 21:
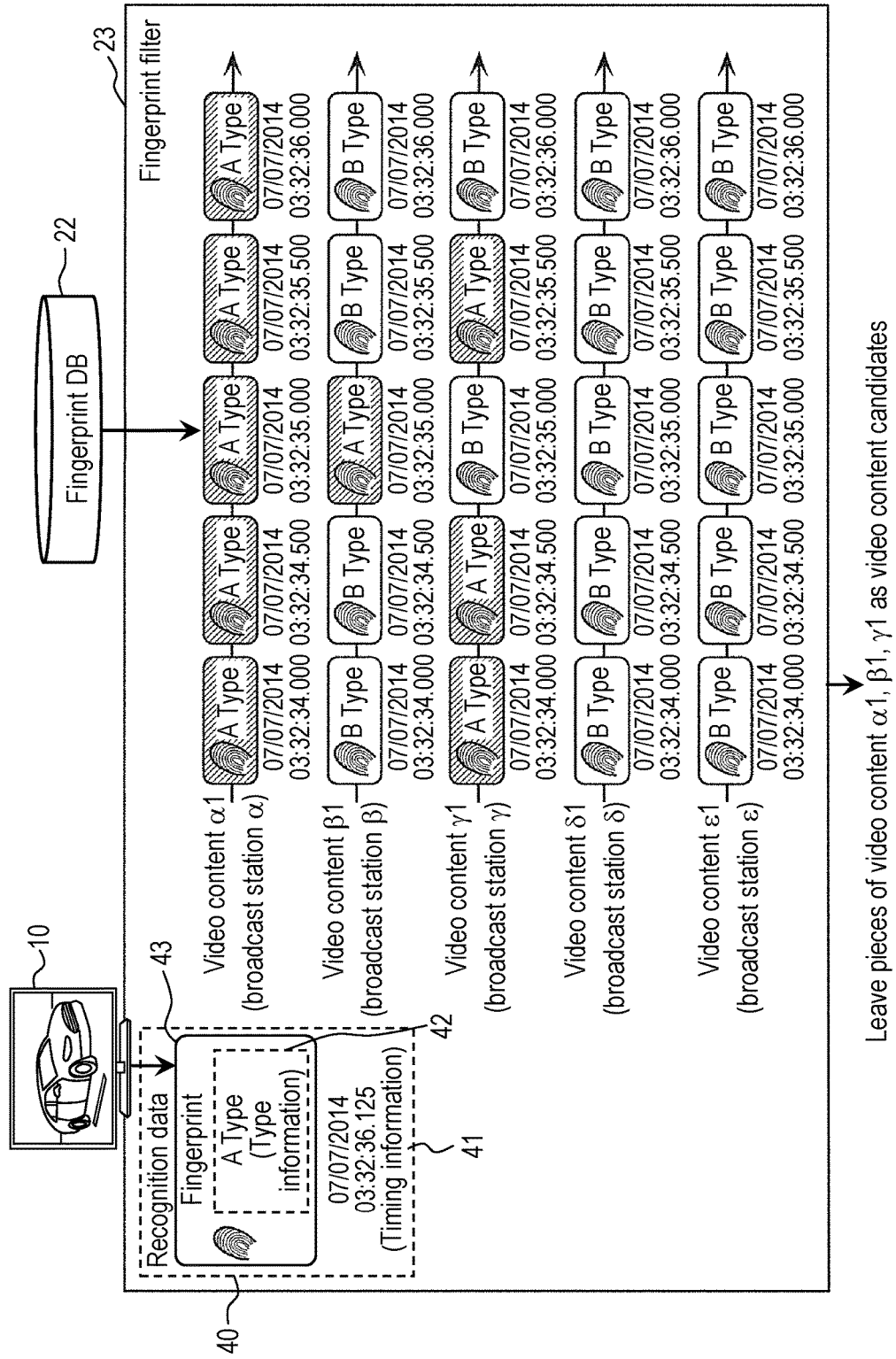
FIG. 21 is a view schematically showing a specific example of the property filtering processing executed in the fingerprint filter in the first exemplary embodiment.

Next, with reference to FIG. 20, FIG. 21, a description is made of the property filtering processing executed in fingerprint filter 23 of content recognition device 20.

FIG. 20 is a flowchart showing an example of the property filtering processing executed in fingerprint filter 23 in the first exemplary embodiment.

FIG. 21 is a view schematically showing a specific example of the property filtering processing executed in fingerprint filter 23 in the first exemplary embodiment.

First, fingerprint filter 23 acquires type information 42 and timing information 41 from recognition data 40 transmitted from reception device 10 (Step S520).

As an example is shown in FIG. 3, recognition data 40 transmitted from reception device 10 includes timing information 41, type information 42 and fingerprint 43. Then, in an example shown in FIG. 21, recognition data 40 transmitted from reception device 10 includes "A type" as type information 42, and "07/07/2014 03:32:36.125" as timing information 41, and fingerprint filter 23 acquires these pieces of information in Step S520.

Next, fingerprint filter 23 reads out the plurality of pieces of recognition data 50 from fingerprint DB 22, and acquires the same (Step S521).

In the operation example shown in FIG. 19, fingerprint filter 23 acquires recognition data 50 sorted by the region filtering processing of Step S50 and the profile filtering processing of Step S51. As an example is shown in FIG. 4, recognition data 50 includes timing information 51, type information 52 and fingerprint 53. FIG. 21 shows an operation example where fingerprint filter 23 acquires recognition data 50 individually corresponding to pieces of video content α1, β1, γ1, δ1, ε1, which are transmitted from respective broadcast stations α, β, γ, δ, ε and are accumulated in fingerprint DB 22, from fingerprint DB 22. In FIG. 21, pieces of video content α1, β1, γ1, δ1, ε1 are individually the video content candidates.

At this time, fingerprint filter 23 acquires recognition data 50 having timing information 51 of a time close to a time indicated by timing information 41 received from reception device 10 (that is, recognition data 50 having fingerprints 53 created at a time close to a creation time of fingerprints 43) from fingerprint DB 22.

Note that, desirably, to which extent a time range should be allowed for fingerprint filter 23 to acquire recognition data 50 from fingerprint DB 22 with respect to timing information 41 received from reception device 10 is set as appropriate in response to specifications of content recognition device 20, and the like.

For example, fingerprint filter 23 may acquire recognition data 50, in which the time indicated by timing information 51 is included between the time indicated by timing information 41 received from reception device 10 and a time previous from that time by a predetermined time (for example, 3 seconds and the like), from fingerprint DB 22.

An operation example where the predetermined time is set at 2.5 seconds is shown in FIG. 21. In the operation example shown in FIG. 21, the time indicated by timing information 41 is "07/07/2014 03:32:36.125". Hence, fingerprint filter 23 subtracts 2.5 seconds from 36.125 seconds, and calculates 33.625 seconds. Then, fingerprint filter 23 acquires recognition data 50, in which the time indicated by timing information 51 is included in a range from "07/07/2014 03:32:33.625" to "07/07/2014 03:32:36.125", from fingerprint DB 22.

Next, by using type information 42 acquired from reception device 10 and type information 52 included in recognition data 50, fingerprint filter 23 selects the candidate for recognition data 50, which is taken as the collation target of the image recognition processing (Step S522).

Specifically, fingerprint filter 23 excludes recognition data 50, which does not include type information 52 of the same type as type information 42 acquired from reception device 10, from the collation target of the image recognition processing, and takes recognition data 50, which includes type information 52 of the same type as that of type information 42, as the collation target of the image recognition processing.

In the example shown in FIG. 21, fingerprint filter 23 acquires type information 42 of "A type" from reception device 10. Hence, fingerprint filter 23 selects recognition data 50, which includes type information 52 of "A type", as the collation target of the image recognition processing, and excludes recognition data 50, which does not include type information 52 of "A type" but includes only type information 52 of "B type", from that collation target. In the example shown in FIG. 21, it is recognition data 50 of video content α1, video content β1 and video content γ1 that are selected as the candidates for the collation target of the image recognition processing, and recognition data 50 of video content δ1 and video content ε1 are excluded from that collation target.

[1-3-6-2. Property Sequence Filtering]

Figure 22:
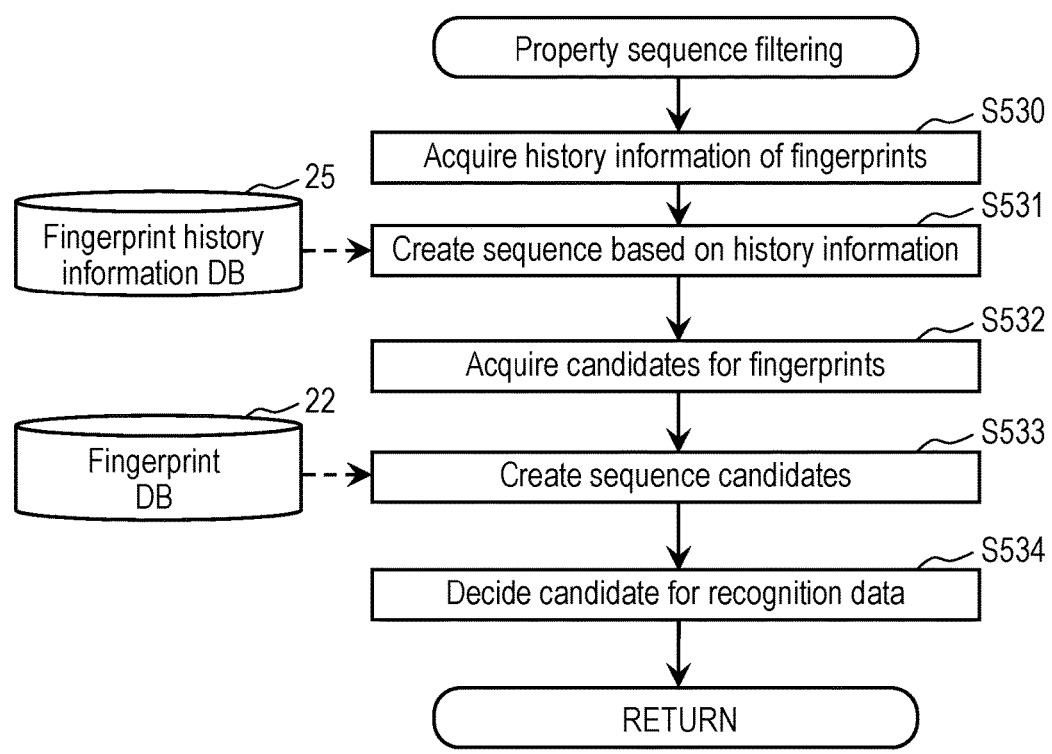
FIG. 22 is a flowchart showing an example of property sequence filtering processing executed in the fingerprint filter in the first exemplary embodiment.
Figure 23:
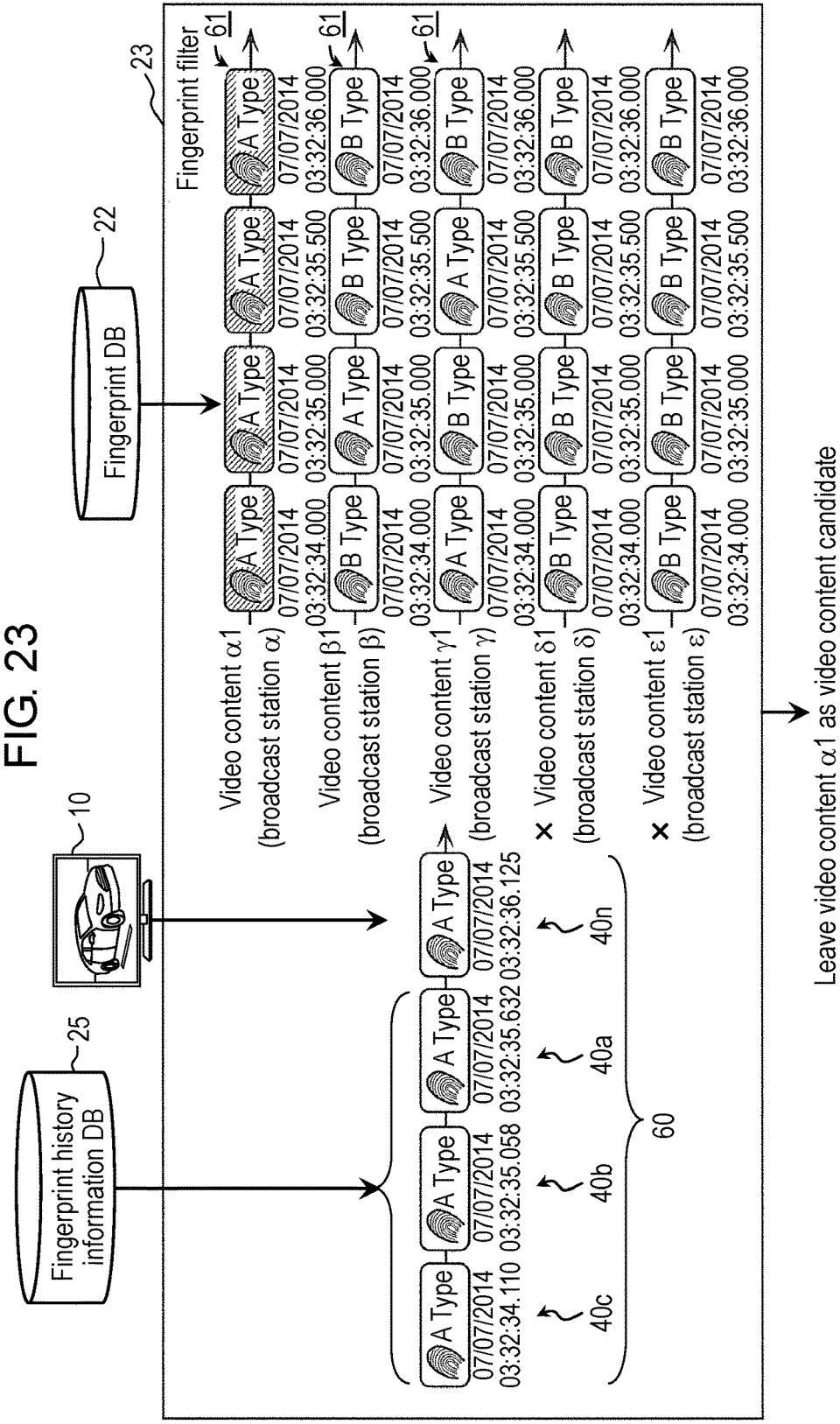
FIG. 23 is a view schematically showing a specific example of the property sequence filtering processing executed in the fingerprint filter in the first exemplary embodiment.

Next, with reference to FIG. 22, FIG. 23, a description is made of the property sequence filtering processing executed in fingerprint filter 23 of content recognition device 20.

FIG. 22 is a flowchart showing an example of the property sequence filtering processing executed in fingerprint filter 23 in the first exemplary embodiment.

FIG. 23 is a view schematically showing a specific example of the property sequence filtering processing executed in fingerprint filter 23 in the first exemplary embodiment.

First, fingerprint filter 23 acquires past recognition data 40, which is received from reception device 10 by content recognition device 20, from fingerprint history information DB 25 (Step S530).

Specifically, upon receiving new recognition data 40 (referred to as "recognition data 40n") from reception device 10, fingerprint filter 23 reads out past recognition data 40, which includes recognition data 40 received immediately before recognition data 40n, from fingerprint history information DB 25, and acquires the same. That recognition data 40 includes fingerprints 43, and type information 42 and timing information 41, which correspond to those fingerprints 43.

FIG. 23 shows an example where, after receiving new recognition data 40n from reception device 10, fingerprint filter 23 acquires latest three pieces of recognition data 40 (in FIG. 23, referred to as "recognition data 40a", "recognition data 40b" and "recognition data 40c"), which are accumulated in fingerprint history information DB 25, from fingerprint history information DB 25. Note that, desirably, the number of pieces of recognition data 40 read out from fingerprint history information DB 25 is set as appropriate in response to the specifications or the like of content recognition device 20.

Next, fingerprint filter 23 creates sequence 60 of type information 42 based on timing information 41 of each piece of recognition data 40n received from reception device 10 and of recognition data 40 acquired from fingerprint history information DB 25 (Step S531).

Sequence 60 is information created by arraying type information 42 in order of pieces of the time indicated by timing information 41. FIG. 23 shows an example where, based on recognition data 40n and recognition data 40a, 40b and 40c acquired from fingerprint history information DB 25, fingerprint filter 23 arrays the respective pieces of type information 42 in time order (reverse chronological order), which is indicated by respective pieces of timing information 41, and creates sequence 60. In the example shown in FIG. 23, recognition data 40n, 40a, 40b and 40c are arrayed in time order which is indicated by timing information 41, and all pieces of type information 42 of those are "A type", and accordingly, sequence 60 indicates "A type, A type, A type, A type".

Next, fingerprint filter 23 reads out the plurality of pieces of recognition data 50 from fingerprint DB 22, and acquires the same (Step S532).

Specifically, in the property filtering processing of Step S52, fingerprint filter 23 acquires recognition data 50, which is selected as the candidate for the collation target of the image recognition processing, from fingerprint DB 22.

FIG. 23 shows an operation example of acquiring video content α1 transmitted from broadcast station α, video content β1 transmitted from broadcast station β, and video content γ1 transmitted from broadcast station γ. Note that, in the example shown in FIG. 23, pieces of video content δ1, ε1 are already excluded in the property filtering processing. Note that, in the example shown in FIG. 23, pieces of video content α1, β1, γ1 are individually the video content candidates.

Next, fingerprint filter 23 creates sequence candidate 61 for each piece of recognition data 50 acquired from fingerprint DB 22 in Step S532 (Step S533).

Each of such sequence candidates 61 is information created by substantially the same method as that used to create sequence 60 in Step S531, and is information created by arraying the respective pieces of type information 52 of recognition data 50 in time order (reverse chronological order), which is indicated by the respective pieces of timing information 51 of recognition data 50. In order to create each of sequence candidates 61, fingerprint filter 23 selects recognition data 50 having timing information 51 of a time closest to the time, which is indicated by timing information 41 of each piece of recognition data 40 included in sequence 60, from the plurality of pieces of recognition data 50 acquired in Step S532. Then, fingerprint filter 23 creates each sequence candidate 61 based on selected recognition data 50.

In the example shown in FIG. 23, the time indicated by timing information 41 of recognition data 40n transmitted from reception device 10 is "07/07/2014 03:32:36.125". Hence, for each piece of video content α1, β1, γ1, fingerprint filter 23 selects recognition data 50 having timing information 51, which indicates a time closest to that time, from among respective pieces of recognition data 50. In the example shown in FIG. 23, from among respective pieces of recognition data 50 of pieces of video content α1, β1, γ1, recognition data 50 having timing information 51, in which the time indicates "07/07/2014 03:32:36.000", is selected.

Also for each piece of recognition data 40a, 40b, 40c, fingerprint filter 23 selects recognition data 50 having timing information 51, which indicates the time closest to the time indicated by timing information 41, from among respective pieces of recognition data 50 of pieces of video content α1, β1, γ1 as in the case of recognition data 40n.

Then, for each piece of video content α1, β1, γ1, fingerprint filter 23 arrays the respective pieces of type information 52, which are included in recognition data 50 thus selected, in time order (reverse chronological order), which is indicated by the respective pieces of timing information 51, which are included in those recognition data 50, and creates sequence candidate 61. In the example shown in FIG. 23, sequence candidate 61 of video content α1 indicates "A type, A type, A type, A type", sequence candidate 61 of video content β1 indicates "B type, B type, A type, B type", and sequence candidate 61 of video content γ1 indicates "B type, A type, B type, A type". As described above, in Step S533, sequence candidate 61 is created for each of the video content candidates.

Next, by using sequence 60 created based on recognition data 40 in Step S531, fingerprint filter 23 decides recognition data 50 that serves as the collation target of the image recognition (Step S534).

In Step S534, fingerprint filter 23 compares sequence 60 created in Step S531 with sequence candidates 61 created in Step S533. Then, fingerprint filter 23 selects sequence candidate 61 having pieces of type information 52, which are arrayed in the same order as that of pieces of type information 42 in sequence 60. Recognition data 50 of sequence candidate 61 thus selected serves as the collation target of the image recognition.

In the example shown in FIG. 23, in sequence 60, pieces of type information 42 are arrayed in order of "A type, A type, A type, A type". Hence, fingerprint filter 23 selects sequence candidate 61 of video content α1, in which pieces of type information 52 are arrayed in order of "A type, A type, A type, A type", and excludes respective sequence candidates 61 of video content β1 and video content γ1, which are not arrayed in the order described above.

In such a way, in the example shown in FIG. 23, as a result of the property sequence filtering processing, fingerprint filter 23 defines video content α1 as a final video content candidate, and defines recognition data 50 of video content α1 as the collation target of the image recognition.

[1-3-7. Collation of Recognition Data]

Next, with reference to FIG. 24 to FIG. 28, a description is made of details of the processing at a time of executing the collation of the recognition data in this exemplary embodiment.

Figure 24:
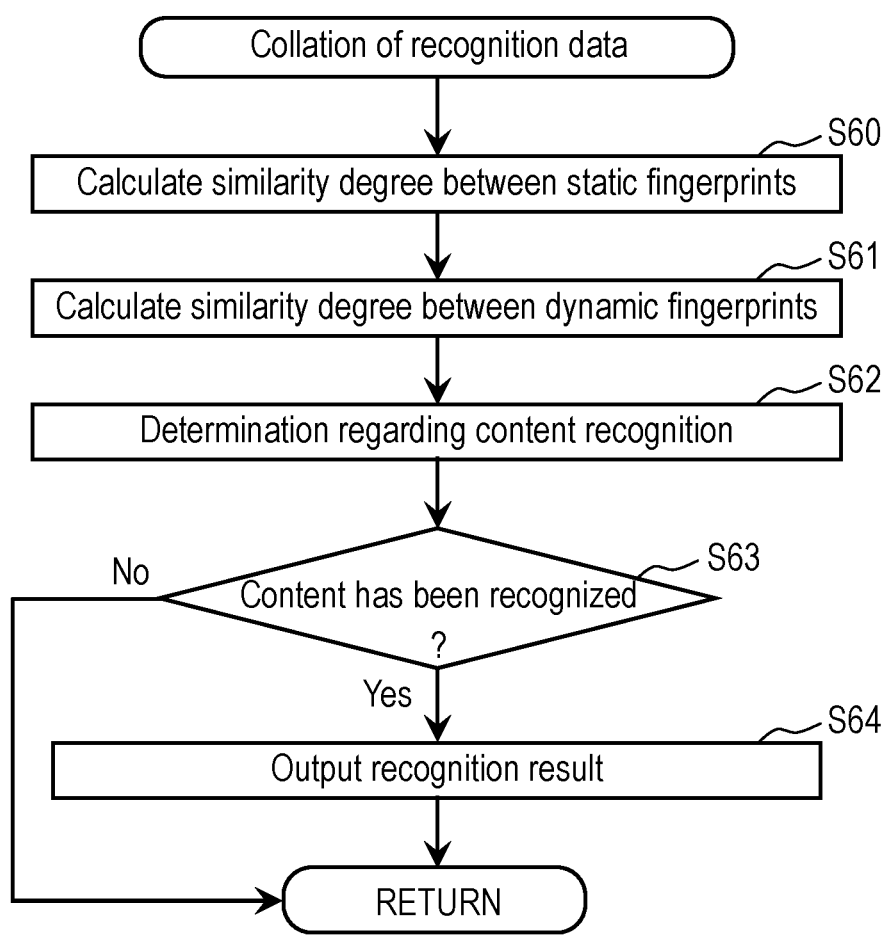
FIG. 24 is a flowchart showing an example of processing for collating the recognition data in the first exemplary embodiment.

FIG. 24 is a flowchart showing an example of processing for collating the recognition data in the first exemplary embodiment. The flowchart of FIG. 24 shows an overview of the processing executed in Step S6 of FIG. 8.

FIG. 25 is a view schematically showing an example of processing for collating the static fingerprint in the first exemplary embodiment.

FIG. 26 is a view schematically showing an example of processing for collating the dynamic fingerprint in the first exemplary embodiment.

FIG. 27 is a view showing an example of recognition conditions for the video content in the first exemplary embodiment. FIG. 27 shows 5 recognition conditions (a) to (e) as an example.

FIG. 28 is a view schematically showing an example of the processing for collating the video content in the first exemplary embodiment.

[1-3-7-1. Similarity Degree Between Static Fingerprints]

The flowchart of FIG. 24 is described. Fingerprint collator 24 shown in FIG. 1 calculates a similarity degree between the static fingerprints (Step S60).

Fingerprint collator 24 collates the static fingerprint, which is included in recognition data 40 transmitted from reception device 10, with the static fingerprint, which is included in recognition data 50 filtered by fingerprint filter 23 (that is, recognition data 50 selected as the collation target of the image recognition in Step S534). Then, fingerprint collator 24 calculates a similarity degree between the static fingerprint, which is included in recognition data 40 transmitted from reception device 10, and the static fingerprint, which is included in recognition data 50 filtered by fingerprint filter 23.

Fingerprint collator 24 calculates, as the similarity degree, a degree of coincidence between the static regions. Specifically, fingerprint collator 24 compares the positions of the static regions of the static fingerprints, which are included in recognition data 40 transmitted from reception device 10, with the positions of the static regions of the static fingerprints, which are included in recognition data 50 filtered by fingerprint filter 23. Then, fingerprint collator 24 counts the number of regions (blocks), in which both coincide with each other, and calculates, as the similarity degree, an occupation ratio of the regions where both coincide with each other with respect to the static fingerprints.

Note that, in this exemplary embodiment, it is defined that whether or not both coincide with each other is determined based only on whether or not the regions are the static regions, and that the brightness values of the respective blocks are not considered. If blocks located at the same position are the static regions, then fingerprint collator 24 determines that both coincide with each other even if the brightness values of the individual blocks are different from each other.

An example of processing for calculating the similarity degree, which is performed in fingerprint collator 24, is described with reference to a specific example in FIG. 25.

Static fingerprint C002 shown in FIG. 25 is a static fingerprint included in recognition data 40 transmitted from reception device 10. Static fingerprint C00X shown in FIG. 25 is a static fingerprint included in recognition data 50 filtered in fingerprint filter 23.

In an example shown in FIG. 25, both of the number of blocks of the static regions of static fingerprint C002 and of the number of blocks of the static regions of static fingerprint C00X are 13 that is the same number. However, the blocks are a little different in position. Those in which the positions of the blocks of the static regions coincide with each other between static fingerprint C002 and static fingerprint C00X are totally 11 blocks, which are 5 blocks on a first row from the top, 1 block (block with a brightness value of "128") on a second row from the top, and 5 blocks on a fifth row from the top among 25 blocks in each of the static fingerprints. Here, the total number of blocks which compose the static fingerprint is 25, and accordingly, fingerprint collator 24 calculates 11/25=44%, and sets the calculated 44% as the similarity degree between static fingerprint C002 and static fingerprint C00X.

Then, fingerprint collator 24 compares the calculated similarity degree with a predetermined static threshold, and performs a similarity determination based on a result of this comparison. Fingerprint collator 24 makes a determination of "being similar" if the calculated similarity degree is the static threshold or more, and makes a determination of "not being similar" if the calculated similarity degree is less than the static threshold. In the above-mentioned example, if the static threshold is set at 40% for example, then fingerprint collator 24 determines that static fingerprint C002 is similar to static fingerprint C00X. Note that a numeric value of this static threshold is merely an example, and desirably, is set as appropriate.

Note that, in this exemplary embodiment, it is described that the brightness values of the respective blocks which compose the static fingerprints are not considered for calculation of the similarity degree between the static fingerprints; however, the present disclosure is never limited to this configuration. Fingerprint collator 24 may use the brightness values of the respective blocks composing the static fingerprints for calculation of the similarity degree between the static fingerprints. For example, for collating two static fingerprints with each other, fingerprint collator 24 may calculate the similarity degree between the static fingerprints by counting the number of blocks in which not only the positions but also the brightness values coincide with each other. Alternatively fingerprint collator 24 may calculate the similarity degree between the static fingerprints by using the normalized cross correlation.

[1-3-7-2. Similarity Degree Between Dynamic Fingerprints]

Next, fingerprint collator 24 calculates a similarity degree between the dynamic fingerprints (Step S61).

Fingerprint collator 24 collates the dynamic fingerprint, which is included in recognition data 40 transmitted from reception device 10, with the dynamic fingerprint, which is included in recognition data 50 filtered by fingerprint filter 23. Then, fingerprint collator 24 calculates a similarity degree between the dynamic fingerprint, which is included in recognition data 40 transmitted from reception device 10, and the dynamic fingerprint, which is included in recognition data 50 filtered by fingerprint filter 23.

Fingerprint collator 24 calculates, as the similarity degree, a degree of coincidence between the dynamic regions. Specifically, fingerprint collator 24 compares the positions of the dynamic regions and signs of the brightness-changed values in the dynamic fingerprints, which are included in recognition data 40 transmitted from reception device 10, with the positions of the dynamic regions and signs of the brightness-changed values in the dynamic fingerprints, which are included in recognition data 50 filtered by fingerprint filter 23. Then, fingerprint collator 24 counts the number of regions (blocks), in which both coincide with each other, and calculates, as the similarity degree, an occupation ratio of the regions where both coincide with each other with respect to the dynamic fingerprints.

Note that, in this exemplary embodiment, it is defined that whether or not both coincide with each other is determined based on whether or not the regions are the dynamic regions, and based on the signs of the brightness-changed values, and that the numeric values of the brightness-changed value of the respective blocks are not considered. If blocks located at the same position are the dynamic regions, and the signs of the brightness-changed values are mutually the same, then fingerprint collator 24 determines that both coincide with each other even if the numeric values of the brightness-changed value of the individual blocks are different from each other.

An example of processing for calculating the similarity degree, which is performed in fingerprint collator 24, is described with reference to a specific example in FIG. 26.

Dynamic fingerprint D003 shown in FIG. 26 is a dynamic fingerprint included in recognition data 40 transmitted from reception device 10. Dynamic fingerprint D00X shown in FIG. 26 is a dynamic fingerprint included in recognition data 50 filtered in fingerprint filter 23.

In an example shown in FIG. 26, the number of blocks of the dynamic regions of dynamic fingerprint D003 is 11, and the number of blocks of the dynamic regions of dynamic fingerprint D00X is 8. Then, those in which the positions of the blocks and the signs of the brightness-changed values in the dynamic regions coincide with each other between dynamic fingerprint D003 and dynamic fingerprint D00X are totally 5 blocks, which are 2 blocks on a first row from the top, 2 blocks on a second row from the top, and 1 block on a fifth row from the top among 25 blocks in each of the dynamic fingerprints. Here, the total number of blocks which compose the dynamic fingerprint is 25, and accordingly, fingerprint collator 24 calculates 5/25=20%, and sets the calculated 20% as the similarity degree between dynamic fingerprint D003 and dynamic fingerprint D00X.

Then, fingerprint collator 24 compares the calculated similarity degree with a predetermined dynamic threshold, and performs a similarity determination based on a result of this comparison. Fingerprint collator 24 makes a determination of "being similar" if the calculated similarity degree is the dynamic threshold or more, and makes a determination of "not being similar" if the calculated similarity degree is less than the dynamic threshold. In the above-mentioned example, if the dynamic threshold is set at 30% for example, then fingerprint collator 24 determines that dynamic fingerprint D003 is not similar to dynamic fingerprint D00X.

Note that a numeric value of this dynamic threshold is merely an example, and desirably, is set as appropriate. Moreover, the above-mentioned static threshold and this dynamic threshold may be set at the same numeric value, or may be set at different numeric values.

As described above, fingerprint collator 24 individually executes the similarity determination regarding the static fingerprints, which is based on the similarity degree calculated in Step S60, and the similarity determination regarding the dynamic fingerprints, which is based on the similarity degree calculated in Step S61.

Note that, in this exemplary embodiment, it is described that magnitudes of the brightness-changed values of the respective blocks which compose the dynamic fingerprints are not considered for calculation of the similarity degree between the dynamic fingerprints; however, the present disclosure is never limited to this configuration. Fingerprint collator 24 may use the absolute values of the brightness-changed values of the respective blocks composing the dynamic fingerprints for calculation of the similarity degree between the dynamic fingerprints. For example, for collating two dynamic fingerprints with each other, fingerprint collator 24 may calculate the similarity degree between the dynamic fingerprints by counting the number of blocks in which the absolute values of the brightness-changed values also coincide with each other in addition to the positions and the signs. Alternatively, as in the case of calculating the similarity degree between the static fingerprints, fingerprint collator 24 may calculate the similarity degree between the dynamic fingerprints by using only the positions of the blocks of the dynamic regions. Alternatively, fingerprint collator 24 may calculate the similarity degree between the dynamic fingerprints by using the normalized cross correlation.

Note that either of the processing for calculating the similarity degree between the static fingerprints in Step S60 and the processing for calculating the similarity degree between the dynamic fingerprints in Step S61 may be executed first, or alternatively, both thereof may be executed simultaneously.

[1-3-7-3. Recognition of Video Content]

Next, based on a result of the similarity determination of the fingerprints, fingerprint collator 24 performs the recognition (image recognition) of the video content (Step S62).

Fingerprint collator 24 performs the recognition of the video content based on a result of the similarity determination between the static fingerprints, a result of the similarity determination between the dynamic fingerprints, and predetermined recognition conditions. As mentioned above, fingerprint collator 24 collates each of the static fingerprints and the dynamic fingerprints, which are included in recognition data 40 transmitted from reception device 10, with the plurality of fingerprints 53 included in recognition data 50 filtered by fingerprint filter 23. Then, based on a result of that collation and on the predetermined recognition conditions, fingerprint collator 24 selects one piece of recognition data 50 from recognition data 50 filtered by fingerprint filter 23, and outputs information indicating the video content, which corresponds to selected recognition data 50, as a result of the image recognition.

Note that, for example, the information indicating the video content is a file name of the video content, a channel name of the broadcast station that broadcasts the video content, an ID of the EPG, and the like.

The recognition conditions are conditions determined based on at least one of the static fingerprints and the dynamic fingerprints. An example of the recognition conditions is shown in FIG. 27. Note that the recognition conditions shown in FIG. 27 are conditions for use during a predetermined period. This predetermined period is a period of a predetermined number of frames. For example, the predetermined period is a period of 10 frames or less.

That is to say, fingerprint collator 24 collates the static fingerprints and the dynamic fingerprints, which are included in recognition data 40 transmitted from reception device 10 during the predetermined period, with fingerprints 53 included in recognition data 50 filtered by fingerprint filter 23.

Note that the number of frames here stands for the number of image-changed frames. Hence, an actual period corresponds to a product obtained by multiplying the number of frames, which is determined as the predetermined period, by a coefficient that is based on an extraction frame rate set in video extractor 12 and on the frame rate of the content (for example, in the example shown in FIGS. 5, 6, the coefficient is "2" at 30 fps, is "3" at 20 fps, is "4" at 15 fps, and the like). Note that this number of frames may be defined as the number of image-changed frames, or may be defined as the number of fingerprints.

Note that, in the following description, "being similar" indicates that the determination of "being similar" is made in the above-mentioned similarity determination.

Recognition conditions (a) to (e) shown as an example in FIG. 27 are as follows.
(a) Similarity is established in at least one of the static fingerprints and the dynamic fingerprints.
(b) Similarity is established in at least two of the static fingerprints and the dynamic fingerprints.
(c) Similarity is established in at least one of the static fingerprints, and similarity is established in at least one of the dynamic fingerprints.
(d) Similarity is established continuously twice in the static fingerprints or the dynamic fingerprints.
(e) Similarity is established continuously three times in the static fingerprints or the dynamic fingerprints.

For example, in a case of performing the collation processing based on the recognition condition (a), fingerprint collator 24 makes a determination as follows. In a case where the determination of "being similar" has been made for at least one of the static fingerprints and the dynamic fingerprints in the above-mentioned similarity determination, fingerprint collator 24 determines that the video content has been recognized (Yes in Step S63). Otherwise, fingerprint collator 24 determines that the video content has not been recognized (No in Step S63).

For example, if the predetermined period is set at 3 frames, fingerprint collator 24 executes the following processing during a period of 3 frames of the image-changed frames. Fingerprint collator 24 performs the above-mentioned similarity determination for the static fingerprints and the dynamic fingerprints, which are included in recognition data 40 transmitted from reception device 10. Then, if at least one of these is fingerprint 53 determined as "being similar", then fingerprint collator 24 determines that the video content has been recognized. Then, fingerprint collator 24 outputs the information indicating the video content, which corresponds to recognition data 50 that has that fingerprint 53, as a result of the image recognition.

Moreover, for example, in a case of performing the collation processing based on the recognition condition (b), fingerprint collator 24 makes a determination as follows. In a case where the determination of "being similar" has been made for at least two of the static fingerprints and the dynamic fingerprints in the above-mentioned similarity determination, fingerprint collator 24 determines that the video content has been recognized (Yes in Step S63). Otherwise, fingerprint collator 24 determines that the video content has not been recognized (No in Step S63).

Note that this recognition condition (b) includes: a case where the determination of "being similar" is made for two or more of the static fingerprints; a case where the determination of "being similar" is made for two or more of the dynamic fingerprints; and a case where the determination of "being similar is made for one or more of the static fingerprints and the determination of "being similar is made for one or more of the dynamic fingerprints.

For example, if the predetermined period is set at 5 frames, fingerprint collator 24 executes the following processing during a period of 5 frames of the image-changed frames. Fingerprint collator 24 performs the above-mentioned similarity determination for the static fingerprints and the dynamic fingerprints, which are included in recognition data 40 transmitted from reception device 10. Then, if at least two of these are fingerprints 53 determined as "being similar", then fingerprint collator 24 determines that the video content has been recognized. Then, fingerprint collator 24 outputs the information indicating the video content, which corresponds to recognition data 50 that has those fingerprints 53, as a result of the image recognition.

Moreover, in a case of performing the collation processing based on the recognition condition (c), fingerprint collator 24 makes a determination as follows. In a case where the determination of "being similar" has been made for at least one of the static fingerprints and at least one of the dynamic fingerprints in the above-mentioned similarity determination, fingerprint collator 24 determines that the video content has been recognized (Yes in Step S63). Otherwise, fingerprint collator 24 determines that the video content has not been recognized (No in Step S63).

For example, if the predetermined period is set at 5 frames, fingerprint collator 24 executes the following processing during a period of 5 frames of the image-changed frames. Fingerprint collator 24 performs the above-mentioned similarity determination for the static fingerprints and the dynamic fingerprints, which are included in recognition data 40 transmitted from reception device 10. Then, if at least one of the static fingerprints and at least one of the dynamic fingerprints are fingerprints 53 determined as "being similar", then fingerprint collator 24 determines that the video content has been recognized. Then, fingerprint collator 24 outputs the information indicating the video content, which corresponds to recognition data 50 that has that fingerprint 53, as a result of the image recognition.

Note that, to this recognition condition, a condition regarding an order of the static fingerprints and the dynamic fingerprint may be added in addition to the condition regarding the number of fingerprints determined as "being similar".

Moreover, for example, in a case of performing the collation processing based on the recognition condition (d), fingerprint collator 24 makes a determination as follows. In a case where the determination of "being similar" has been made continuously twice for the static fingerprints or the dynamic fingerprints in the above-mentioned similarity determination, fingerprint collator 24 determines that the video content has been recognized (Yes in Step S63). Otherwise, fingerprint collator 24 determines that the video content has not been recognized (No in Step S63).

Note that this recognition condition (d) stands for as follows. Fingerprints 43, which are included in recognition data 40 transmitted from reception device 10 and are temporally continuous with each other, are determined as "being similar" continuously twice or more. This includes: a case where the static fingerprints created continuously twice or more are determined as "being similar" continuously twice or more; a case where the dynamic fingerprints created continuously twice or more are determined as "being similar" continuously twice or more; and a case where the static fingerprints and the dynamic fingerprints, which are created continuously while being switched from each other, are determined as "being similar" continuously twice or more.

For example, if the predetermined period is set at 5 frames, fingerprint collator 24 executes the following processing during a period of 5 frames of the image-changed frames. Fingerprint collator 24 performs the above-mentioned similarity determination for the static fingerprints and the dynamic fingerprints, which are included in recognition data 40 transmitted from reception device 10. Then, if the static fingerprints or the dynamic fingerprints are fingerprints 53 determined as "being similar" continuously twice, then fingerprint collator 24 determines that the video content has been recognized. Then, fingerprint collator 24 outputs the information indicating the video content, which corresponds to recognition data 50 that has that fingerprint 53, as a result of the image recognition.

Moreover, in a case of performing the collation processing based on the recognition condition (e), fingerprint collator 24 makes a determination as follows. In a case where the determination of "being similar" has been made continuously three times for the static fingerprints or the dynamic fingerprints in the above-mentioned similarity determination, fingerprint collator 24 determines that the video content has been recognized (Yes in Step S63). Otherwise, fingerprint collator 24 determines that the video content has not been recognized (No in Step S63).

Note that this recognition condition (e) stands for as follows. Fingerprints 43, which are included in recognition data 40 transmitted from reception device 10 and are temporally continuous with each other, are determined as "being similar" continuously three times or more. This includes: a case where the static fingerprints created continuously three times or more are determined as "being similar" continuously three times or more; a case where the dynamic fingerprints created continuously three times or more are determined as "being similar" continuously three times or more; and a case where the static fingerprints and the dynamic fingerprints, which are created continuously while being switched from each other, are determined as "being similar" continuously three times or more.

For example, if the predetermined period is set at 8 frames, fingerprint collator 24 executes the following processing during a period of 8 frames of the image-changed frames. Fingerprint collator 24 performs the above-mentioned similarity determination for the static fingerprints and the dynamic fingerprints, which are included in recognition data 40 transmitted from reception device 10. Then, if the static fingerprints or the dynamic fingerprints are fingerprints 53 determined as "being similar" continuously three times, then fingerprint collator 24 determines that the video content has been recognized. Then, fingerprint filter 23 outputs the information indicating the video content, which corresponds to recognition data 50 that has those fingerprints 53, as a result of the image recognition.

Note that, in the above-mentioned recognition conditions, accuracy of the collation (image recognition processing) can be enhanced by increasing the number of fingerprints determined as "being similar" or the number of fingerprints determined continuously as "being similar".

FIG. 28 schematically shows an example of operations of fingerprint collator 24 in a case where fingerprint collator 24 performs the collation processing based on the recognition condition (e). In this case, fingerprint collator 24 defines, as the recognition condition, that the similarity is established continuously three times in the static fingerprints or the dynamic fingerprints.

For example, it is assumed that fingerprints 53 of content 00X filtered by fingerprint filter 23 are arrayed in order of static fingerprint A, dynamic fingerprint B, static fingerprint C, dynamic fingerprint D, static fingerprint E. Note that, in FIG. 28, fingerprints 53 are individually represented by "Static A", "Dynamic B", "Static C", "Dynamic D", "Static E".

At this time, it is assumed that fingerprints 43 received from reception device 10 are arrayed in order of static fingerprint A, dynamic fingerprint B and static fingerprint C. Note that, in FIG. 28, such fingerprints 43 are individually represented by "Static A", "Dynamic B", "Static C".

In this example, in the above-mentioned similarity determination, fingerprint collator 24 outputs the determination result of "being similar" for each of static fingerprint A, dynamic fingerprint B, static fingerprint C. That is to say, fingerprint collator 24 determines as "being similar" continuously three times.

In such a way, fingerprint collator 24 determines that fingerprints 43 included in recognition data 40 transmitted from reception device 10 are similar to fingerprints 53 included in recognition data 50 of content 00X. That is to say, fingerprint collator 24 recognizes that the video content received by reception device 10 is content 00X. Then, fingerprint collator 24 outputs information, which indicates content 00X, as a collation result.

When fingerprint collator 24 can recognize (perform the image recognition) the video content (Yes in Step S63), fingerprint collator 24 outputs a result of the image recognition to the communicator (not shown) (Step S64).

The communicator (not shown) of content recognition device 20 transmits information, which indicates the result of the image recognition, which is received from fingerprint collator 24, to reception device 10 (Step S8 in FIG. 8). The information transmitted from content recognition device 20 to reception device 10 is information indicating the video content selected in such a manner that fingerprint collator 24 executes the image recognition based on recognition data 40 transmitted from reception device 10, and is information indicating the video content under reception in reception device 10. The information is a content ID for example, but may be any information as long as the video content can be specified thereby. Reception device 10 acquires the information from content recognition device 20, thus making it possible to acquire the additional information regarding the video content under reception, for example, from advertisement server device 30.

When fingerprint collator 24 cannot recognize the video content (No in Step S64), the processing of content recognition device 20 returns to Step S1 in FIG. 8, and the series of processing in and after Step S1 is repeated.

Note that, in the case of being incapable of specifying the video content corresponding to recognition data 40 transmitted from reception device 10 as a result of the image recognition processing, content recognition device 20 may transmit the information, which indicates that the image recognition cannot be successfully performed, to reception device 10. Alternatively, content recognition device 20 does not have to transmit anything.

[1-4. Effects and the Like]

As described above, in this exemplary embodiment, the content recognition device includes the fingerprint creator, the sorter, and the collator. The fingerprint creator creates fingerprints for each of a plurality of acquired video content candidates. The sorter sorts the video content candidates by using attached information included in recognition data input from an outside. The collator collates the fingerprints of the video content candidates sorted by the sorter with fingerprints included in the recognition data, and specifies video content which corresponds to the fingerprints included in the recognition data from among the video content candidates.

Note that content recognition device 20 is an example of the content recognition device. Fingerprint creator 2110 is an example of the fingerprint creator. Fingerprint filter 23 is an example of the sorter. Fingerprint collator 24 is an example of the collator. Each piece of video content α1, β1, γ1, δ1, ε1 is an example of the video content candidate. Fingerprints 53 are an example of the fingerprints. Recognition data 40 is an example of the recognition data input from the outside. Type information 42 is an example of the attached information. Fingerprints 43 are an example of the fingerprints included in the recognition data.

Figure 29:
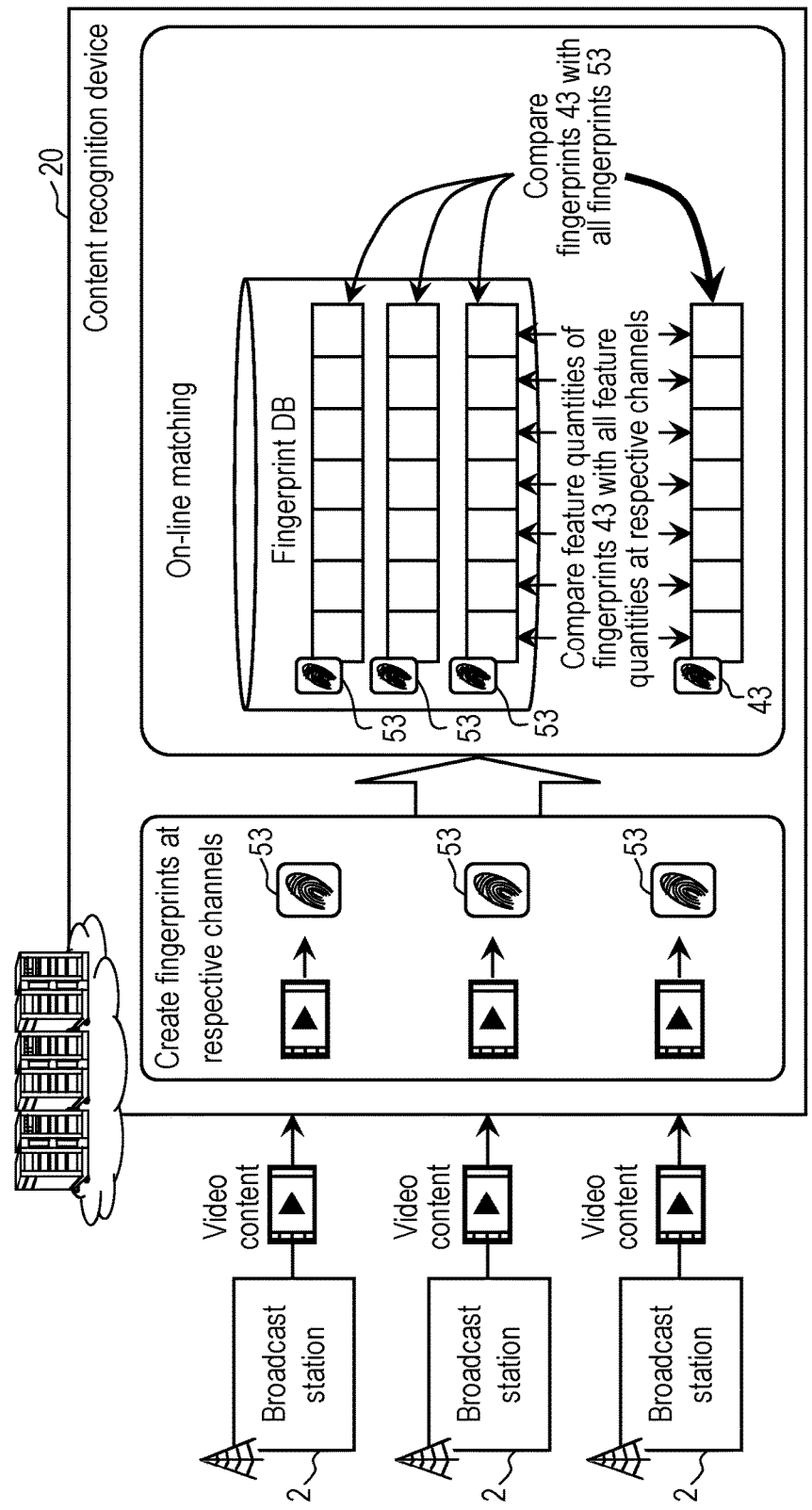
FIG. 29 is a view for explaining a point regarded as a problem with regard to the recognition of the video content.

Here, with reference to FIG. 29, a description is made of a problem caused in the case where content recognition device 20 recognizes the video content by using the fingerprints. FIG. 29 is a view for explaining a point regarded as the problem with regard to the recognition of the video content.

As an example is shown in FIG. 29, content recognition device 20, which performs the recognition of the video content substantially in real time, receives the plurality of pieces of video content broadcasted from the plurality of broadcast stations 2, creates fingerprints 53 based on the received pieces of video content, and stores created fingerprints 53 in fingerprint DB 22.

As described above, fingerprints 53 corresponding to the number of received pieces of video content are accumulated in fingerprint DB 22 with the elapse of time. Therefore, fingerprints 53 accumulated in fingerprint DB 22 reach an enormous number.

If content recognition device 20 does not include fingerprint filter 23, content recognition device 20 must minutely collate fingerprints 43, which are included in recognition data 40 received from reception device 10, with enormous number of fingerprints 53 accumulated in fingerprint DB 22, and it takes a long time to obtain the recognition result of the video content.

However, content recognition device 20 shown in this exemplary embodiment defines recognition data 50, which is sorted by fingerprint filter 23 by using the attached information, as the collation target of recognition data 40. Hence, in accordance with the present disclosure, the number of pieces of data for use in recognizing the video content can be reduced, and accordingly, the processing required for recognizing the video content can be reduced while enhancing the recognition accuracy of the video content.

Note that the recognition data input from the outside may include the type information as the attached information, the type information indicating types of the fingerprints. Moreover, in the content recognition device, the sorter may compare the type information included in the recognition data with the types of fingerprints of the video content candidates, to sort the video content candidates.

Note that the static fingerprints and the dynamic fingerprints are an example of the types of fingerprints, and type information 42 is an example of the type information.

In this configuration, for example, if the number of types of the type information is two, then the type information can be expressed by 1 bit as an amount of information, and accordingly, the processing required for the sorting can be reduced in fingerprint filter 23.

Moreover, in the content recognition device, the sorter may compare the sequence of the pieces of type information, which are included in the recognition data input from the outside, with the sequence regarding the types of fingerprints of the video content candidates, to sort the video content candidates.

Note that sequence 60 is an example of the sequence of the pieces of type information, which are included in the recognition data input from the outside, and sequence candidate 61 is an example of the sequence regarding the types of fingerprints of the video content candidates.

In this configuration, fingerprint filter 23 can further narrow the number of pieces of recognition data 50 for use in the collation in fingerprint collator 24. Hence, the processing required for the collation in fingerprint collator 24 can be further reduced.

Moreover, the recognition data input from the outside may include the information indicating the creation time of the fingerprints included in the recognition data. Moreover, in the content recognition device, the sorter may select the fingerprints of the video content candidates based on the information indicating that creation time and on the creation time of the fingerprints of the video content candidates.

Note that timing information 41 is an example of the information indicating the creation time of the fingerprints included in the recognition data input from the outside. Timing information 41 is an example of the information indicating the creation time of the fingerprints of the video content candidates.

In this configuration, the accuracy of the sorting performed in fingerprint filter 23 can be enhanced.

Moreover, in the content recognition device, the sorter may select the fingerprint which is created at the time closest to the information indicating the creation time included in the recognition data input from the outside from among the fingerprints of the video content candidates, and may sort the video content candidates based on the comparison between the type of the selected fingerprint and the type information included in that recognition data.

In this configuration, the accuracy of the sorting performed in fingerprint filter 23 can be further enhanced.

Moreover, in the content recognition device, the fingerprint creator may create the static fingerprint based on the static region in which the inter-frame image variation between the plurality of image frames which compose the video content candidates is smaller than the first threshold, and may create the dynamic fingerprint based on the dynamic region in which the inter-frame image variation is larger than the second threshold.

The static region is a background, a region occupied by a subject with a small motion and a small change in the image frames. That is to say, in the continuous image frames, the motion and change of the subject in the static region are relatively small. Hence, the image recognition is performed while specifying the static region, thus making it possible to enhance the accuracy of the image recognition. The dynamic region is a region where there occurs a relatively large change of the image, which is generated in the scene switching and the like. That is to say, the dynamic region is a region where the characteristic change of the image occurs, and accordingly, the image recognition is performed while specifying the dynamic region, thus making it possible to enhance the accuracy of the image recognition. Moreover, the number of frames in each of which the dynamic region is generated is relatively small, and accordingly, the number of frames required for the image recognition can be reduced.

Moreover, the attached information may include the geographic information indicating a position of a device that transmits the video content serving as a creation source of the recognition data input from the outside, or a position of a device that transmits the recognition data.

Note that broadcast station 2 is an example of the device that transmits the video content. Reception device 10 is an example of the device that transmits the recognition data.

In this configuration, for example, video content broadcasted from broadcast station 2 from which the video content cannot be received in reception device 10 can be eliminated in fingerprint filter 23, and accordingly, the processing required for the collation can be reduced in fingerprint collator 24.

Moreover, the attached information may include user information stored in the device that transmits the recognition data input from the outside.

In this configuration, for example, video content, which does not conform to the user information, can be eliminated in fingerprint filter 23, and accordingly, the processing required for the collation can be reduced in fingerprint collator 24.

Note that these comprehensive or specific aspects may be realized by a system, a device, an integrated circuit, a computer program or a recording medium such as a computer-readable CD-ROM or the like, or may be realized by any combination of the system, the device, the integrated circuit, the computer program and the recording medium.

Other Exemplary Embodiments

As above, the first exemplary embodiment has been described as exemplification of the technology disclosed in this application. However, the technology in the present disclosure is not limited to this, and is applicable also to exemplary embodiments, which are appropriately subjected to alteration, replacement, addition, omission, and the like. Moreover, it is also possible to constitute new exemplary embodiments by combining the respective constituent elements, which are described in the foregoing first exemplary embodiment, with one another.

In this connection, another exemplary embodiment is exemplified below.

In the first exemplary embodiment, the operation example is shown, in which content recognition device 20 performs the recognition of the video content substantially in real time; however, the present disclosure is never limited to this operation example. For example, also in the case where reception device 10 reads out and displays the video content stored in the recording medium (for example, recorded program content), content recognition device 20 can operate as in the case of the above-mentioned first exemplary embodiment, and can recognize the video content.

In the first exemplary embodiment, the operation example is described, in which content recognition device 20 receives recognition data 40 from reception device 10, performs the filtering processing and the collation processing for recognizing the video content, and transmits a result thereof to reception device 10. This operation is referred to as "on-line matching". Meanwhile, an operation to perform the collation processing for recognizing the video content in reception device 10 is referred to as "local matching".

Reception device 10 acquires recognition data 50, which is stored in fingerprint DB 22, from content recognition device 20, and can thereby perform the local matching. Note that, at this time, reception device 10 does not have to acquire all of recognition data 50 stored in fingerprint DB 22. For example, reception device 10 may acquire recognition data 50 already subjected to the respective pieces of filtering (for example, the region filtering and the profile filtering) in fingerprint filter 23.

In the first exemplary embodiment, as an operation example of fingerprint filter 23, the operation example is shown, in which the filtering is performed in order of the region filtering, the profile filtering, the property filtering and the property sequence filtering; however, the present disclosure is never limited to this operation example. Fingerprint filter 23 may perform the respective pieces of filtering in an order different from that in the first exemplary embodiment, or may perform the filtering while selecting one or more and three or less from these pieces of filtering.

In the first exemplary embodiment, the operation example is shown, in which fingerprint filter 23 reads out recognition data 50 from fingerprint DB 22 and acquires the same every time each piece of the filtering processing is performed; however, the present disclosure is never limited to this operation example. For example, fingerprint filter 23 may operate so as to store a plurality of pieces of recognition data 50, which are read out from fingerprint DB 22 immediately before the first filtering processing, in a storage device such as a memory or the like, and to delete that recognition data 50 from the storage device every time when recognition data 50 is eliminated in each piece of the filtering processing.

In the first exemplary embodiment, such a configuration example is shown, in which both of the static fingerprints and the dynamic fingerprints are used for the recognition of the video content; however, the present disclosure is never limited to this configuration. The recognition of the video content may be performed by using only either one of the static fingerprints and the dynamic fingerprints. For example, in the flowchart of FIG. 9, only either one of Step S21 and Step S22 may be performed. Moreover, for example, each of fingerprint creators 2110, 110 may have a configuration including only either one of static region decision part 231 and dynamic region decision part 232. Moreover, for example, each of fingerprint creators 2110, 110 may have a configuration including only either one of static fingerprint creation part 241 and dynamic fingerprint creation part 242. Moreover, the fingerprints may be of three types or more.

For example, content recognition device 20 shown in the first exemplary embodiment can be used for recognition of advertisement content. Alternatively, content recognition device 20 can also be used for recognition of program content such as a drama, a variety show, and the like. At this time, reception device 10 may acquire information regarding, for example, a profile of a cast himself/herself, clothes worn by the cast, a place where the cast visits, and the like as the additional information, which is based on the result of the image recognition, from advertisement server device 30, and may display those pieces of acquired information on the video under display while superimposing the same information thereon.

Content recognition device 20 may receive not only the advertisement content but also the video content such as the program content or the like, and may create fingerprints corresponding to the video content. Then, fingerprint DB 22 may hold not only the advertisement content but also the fingerprints, which correspond to the program content, in association with the content ID.

In the first exemplary embodiment, the respective constituent elements may be composed of dedicated hardware, or may be realized by executing software programs suitable for the respective constituent elements. The respective constituent elements may be realized in such a manner that a program executor such as a CPU, a processor and the like reads out and executes software programs recorded in a recording medium such as a hard disk, a semiconductor memory, and the like. Here, the software that realizes content recognition device 20 of the first exemplary embodiment is a program such as follows.

That is to say, the program is a program for causing a computer to execute the content recognition method, the program including: a step of creating fingerprints for each of a plurality of acquired video content candidates; a step of sorting the video content candidates by using attached information included in recognition data input from the outside; and a step of collating the fingerprints of the sorted video content candidates with the fingerprints included in the recognition data, and specifying video content which corresponds to the fingerprints included in the recognition data from among the video content candidates.

Moreover, the above-described program may be distributed while being recorded in a recording medium. For example, the distributed program is installed in the devices or the like, and processors of the devices or the like are allowed to execute the program, thus making it possible to allow the devices or the like to perform the variety of processing.

Moreover, a part or whole of the constituent elements which compose the above-described respective devices may be composed of one system LSI (Large Scale Integration). The system LSI is a super multifunctional LSI manufactured by integrating a plurality of constituent parts on one chip, and specifically, is a computer system composed by including a microprocessor, a ROM, a RAM and the like. In the ROM, a computer program is stored. The microprocessor loads the computer program from the ROM onto the RAM, and performs an operation such as an arithmetic operation or the like in accordance with the loaded computer program, whereby the system LSI achieves a function thereof.

Moreover, a part or whole of the constituent elements which compose the above-described respective devices may be composed of an IC card detachable from each of the devices or of a single module. The IC card or the module is a computer system composed of a microprocessor, a ROM, a RAM and the like. The IC card or the module may include the above-described super multifunctional LSI. The microprocessor operates in accordance with the computer program, whereby the IC card or the module achieves a function thereof. This IC card or this module may have tamper resistance.

Moreover, the present disclosure may be realized by one in which the computer program or digital signals are recorded in a computer-readable recording medium, for example, a flexible disk, a hard disk, a CD-ROM, an MO, a DVD, a DVD-ROM, a DVD-RAM, a BD (Blu-Ray Disc (registered trademark)), a semiconductor memory and the like. Moreover, the present disclosure may be realized by digital signals recorded in these recording media.

Moreover, the computer program or the digital signals in the present disclosure may be transmitted via a telecommunications line, a wireless or wired communications line, a network such as the Internet and the like, a data broadcast, and the like.

Moreover, the present disclosure may be implemented by another independent computer system by recording the program or the digital signals in the recording medium and transferring the same, or by transferring the program or the digital signals via the network and the like.

Moreover, in the exemplary embodiment, the respective pieces of processing (respective functions) may be realized by being processed in a centralized manner by a single device (system), or alternatively, may be realized by being processed in a distributed manner by a plurality of devices.

As above, the exemplary embodiments have been described as the exemplification of the technology in the present disclosure. For this purpose, the accompanying drawings and the detailed description are provided.

Hence, the constituent elements described in the accompanying drawings and the detailed description can include not only constituent elements, which are essential for solving the problem, but also constituent elements, which are provided for exemplifying the above-described technology, and are not essential for solving the problem. Therefore, it should not be immediately recognized that such non-essential constituent elements are essential based on the fact that the non-essential constituent elements are described in the accompanying drawings and the detailed description.

Moreover, the above-mentioned exemplary embodiments are those for exemplifying the technology in the present disclosure, and accordingly, can be subjected to varieties of alterations, replacements, additions, omissions and the like within the scope of claims or within the scope of equivalents thereof.

INDUSTRIAL APPLICABILITY

The present disclosure is applicable to the content recognition device and the content recognition method, which perform the recognition of the video content by using the communication network. Specifically, the present disclosure is applicable to a video reception device such as a television set or the like, a server device or the like.

REFERENCE MARKS IN THE DRAWINGS 1 content recognition system
2 broadcast station
3 STB
10 reception device
11 video receiver
11a video input unit
11b first external input unit
11c second external input unit
12 video extractor
13 additional information acquirer
14 video output unit
15 controller
16 operation signal receiver
17 HTTP transceiver
18 additional information storage
19 additional information display controller
20 content recognition device
21 content receiver
22 fingerprint DB
23 fingerprint filter
24 fingerprint collator
25 fingerprint history information DB
30 advertisement server device
31 additional information DB
40, 40a, 40b, 40c, 40n, 50, 50a, 50b, 50c recognition data
41, 51, 51a, 51b, 51c timing information
42, 52, 52a, 52b, 52c type information
43, 53, 53a, 53b, 53c fingerprint
60 sequence
61 sequence candidate
91,92 frame
100 recognizer
105 communication network
110, 2110 fingerprint creator
111 image acquirer 112 data creator
120 fingerprint transmitter
130 recognition result receiver
210 scale converter
220 difference calculator
230 decision section
231 static region decision part
232 dynamic region decision part
240 creation section
241 static fingerprint creation part
242 dynamic fingerprint creation part

The invention claimed is:

1. A content recognition device comprising:
a fingerprint creator that creates fingerprints for each of a plurality of acquired video content candidates;
a sorter that sorts the video content candidates by using attached information included in recognition data received by the content recognition device; and
a collator that collates the fingerprints of the video content candidates sorted by the sorter with fingerprints included in the recognition data, and specifies video content which corresponds to the fingerprints included in the recognition data from among the video content candidates,
wherein the fingerprint creator creates a static fingerprint based on a static region in which an inter-frame image variation between a plurality of image frames which compose the video content candidates is smaller than a first threshold, creates a dynamic fingerprint based on a dynamic region in which the inter-frame image variation is larger than a second threshold, and associates each of the fingerprints created by the fingerprint creator with type information indicating whether the fingerprint is the static fingerprint or the dynamic fingerprint.

2. The content recognition device according to claim 1,
wherein the fingerprints are classified into at least two types which are a first fingerprint and a second fingerprint;
the recognition data includes, as the attached information, type information indicating the types of the fingerprints; and
the sorter sorts the video content candidates by comparing the type information included in the recognition data with types of the fingerprints of the video content candidates.

3. The content recognition device according to claim 1,
wherein the sorter sorts the video content candidates by comparing a sequence of the attached information included in the recognition data with a sequence of the type information.

4. The content recognition device according to claim 1,
wherein the recognition data includes information indicating a creation time of the fingerprints included in the recognition data; and
the sorter selects the fingerprints of the video content candidates based on the information indicating the creation time and on a creation time of the fingerprints of the video content candidates.

5. The content recognition device according to claim 4,
wherein the sorter selects a fingerprint which is created at a closest time to the information indicating the creation time included in the recognition data from among the fingerprints of the video content candidates, and sorts the video content candidates based on a comparison between a type of the selected fingerprint and the attached information included in the recognition data.

6. A content recognition device according to claim 1,
wherein the attached information includes geographic information indicating a position of a device that transmits video content serving as a creation source of the recognition data, or a position of a device that transmits the recognition data.

7. The content recognition device according to claim 1,
wherein the attached information includes user information stored in a device that transmits the recognition data.

8. A content recognition method comprising:
creating fingerprints for each of a plurality of acquired video content candidates;
receiving recognition data;
sorting the video content candidates by using attached information included in the received recognition data;
collating the fingerprints of the sorted video content candidates with fingerprints included in the recognition data, and specifying video content which corresponds to the fingerprints included in the recognition data from among the video content candidates;
creating a static fingerprint based on a static region in which an inter-frame image variation between a plurality of image frames which compose the video content candidates is smaller than a first threshold;
creating a dynamic fingerprint based on a dynamic region in which the inter-frame image variation is larger than a second threshold; and
associating each of the created fingerprints with type information indicating whether the fingerprint is the static fingerprint or the dynamic fingerprint,
wherein the recognition data includes the attached information indicating whether each of the fingerprints included in the recognition data is the static fingerprint or the dynamic fingerprint, and
the video content candidates are sorted by comparing the attached information included in the recognition data with the type information.

9. A non-transitory computer-readable recording medium storing a computer program to be executed by a computer for performing the content recognition method according to claim 8.

* * * * *